United States Patent [19]

Sato

[11] Patent Number: 5,687,026
[45] Date of Patent: Nov. 11, 1997

[54] ZOOM LENS CAPABLE OF CLOSE RANGE PHOTOGRAPHY

[75] Inventor: Susumu Sato, Chiba-ken, Japan

[73] Assignee: Nikon Corporation, Tokyo, Japan

[21] Appl. No.: 633,077

[22] Filed: Apr. 16, 1996

[30] Foreign Application Priority Data

Jun. 8, 1995 [JP] Japan .................................. 7-167017

[51] Int. Cl.$^6$ .................................................. G02B 15/14
[52] U.S. Cl. ........................ 359/684; 359/684; 359/689; 359/690
[58] Field of Search .................... 359/684, 685, 359/689, 690

[56] References Cited

U.S. PATENT DOCUMENTS

| | | | |
|---|---|---|---|
| 4,752,121 | 6/1988 | Kitagishi | 359/684 |
| 5,272,564 | 12/1993 | Suzuki et al. | 359/684 |
| 5,442,486 | 8/1995 | Sato | 359/684 |
| 5,543,969 | 8/1996 | Ito | 359/690 |

FOREIGN PATENT DOCUMENTS

| | | |
|---|---|---|
| 6-51202A | 2/1994 | Japan. |
| 6-242378A | 9/1994 | Japan. |

*Primary Examiner*—Georgia Y. Epps
*Assistant Examiner*—Evelyn A. Lester
*Attorney, Agent, or Firm*—Oliff & Berridge

[57] ABSTRACT

A zoom lens is capable of close-range photography where the photographic magnification of the object can be instantly changed even with the camera and lens fixed to a tripod or like support. The zoom lens comprises in order from the object side: a first lens group of weak refractive power, a second lens group of negative refractive power, and a third lens group of positive refractive power. The first lens group comprises, in the following order from the object side: a positive lens group, a positive lens group and a negative lens group. The first lens group is fixed while the second lens group moves along a convex locus of a zooming loci with respect to the image plane and the third lens group moves from the image side toward the object side during zooming from the maximum wide-angle state to the maximum telephoto state. At least one out of the three lens groups in the first lens group moves along the optical axis during focussing from objects at infinity to at a close-range. The zoom lens also satisfies predetermined conditions.

36 Claims, 50 Drawing Sheets

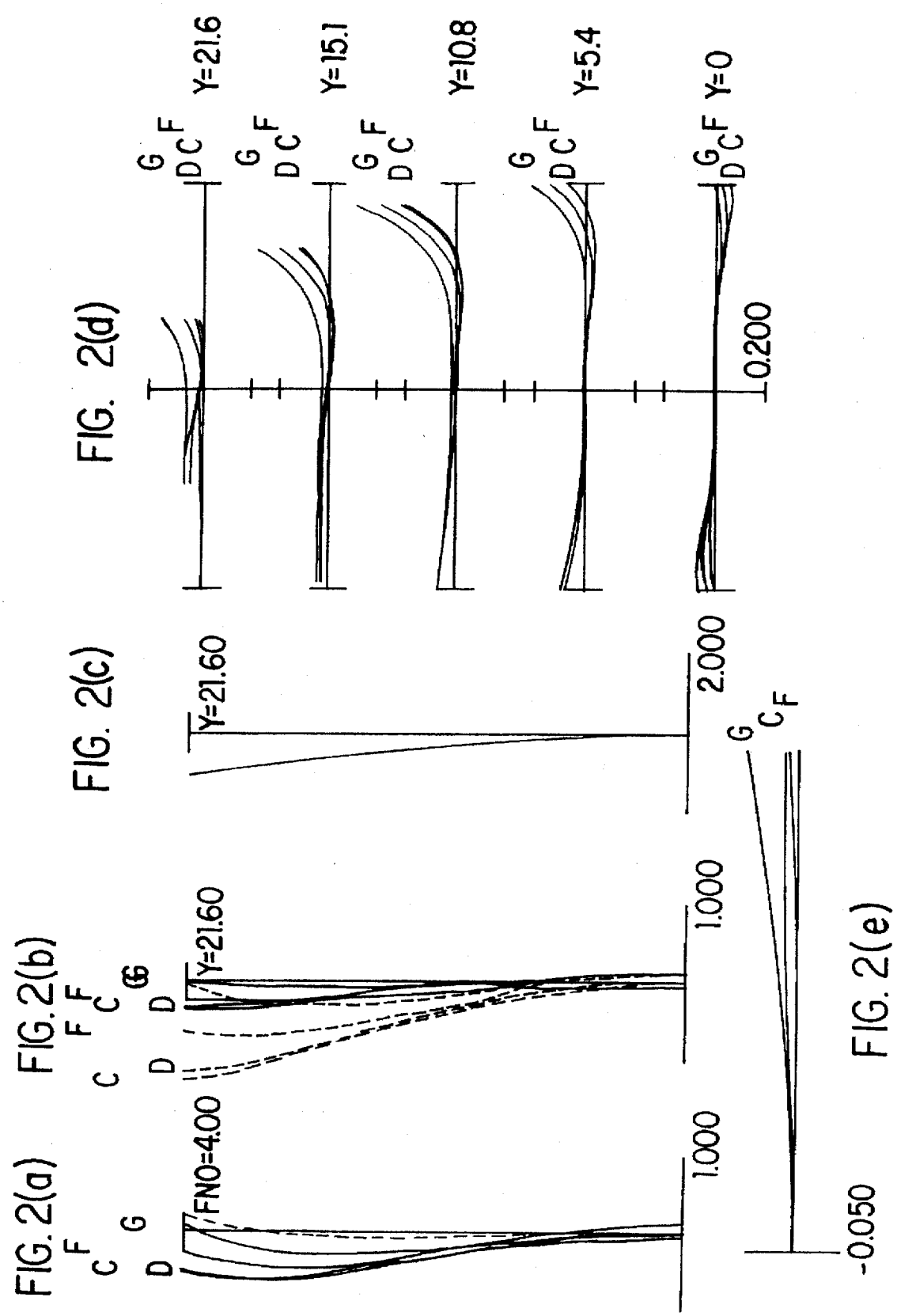

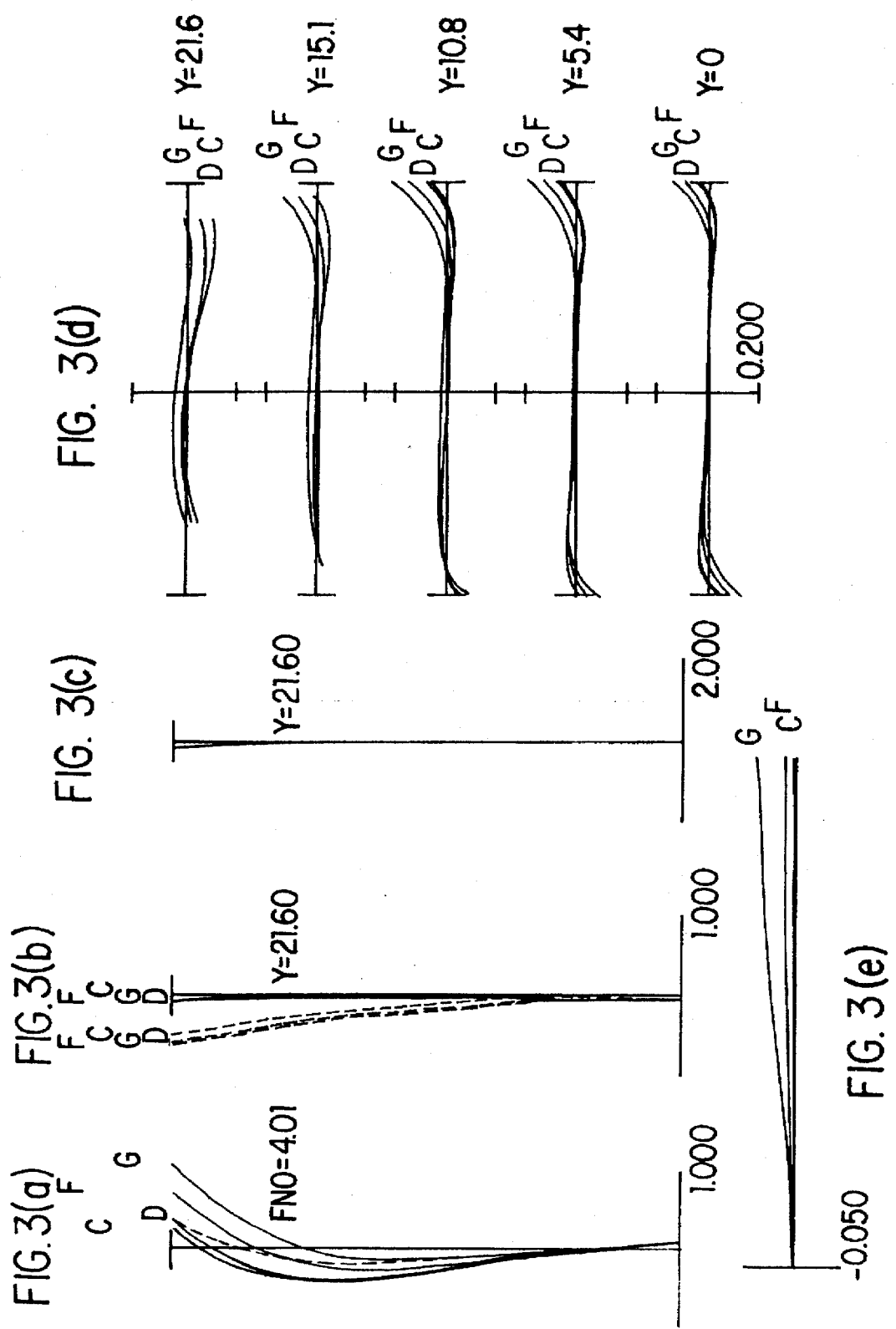

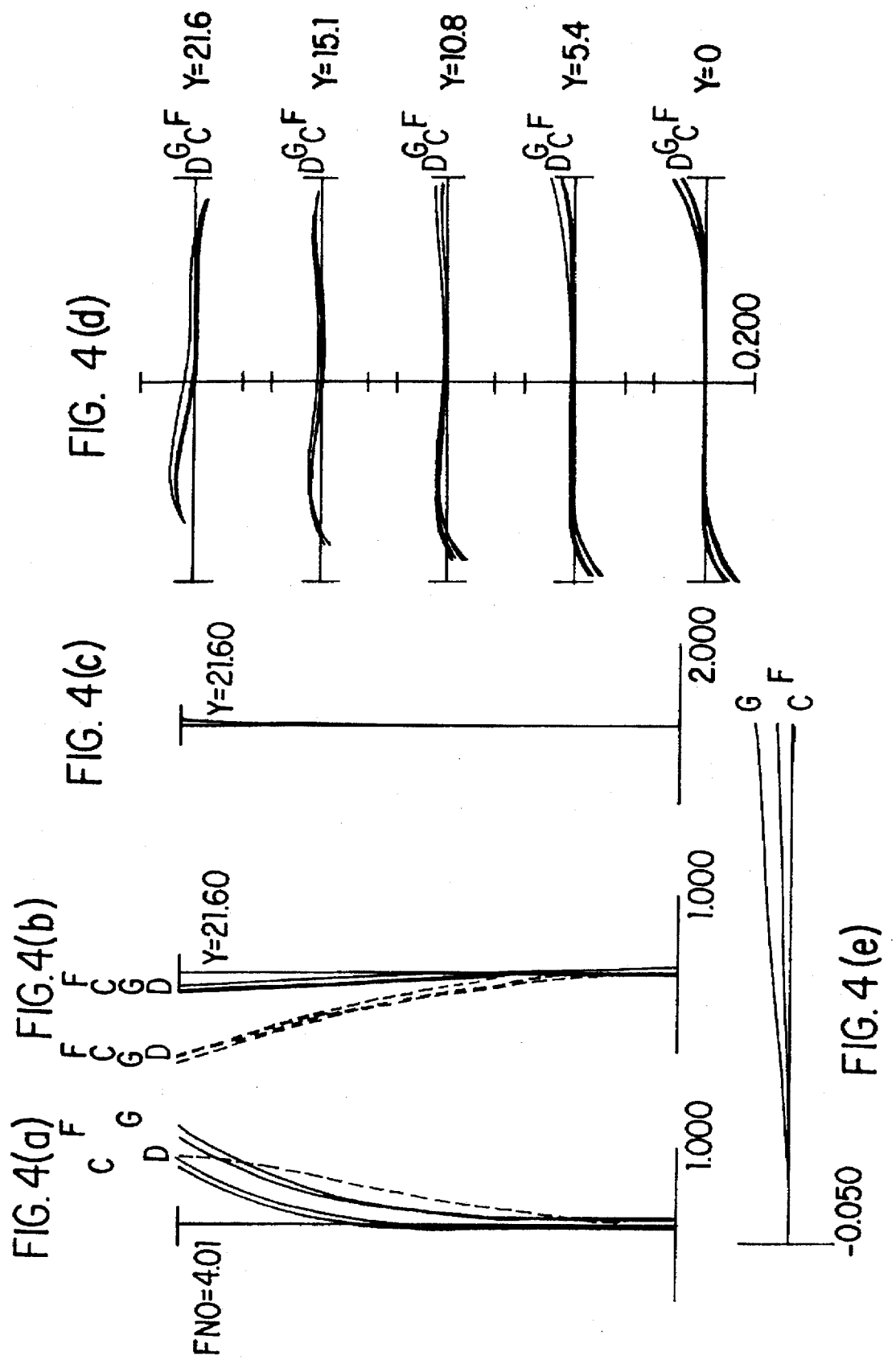

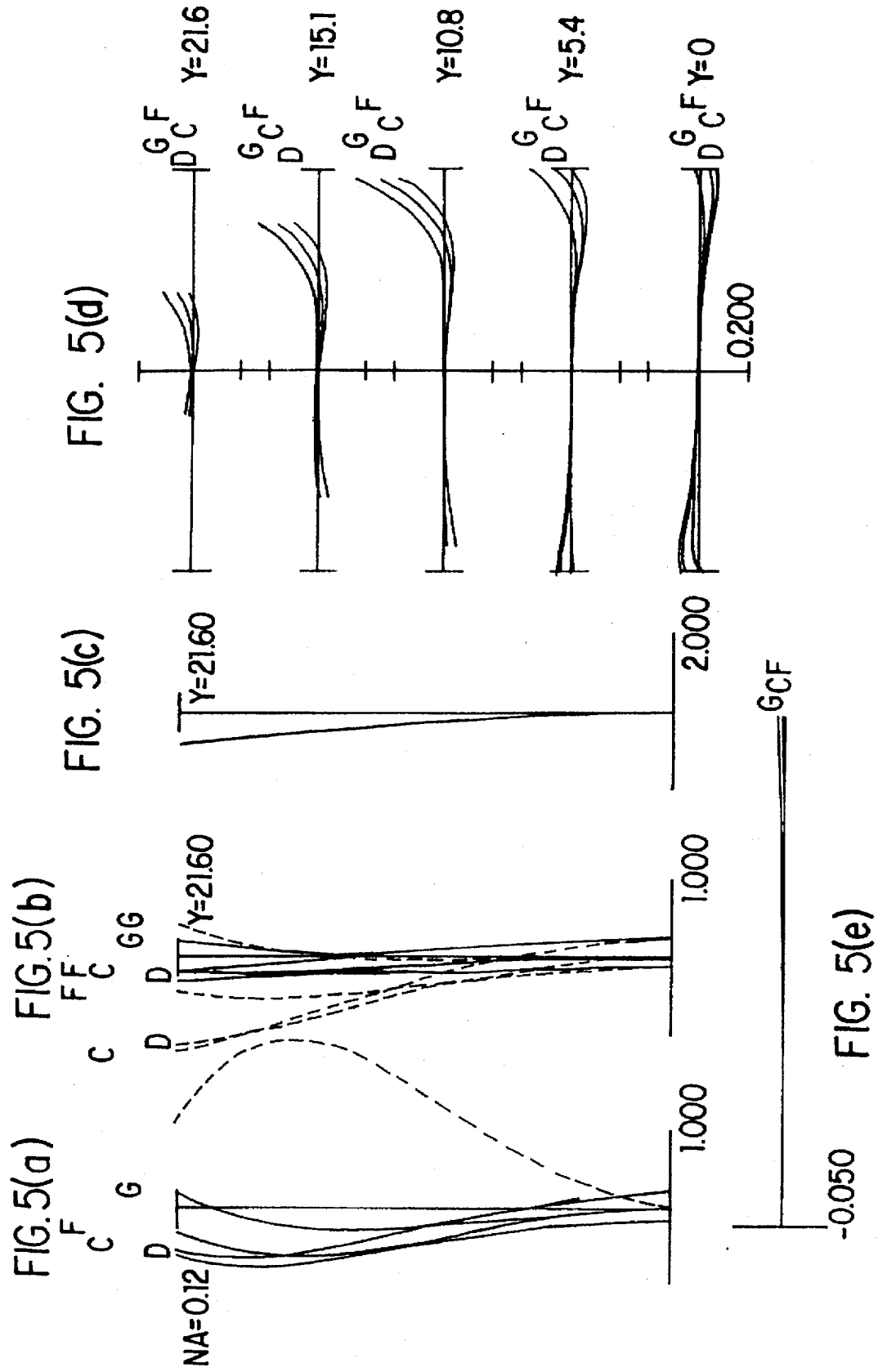

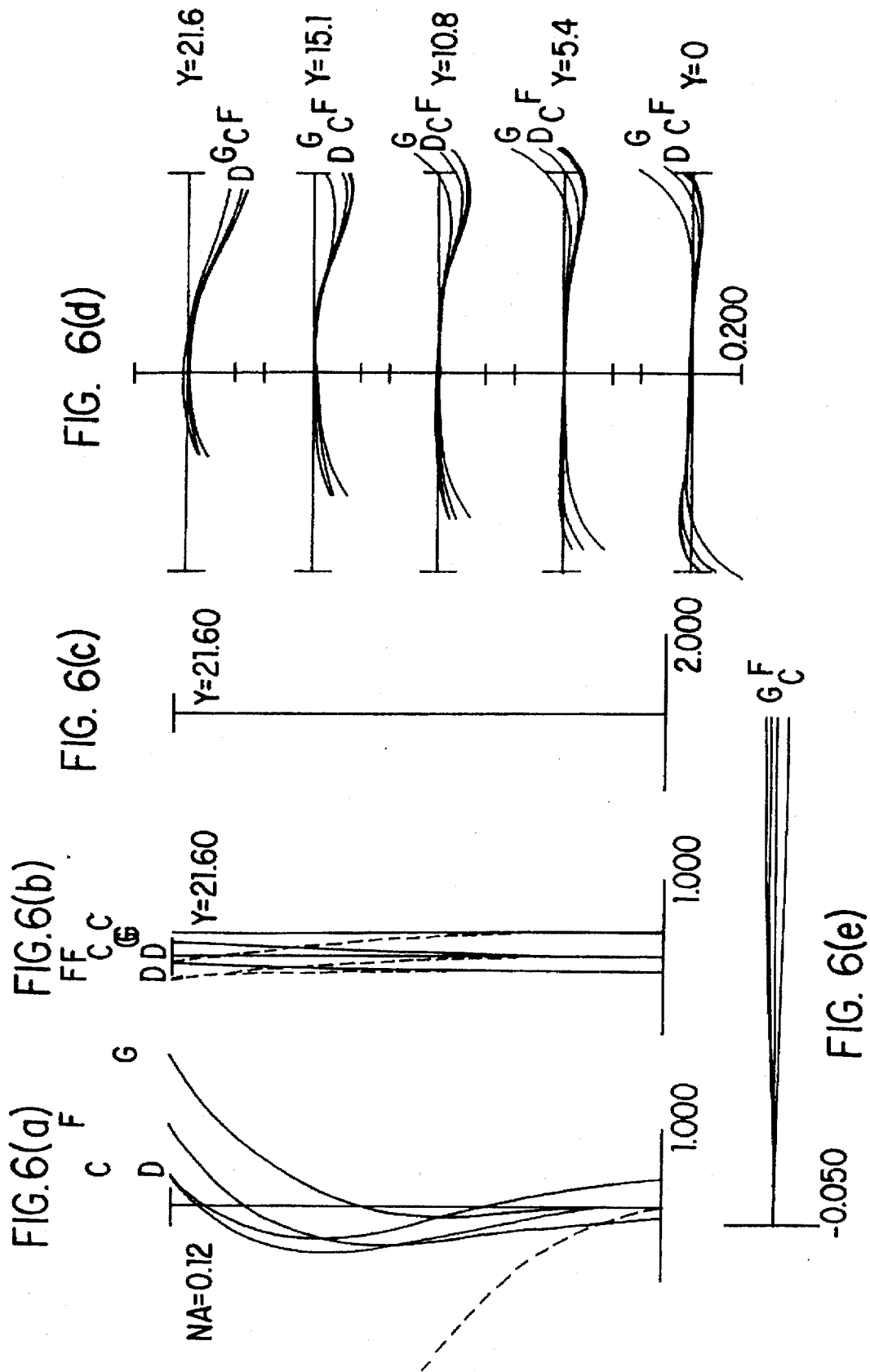

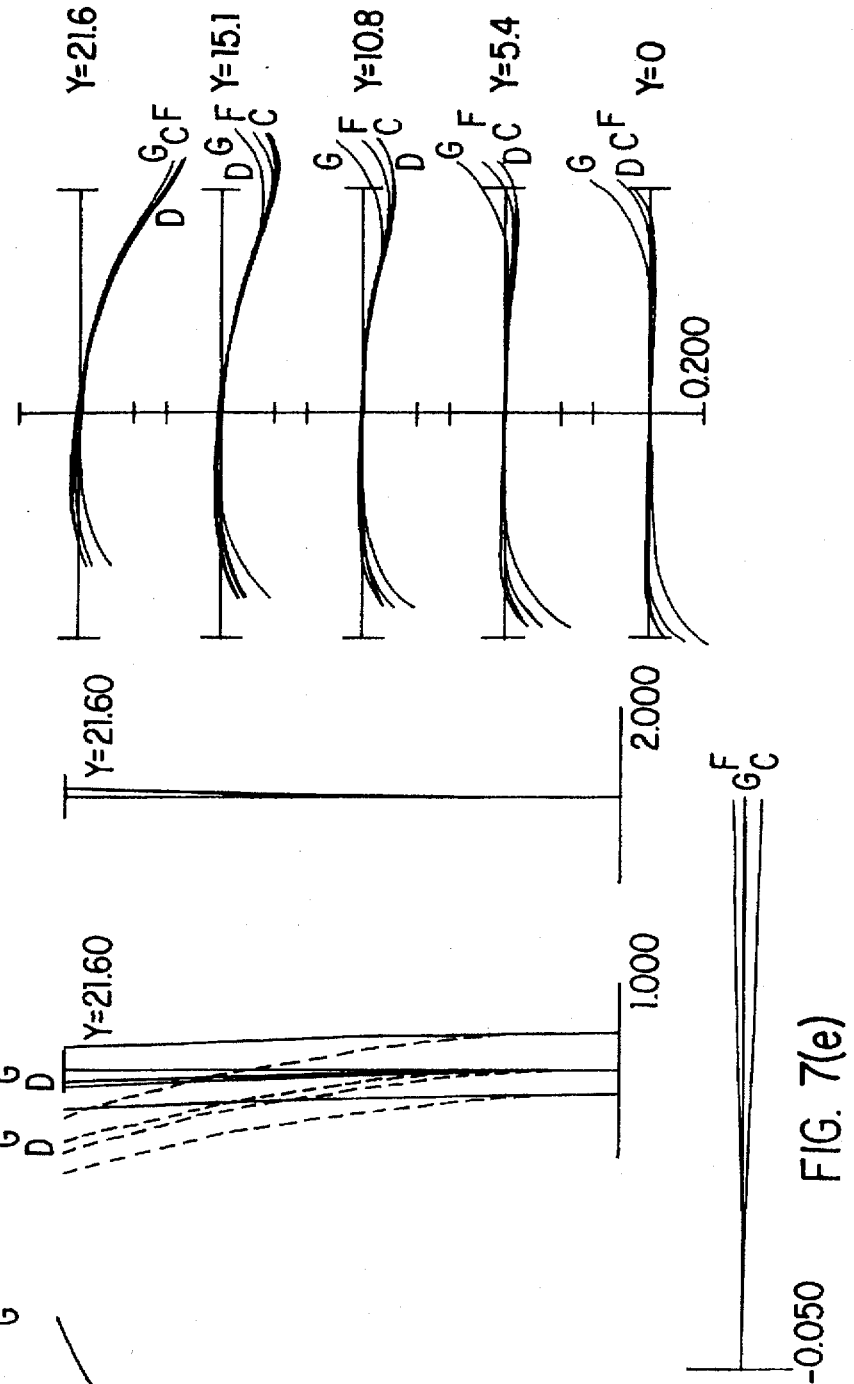

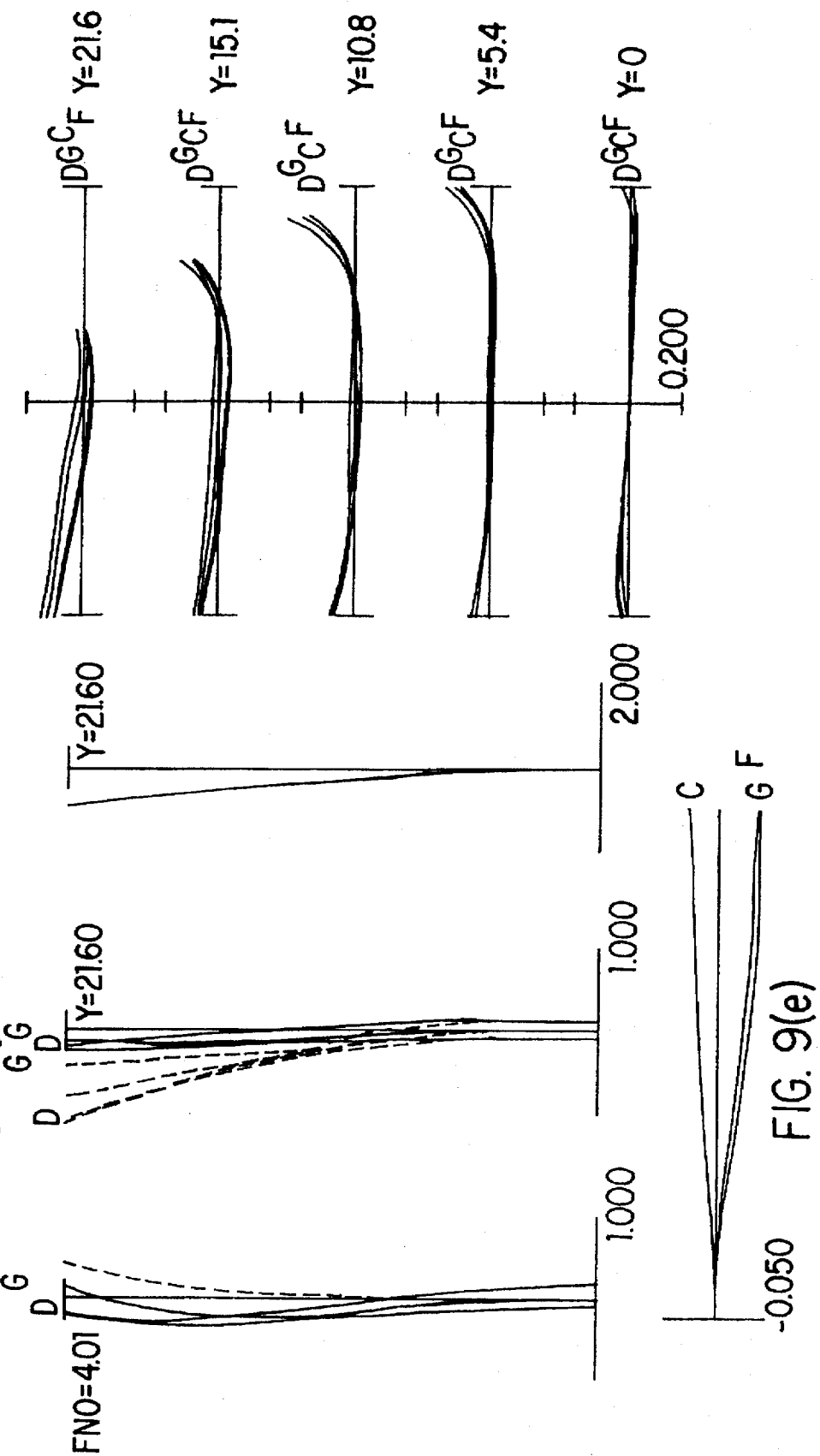

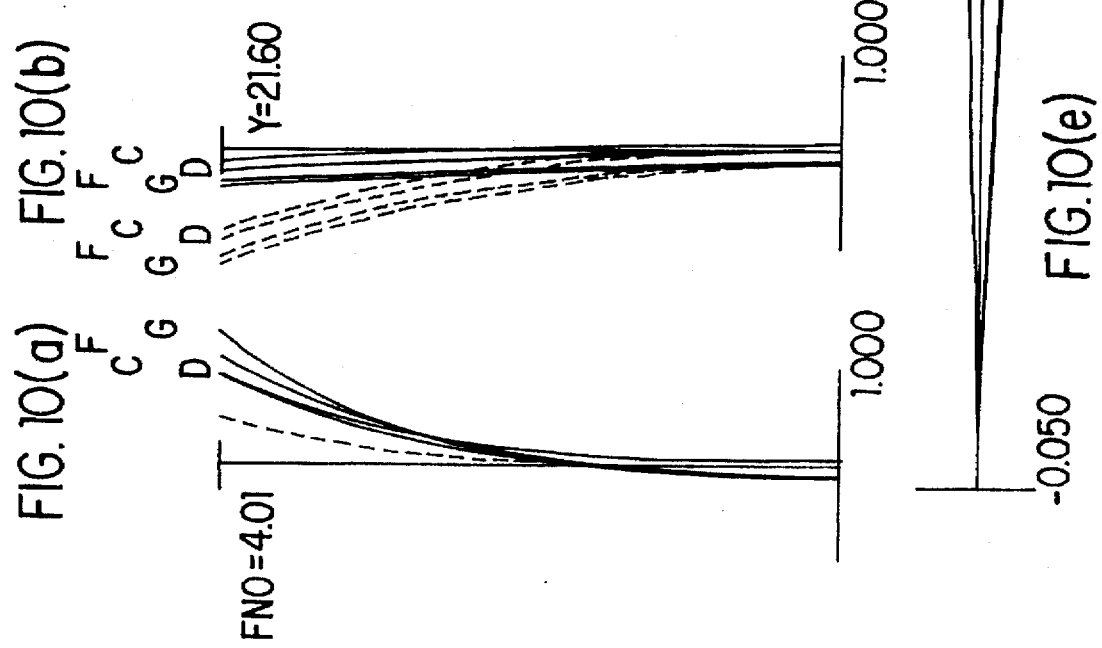

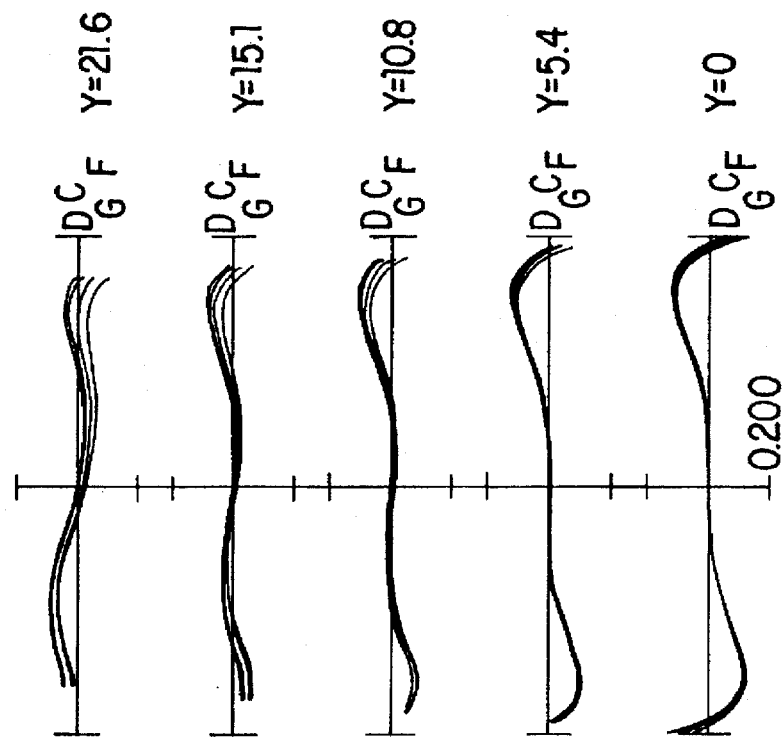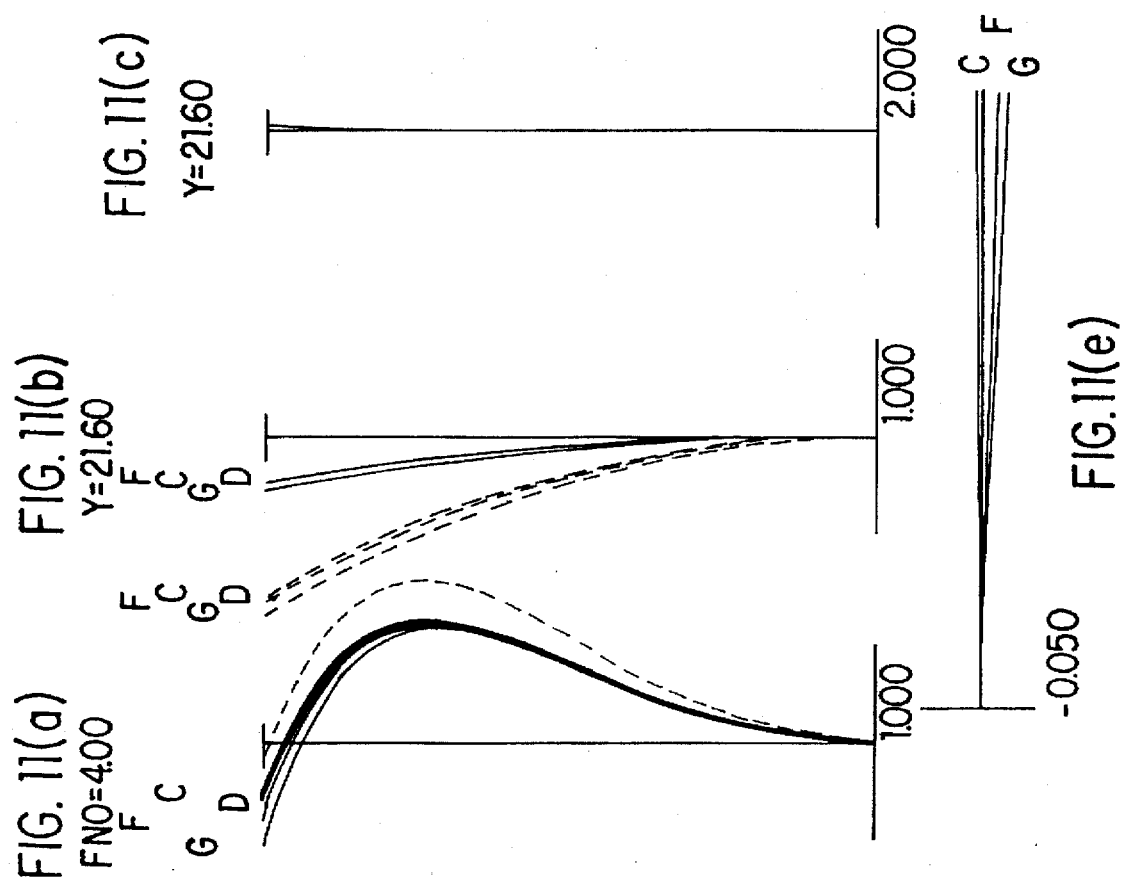

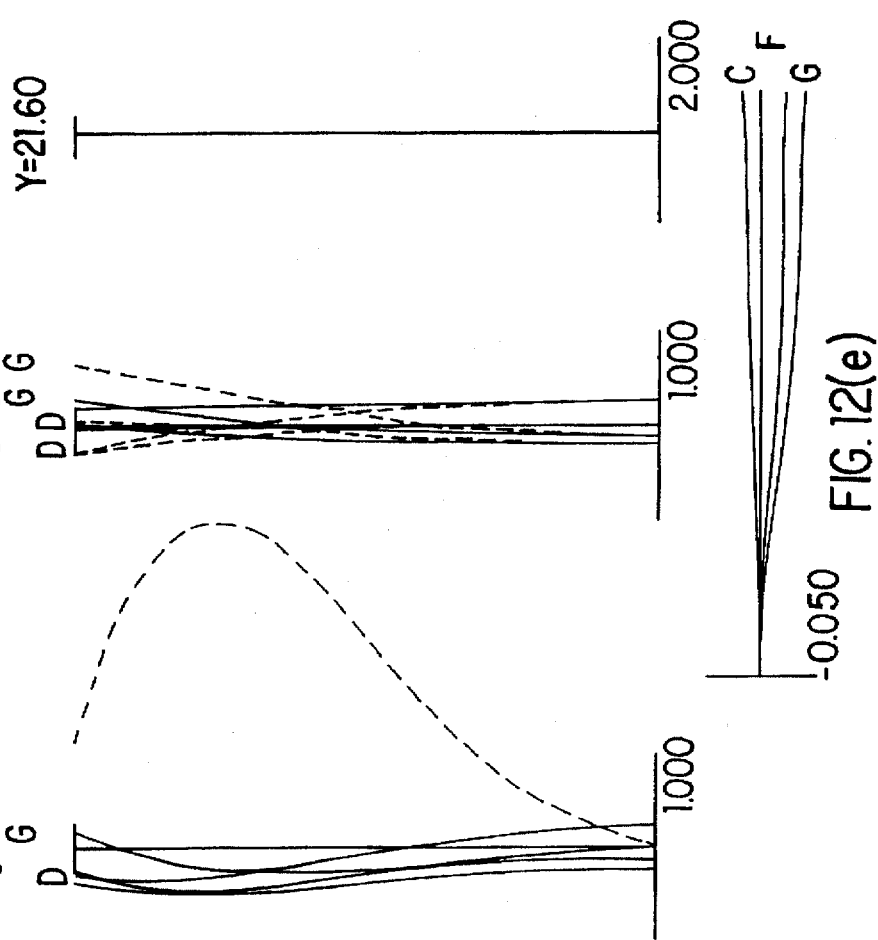

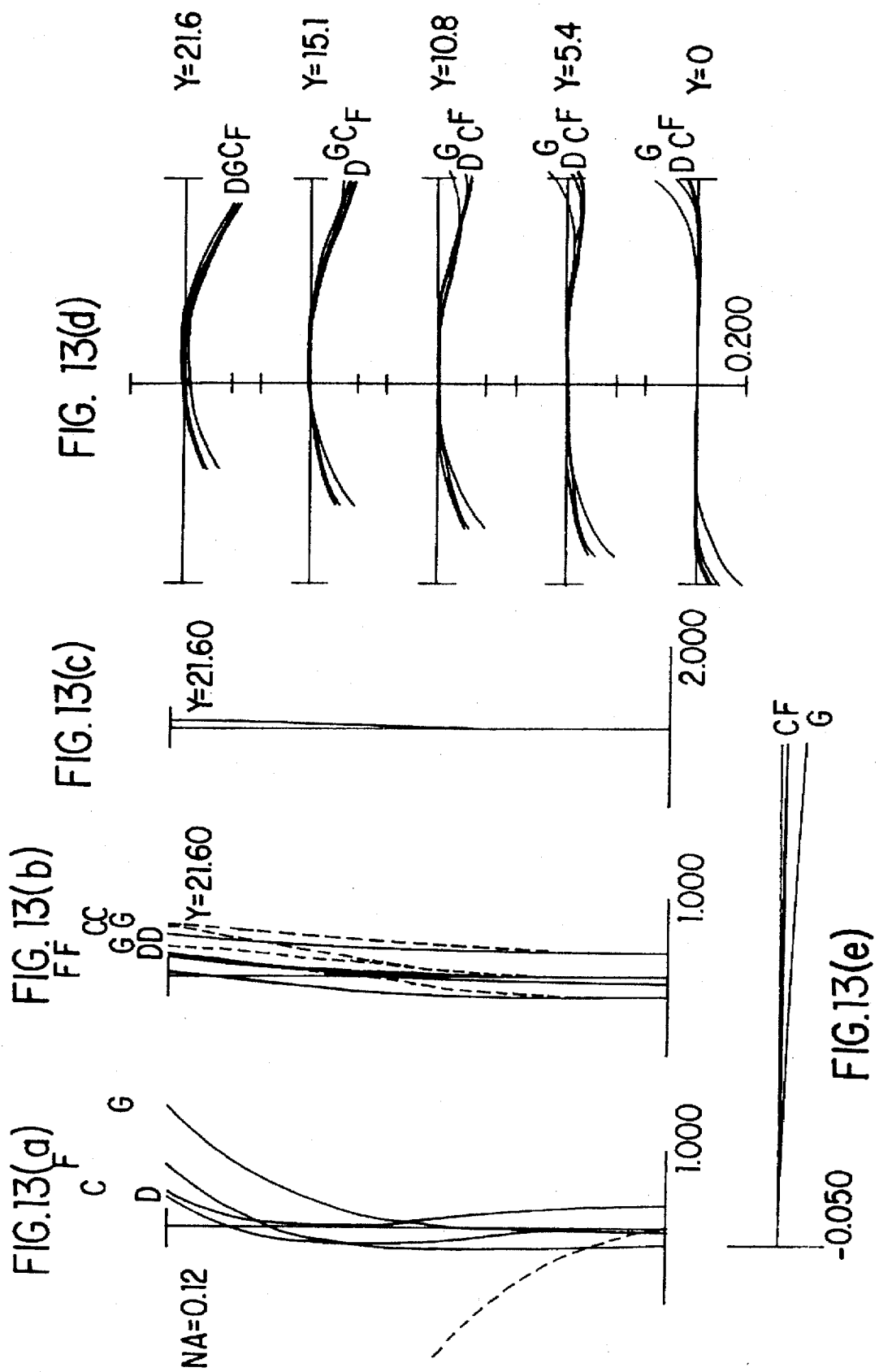

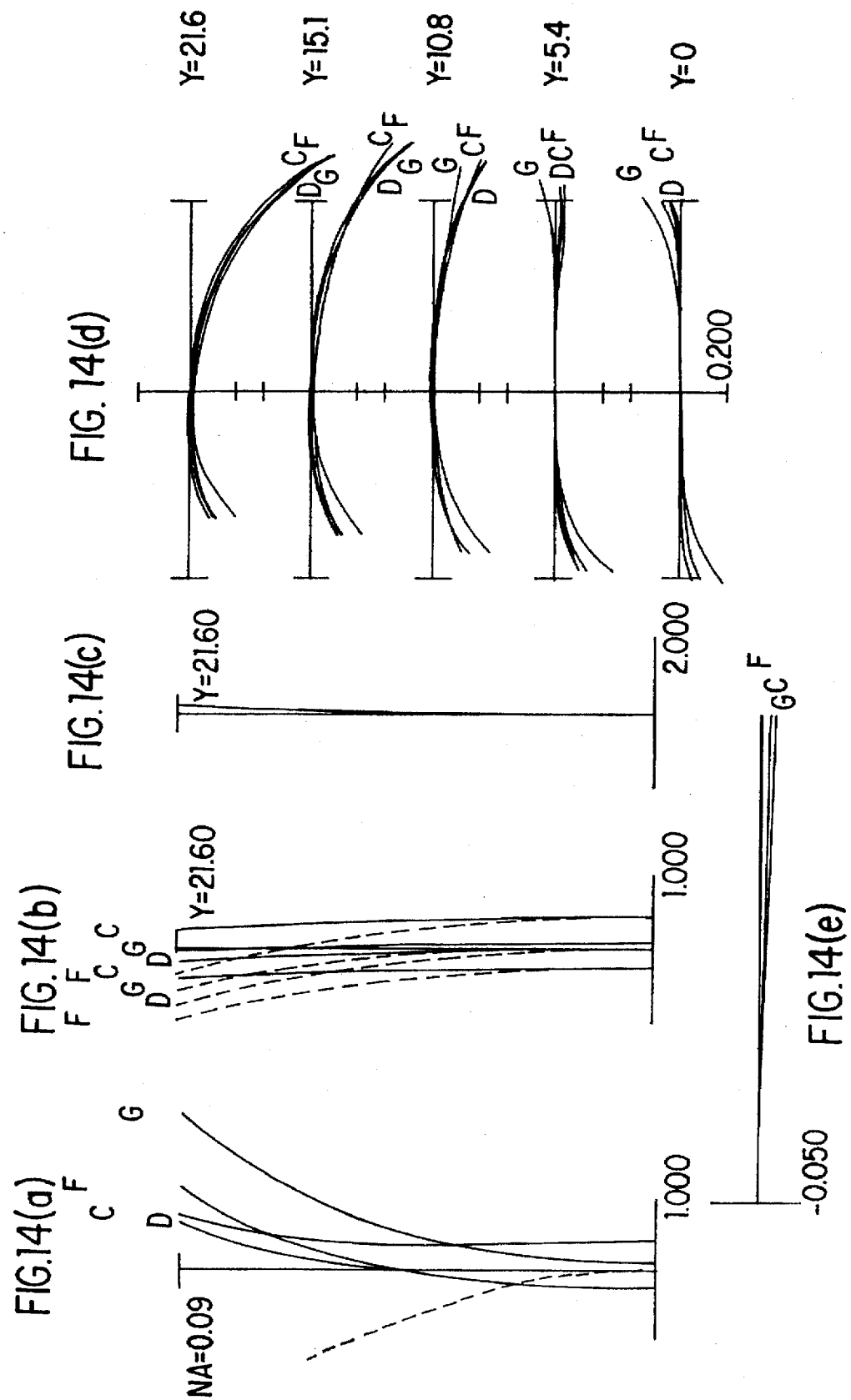

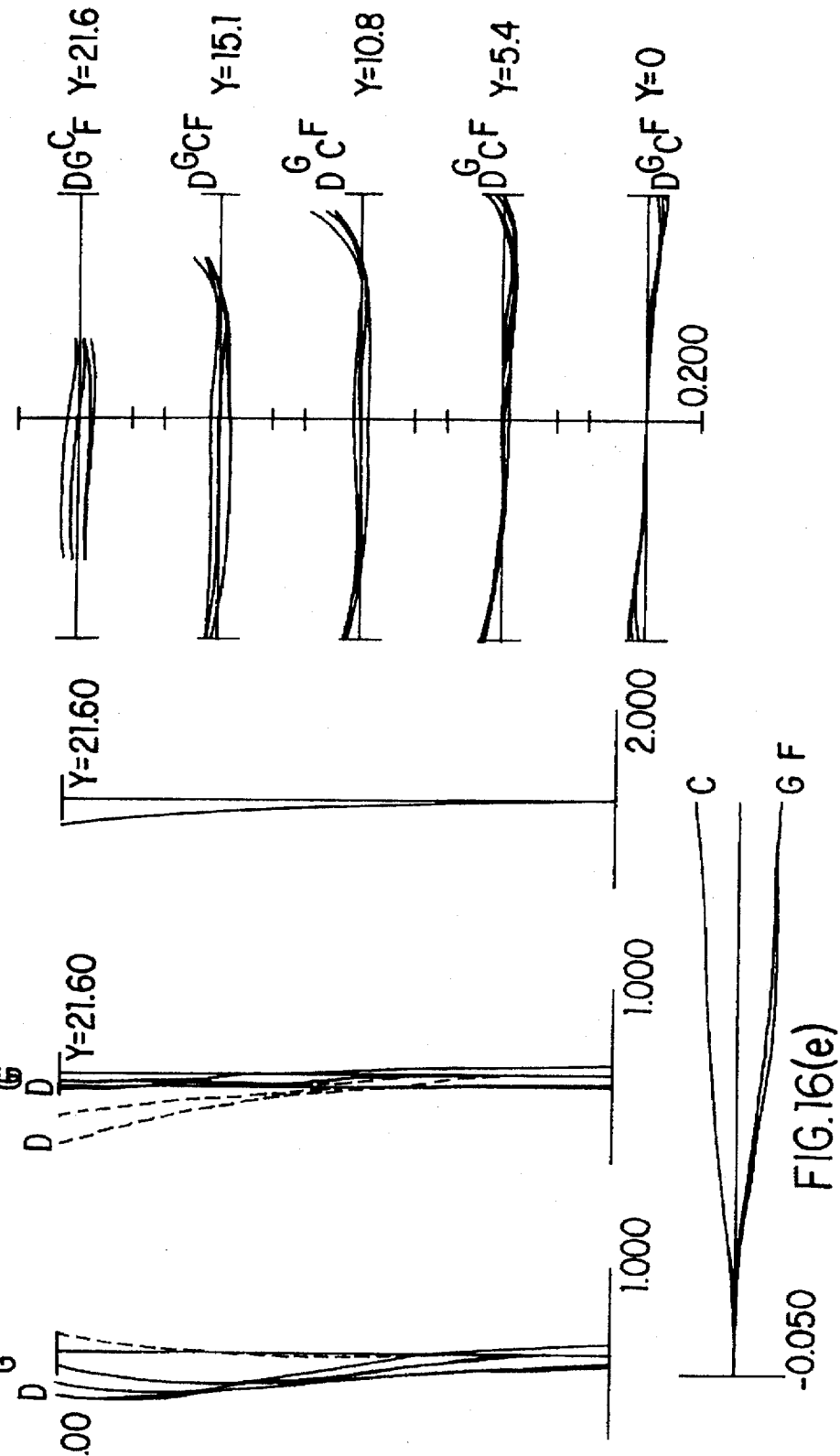

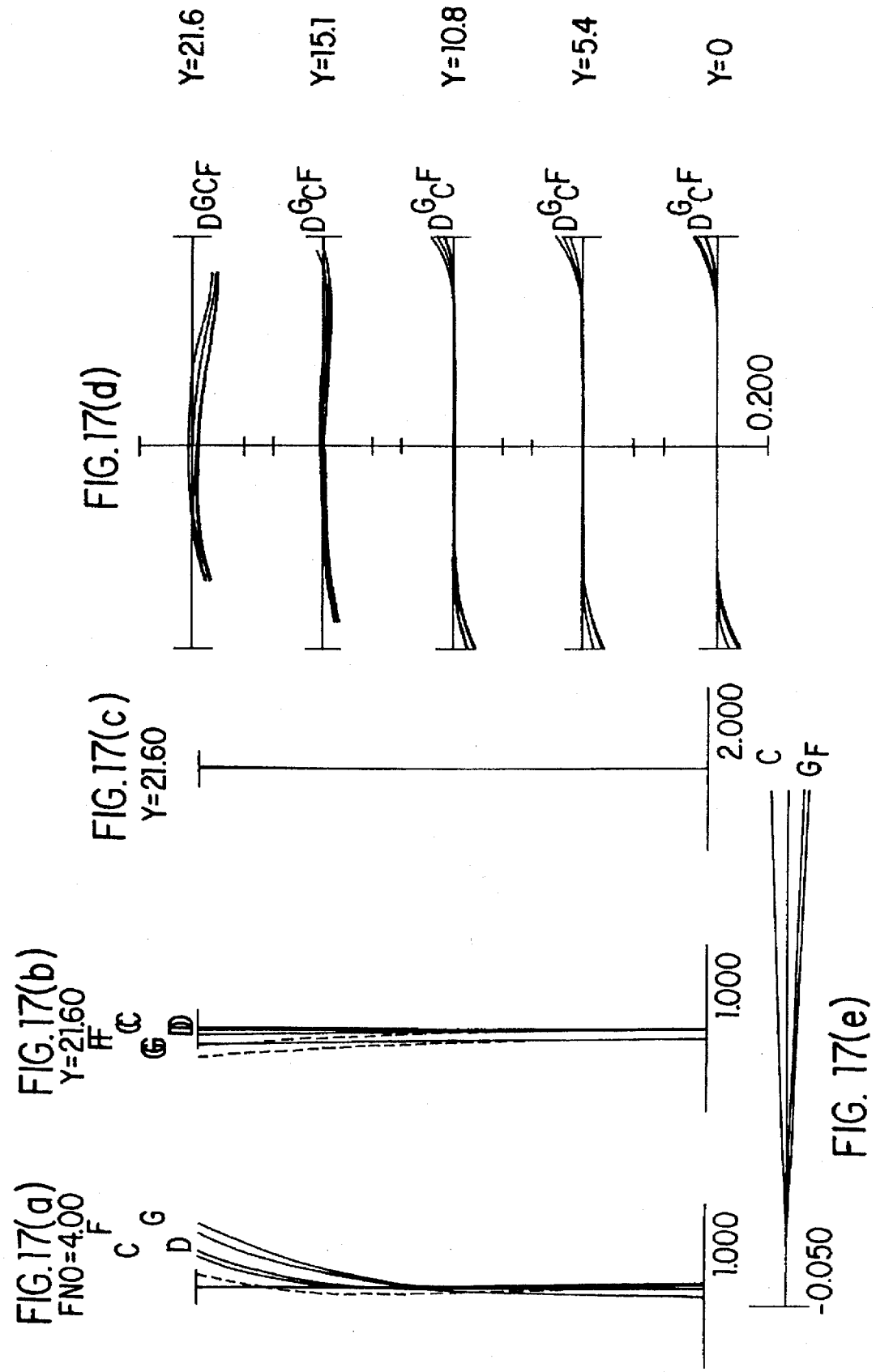

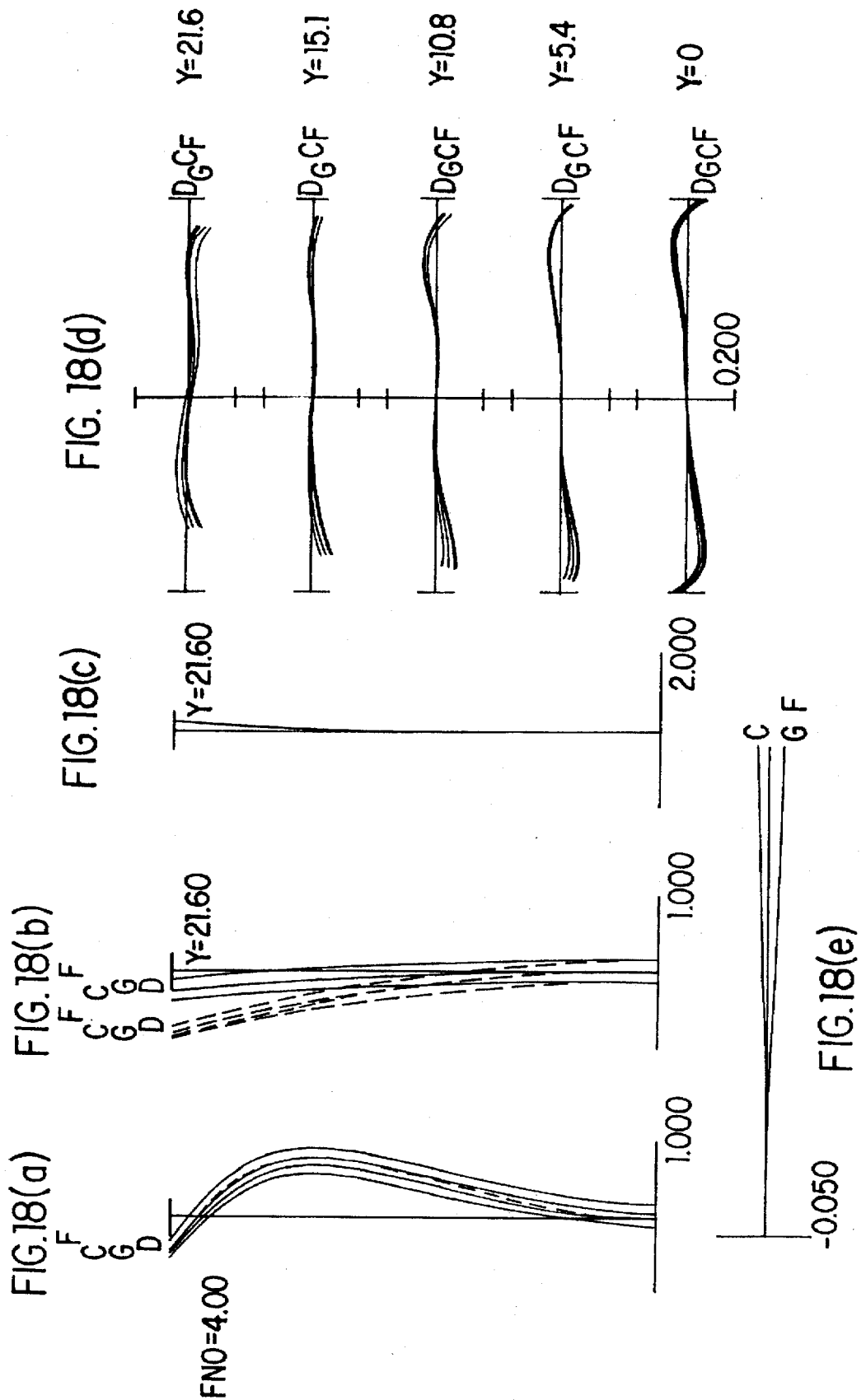

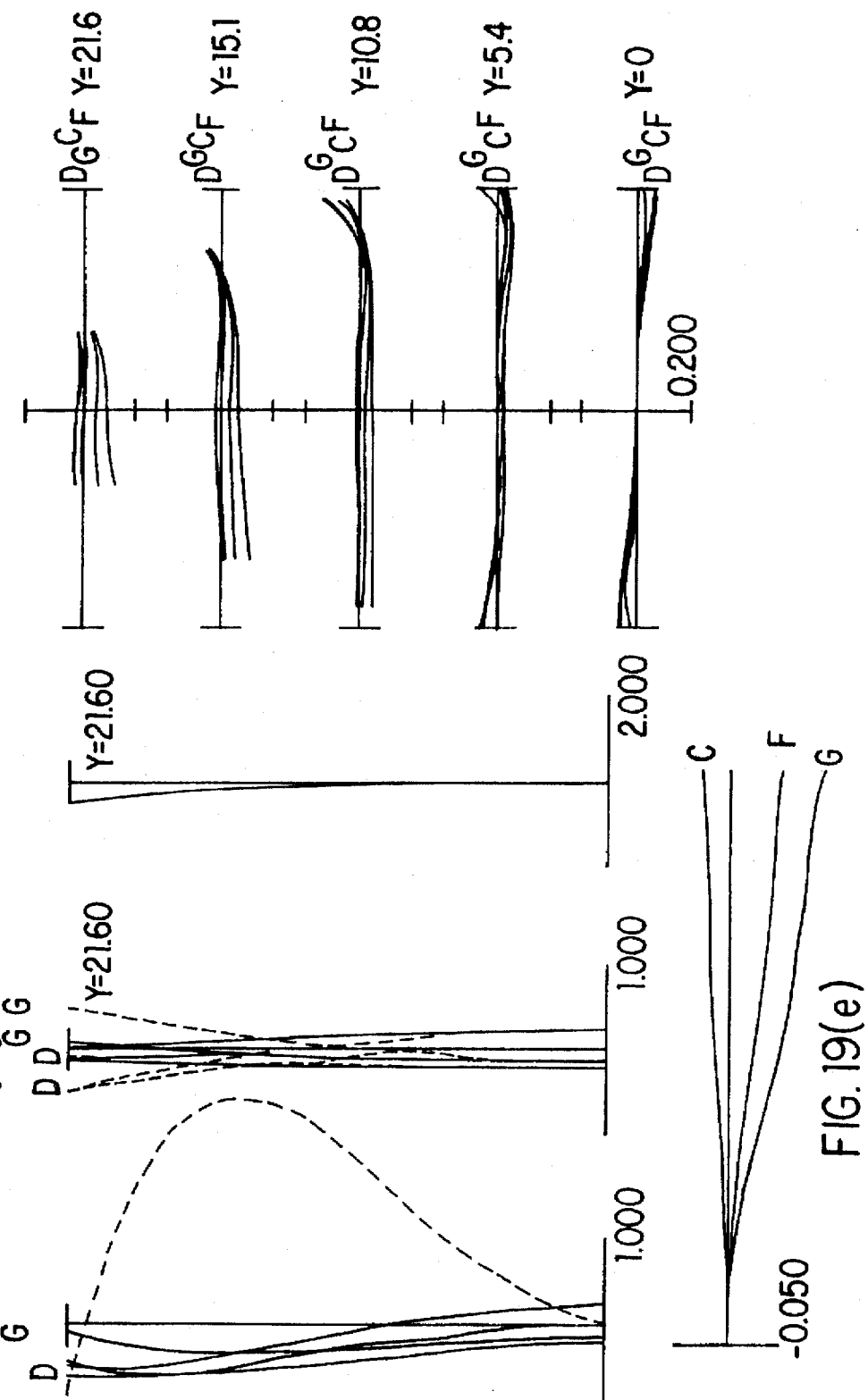

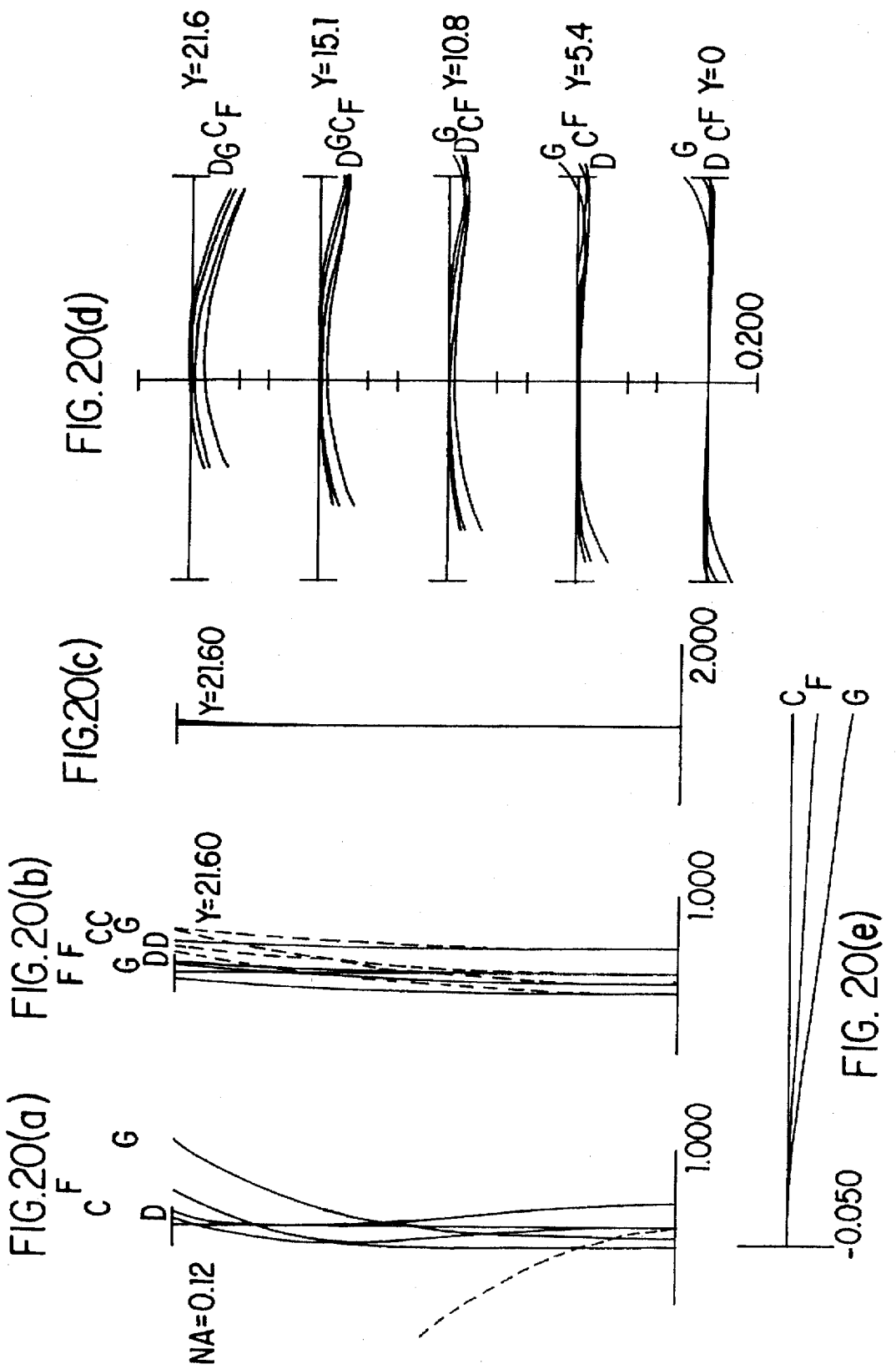

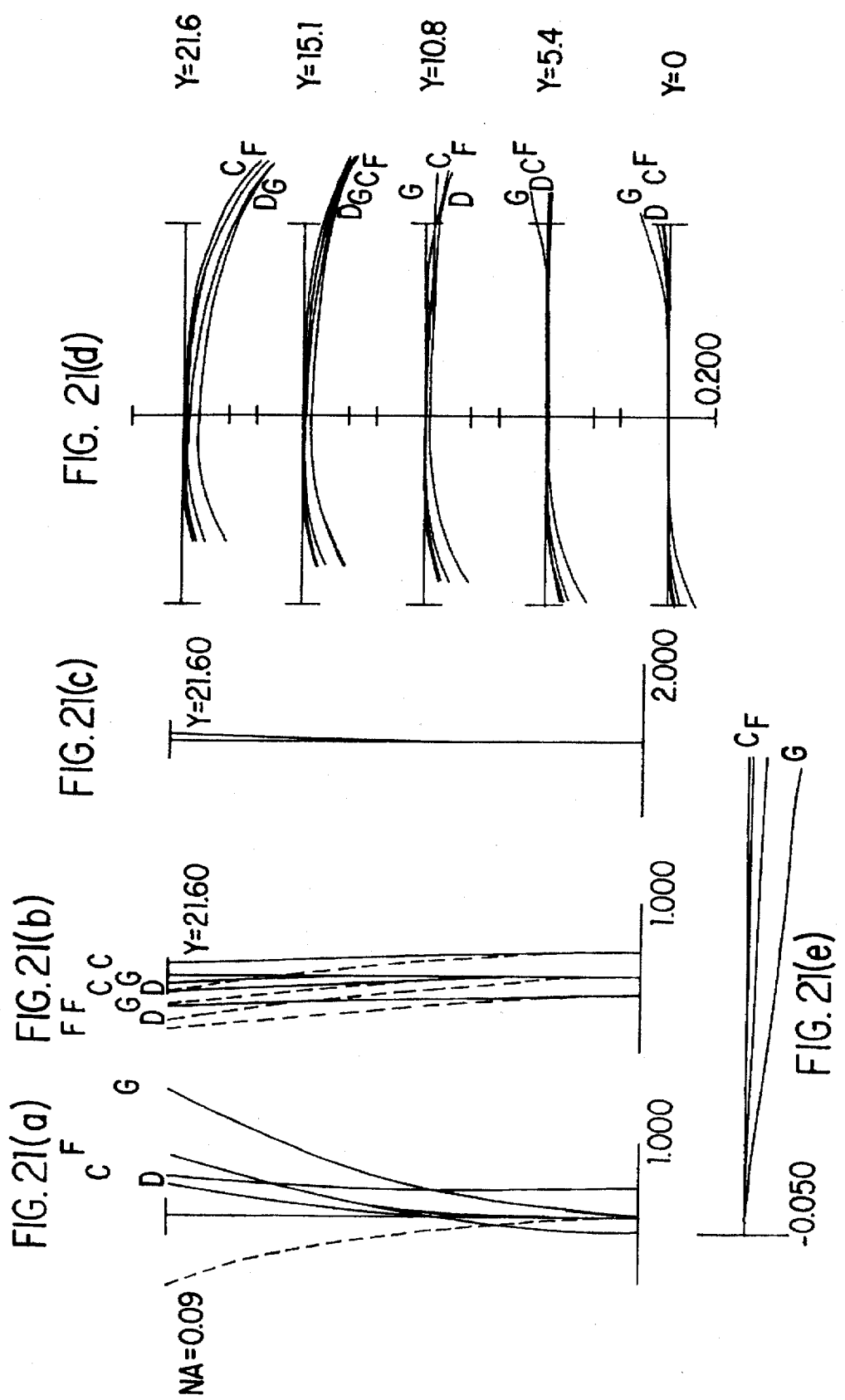

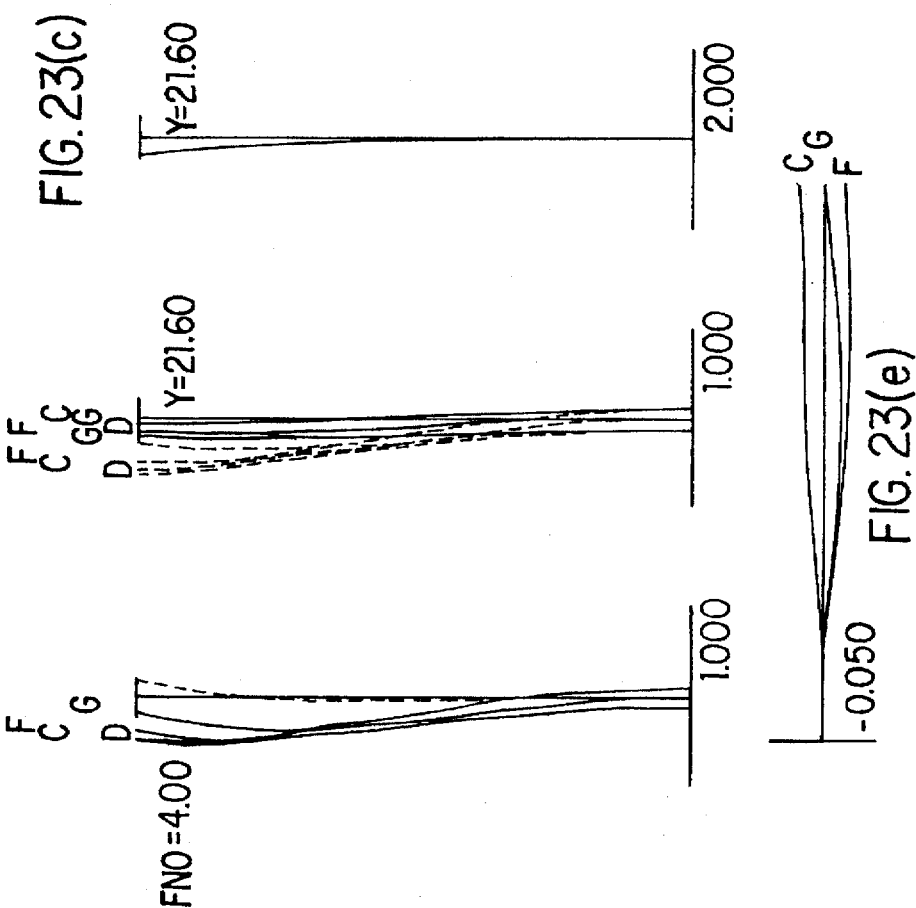

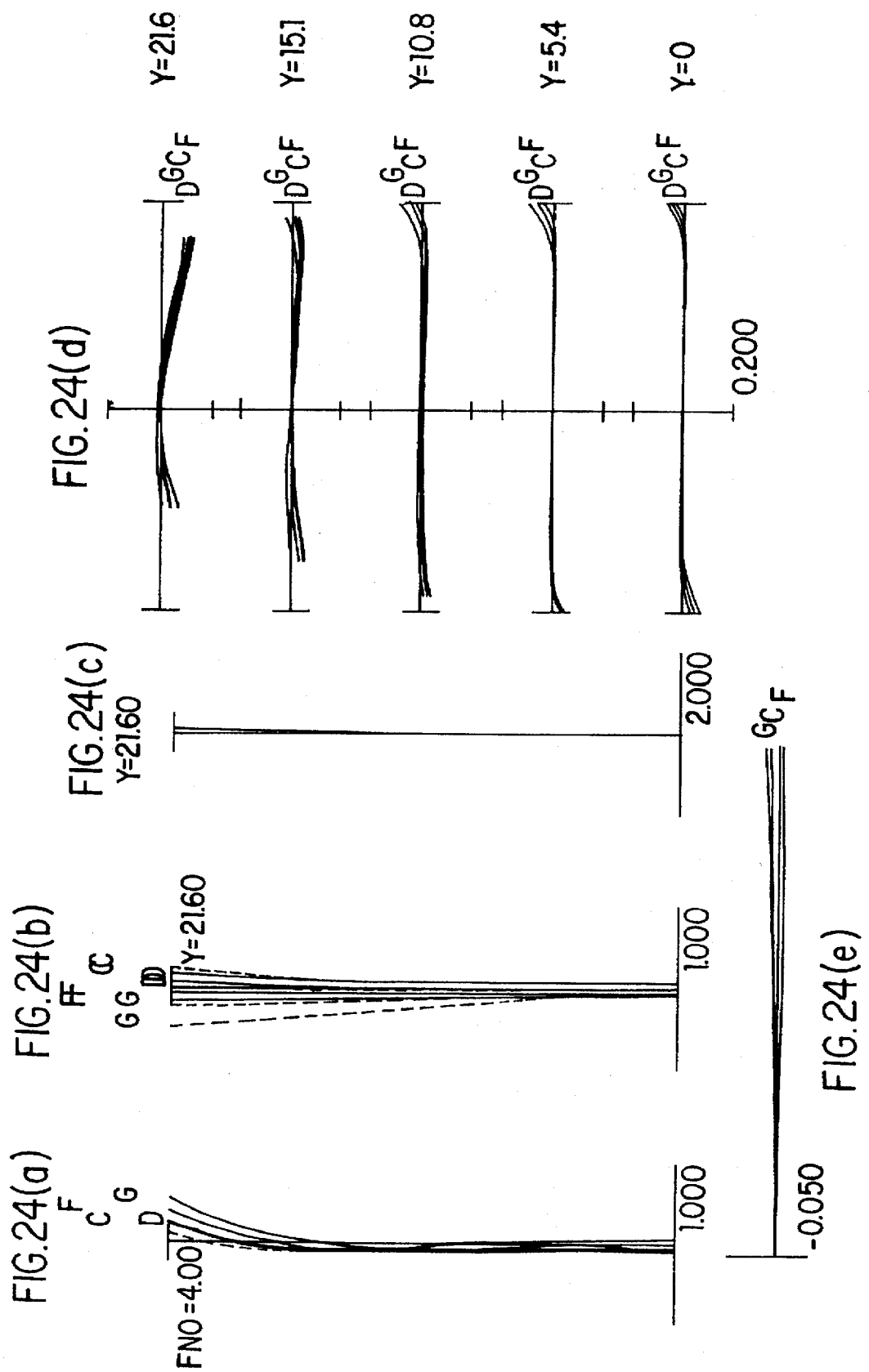

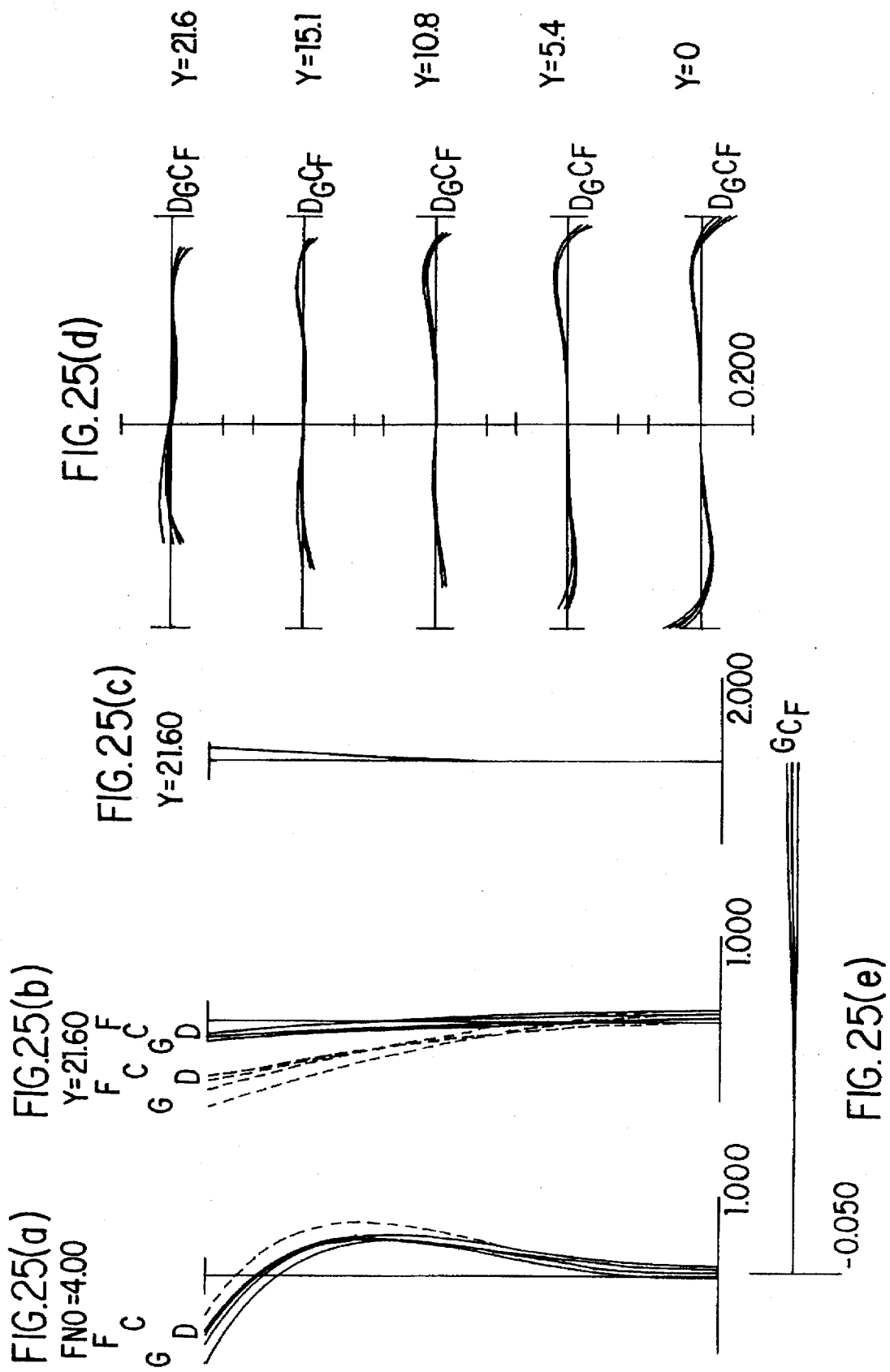

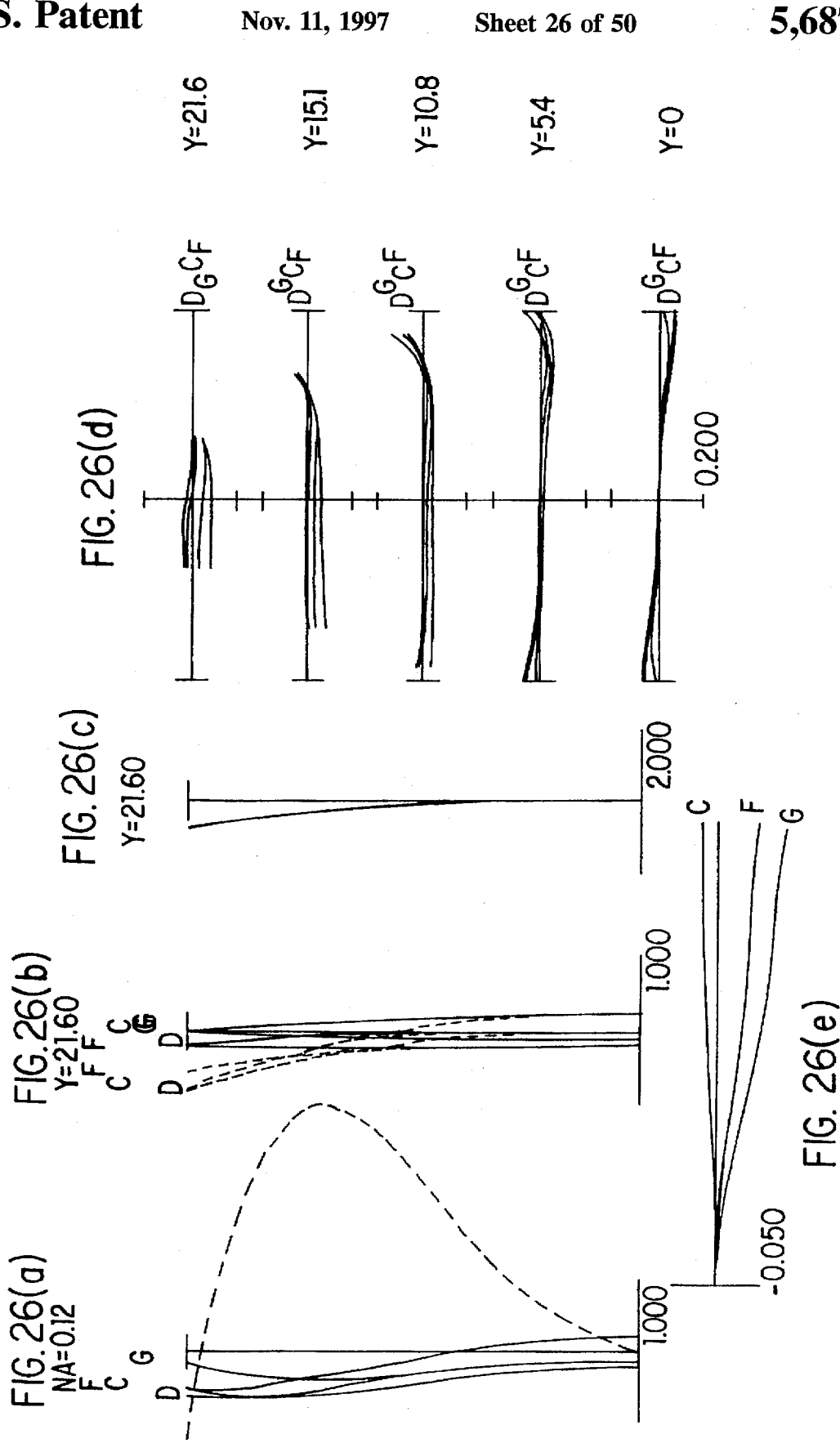

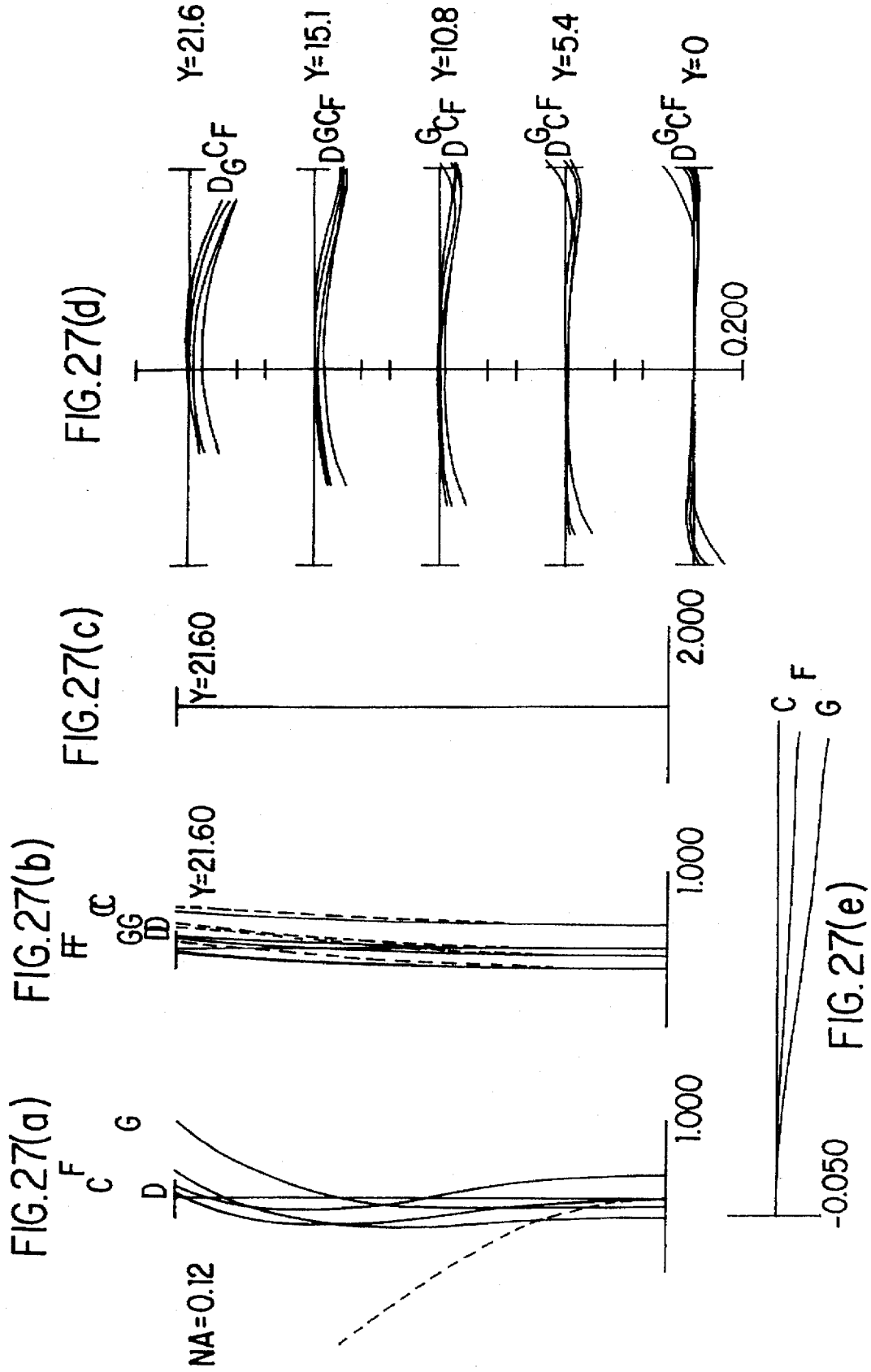

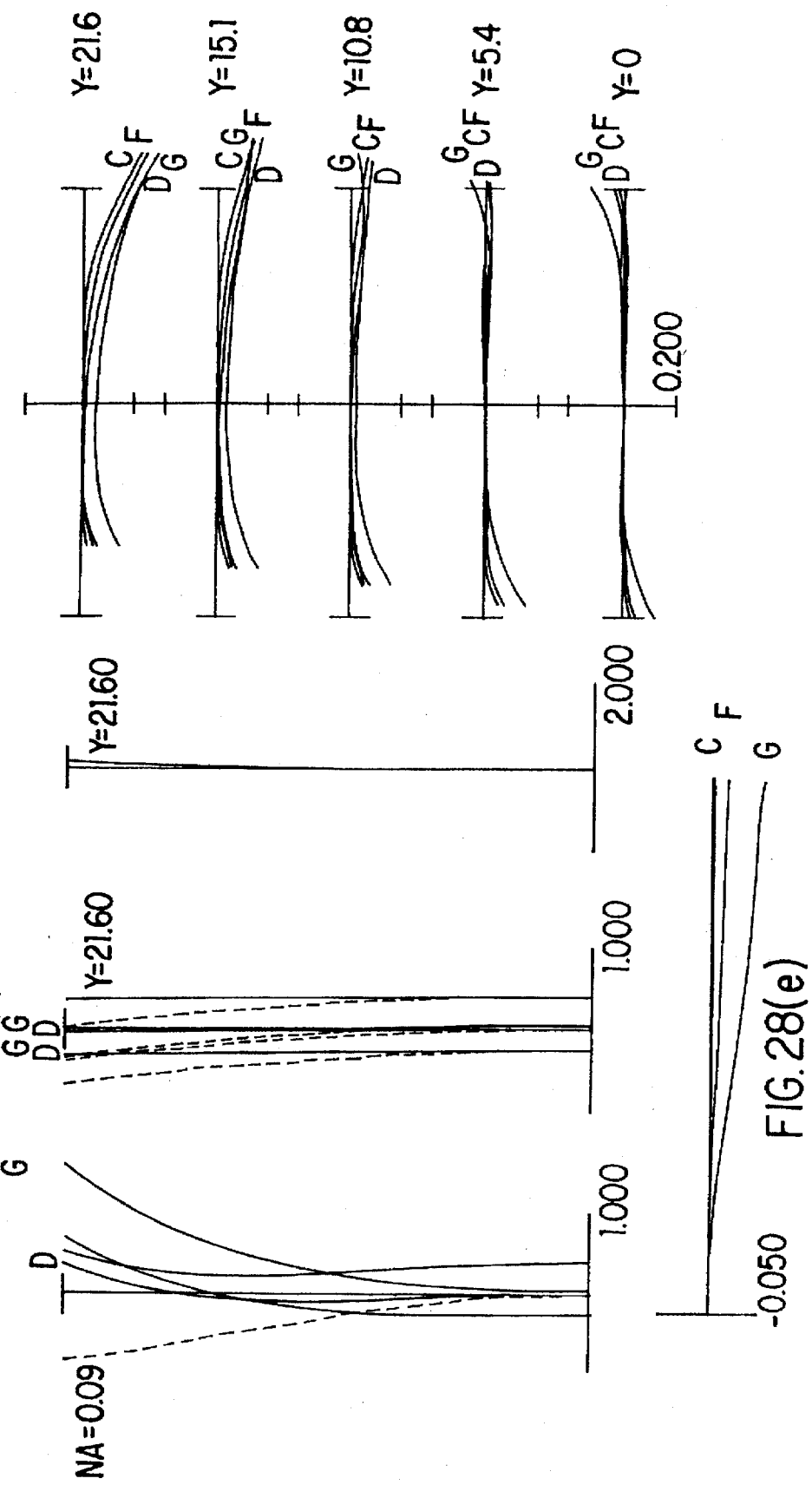

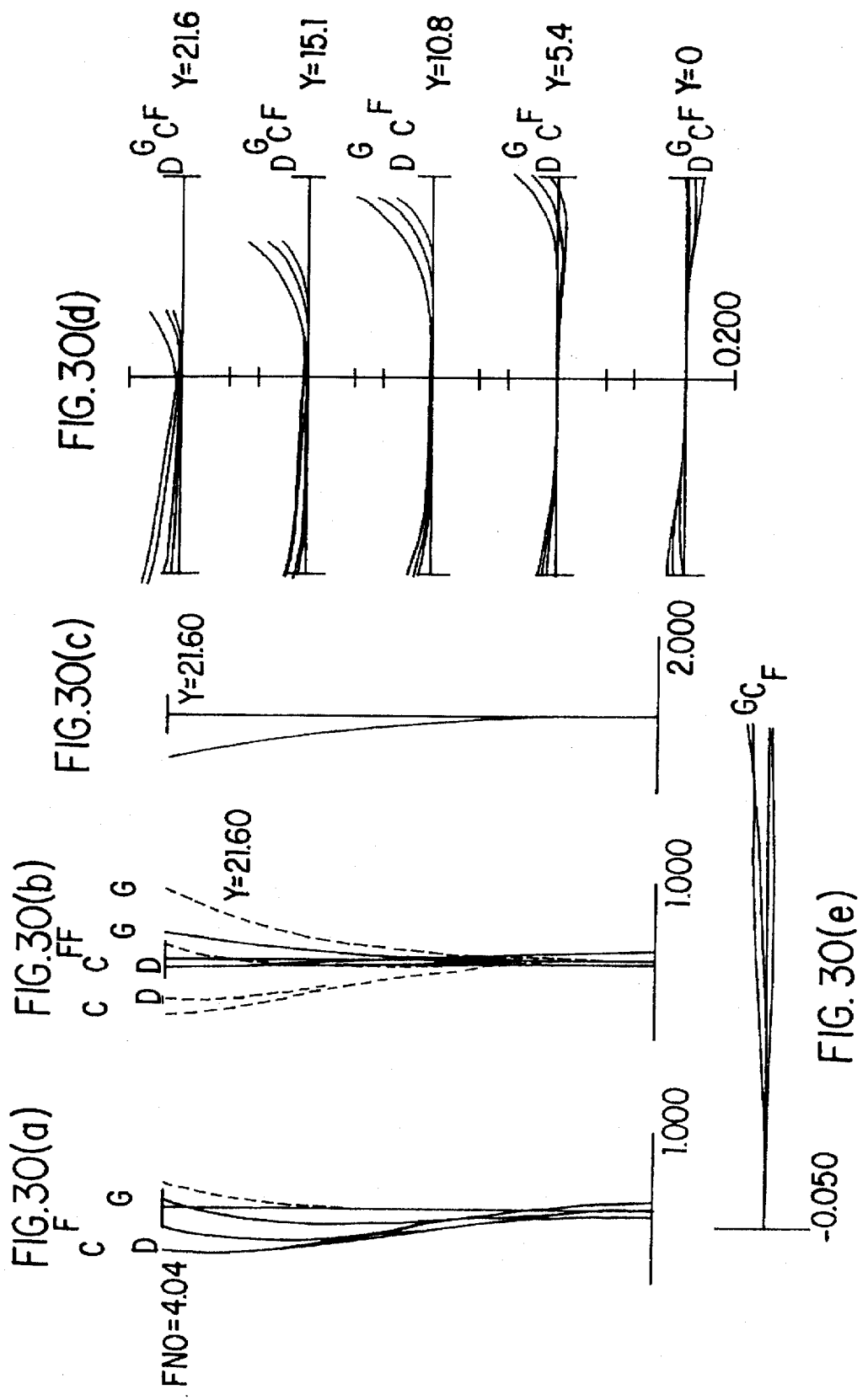

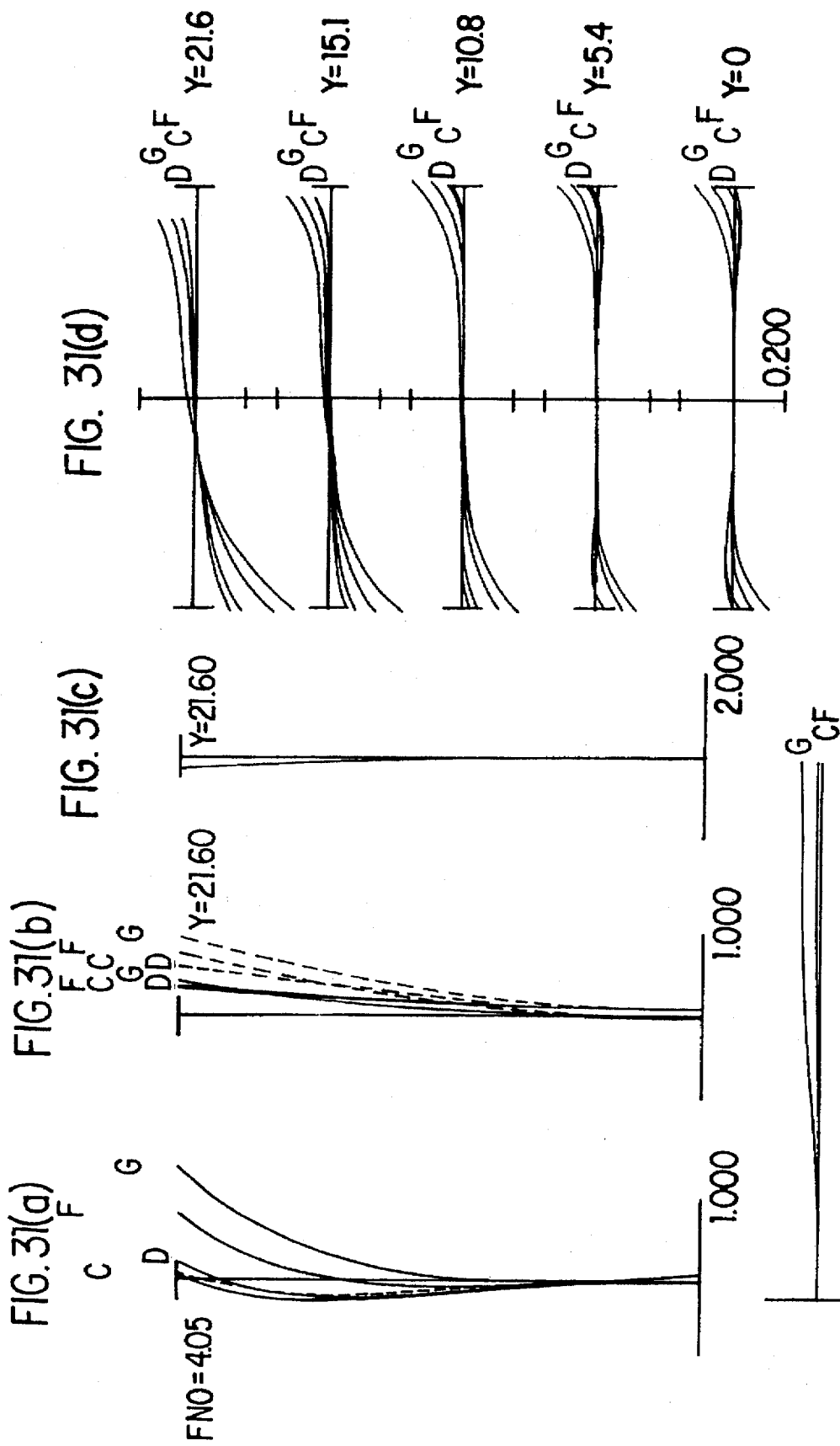

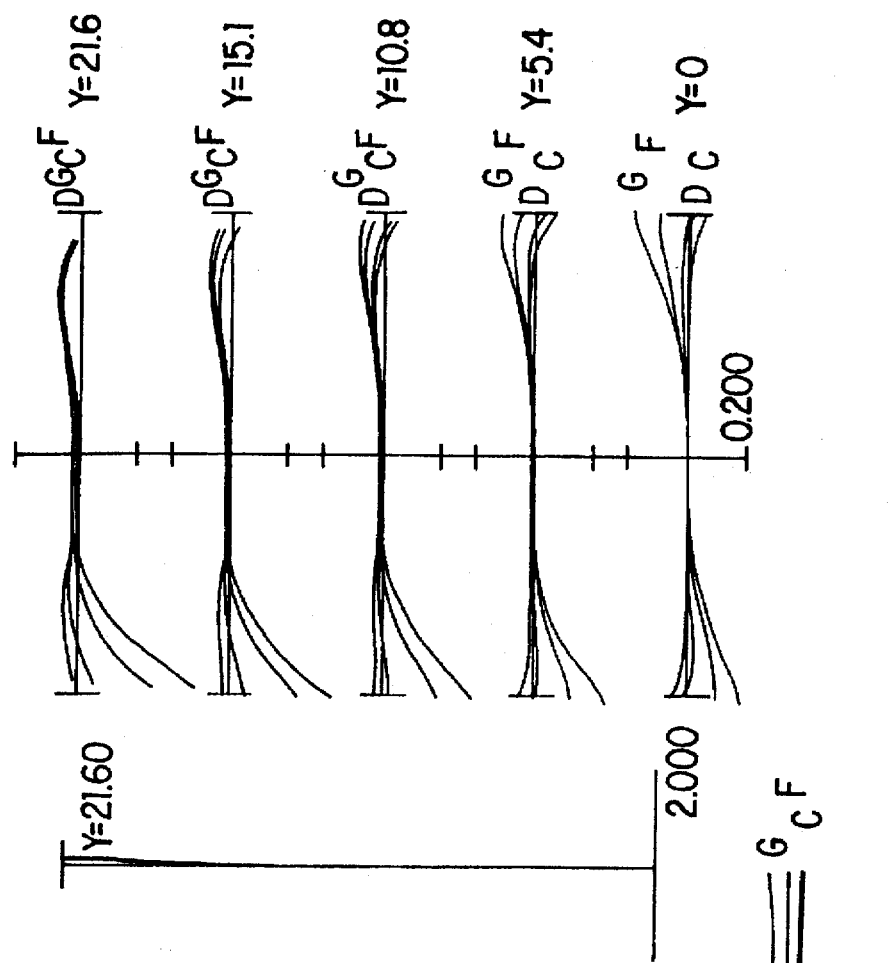
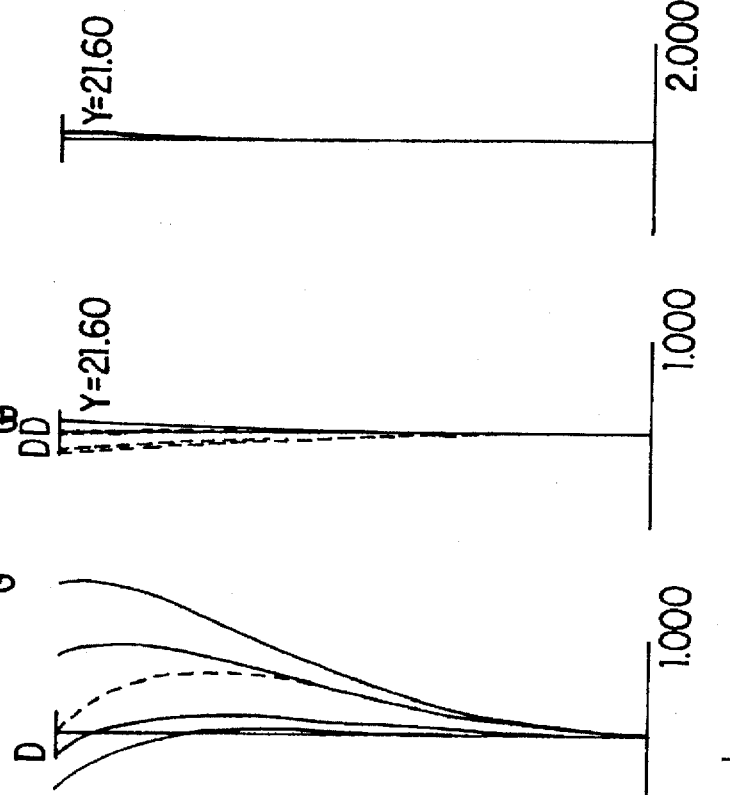
FIG. 32(a) FIG. 32(b) FIG. 32(c) FIG. 32(d) FIG. 32(e)

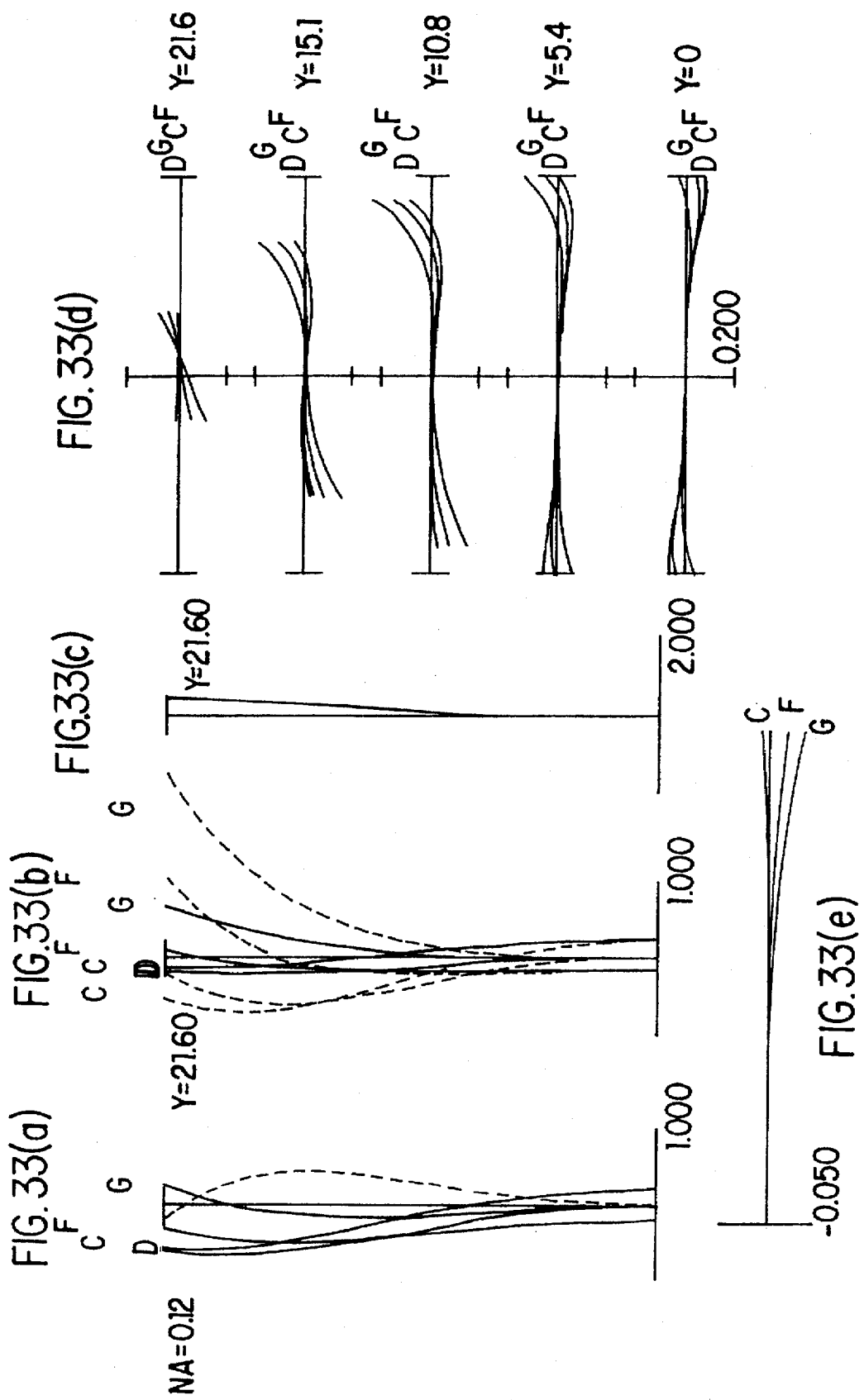

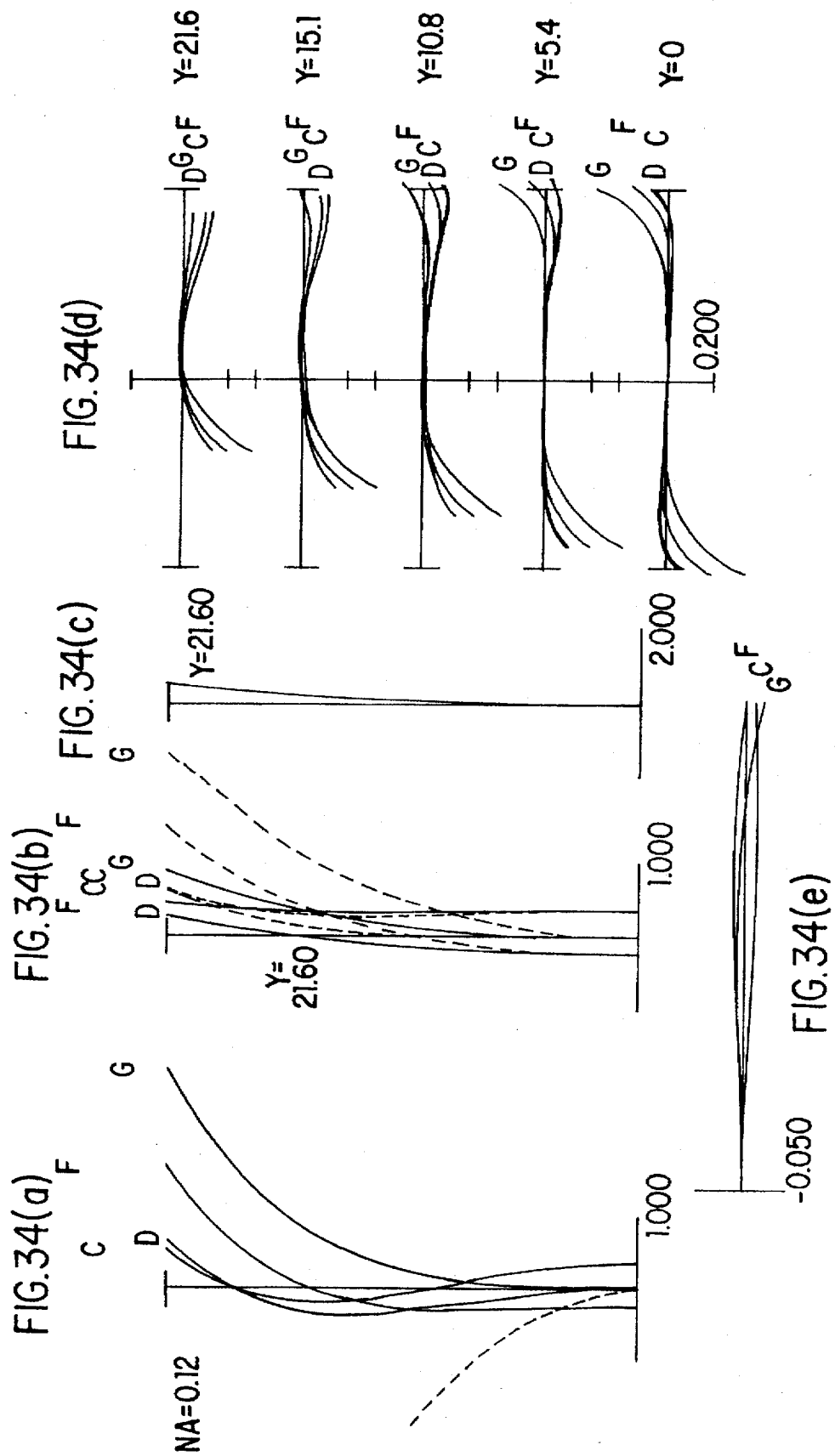

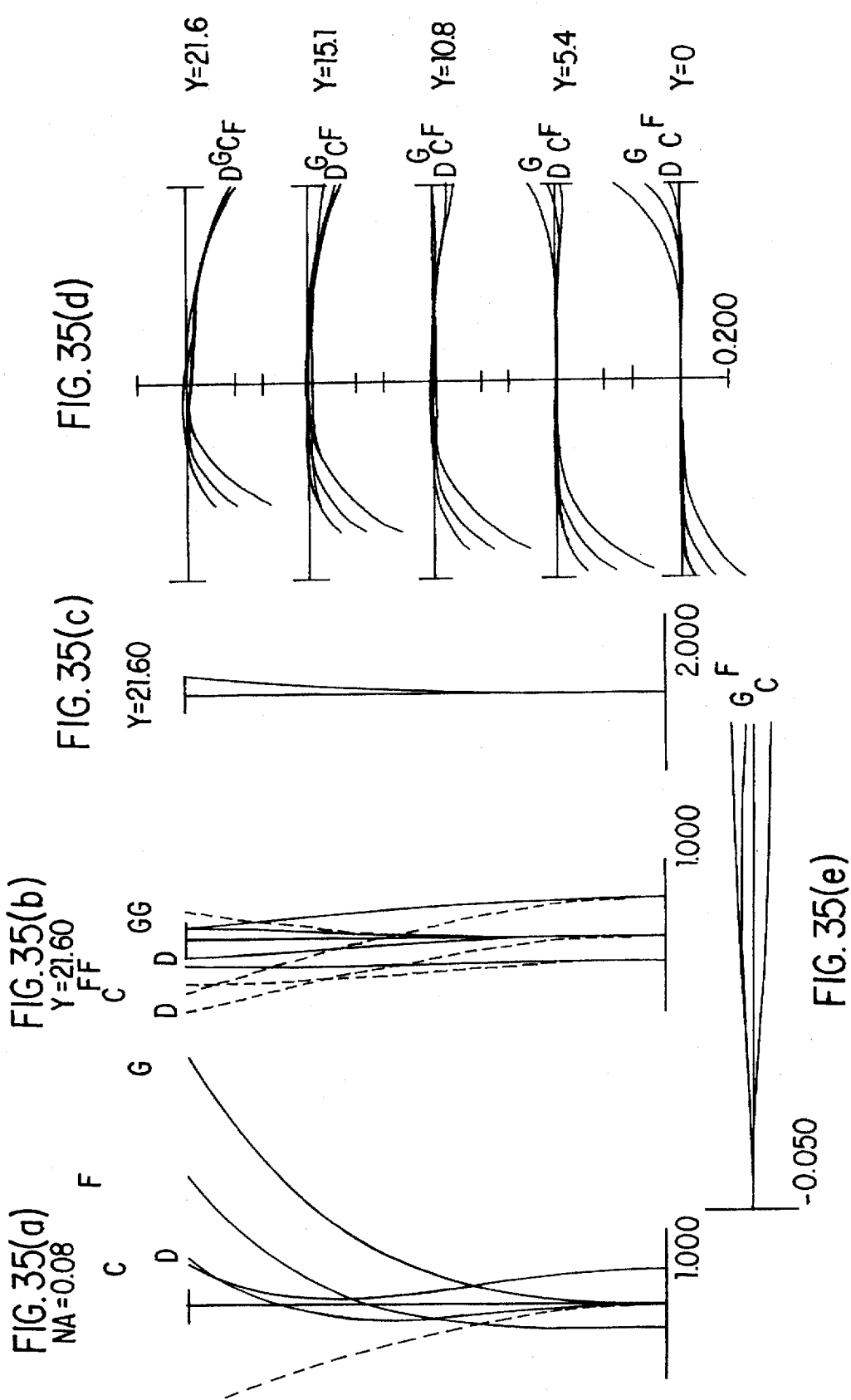

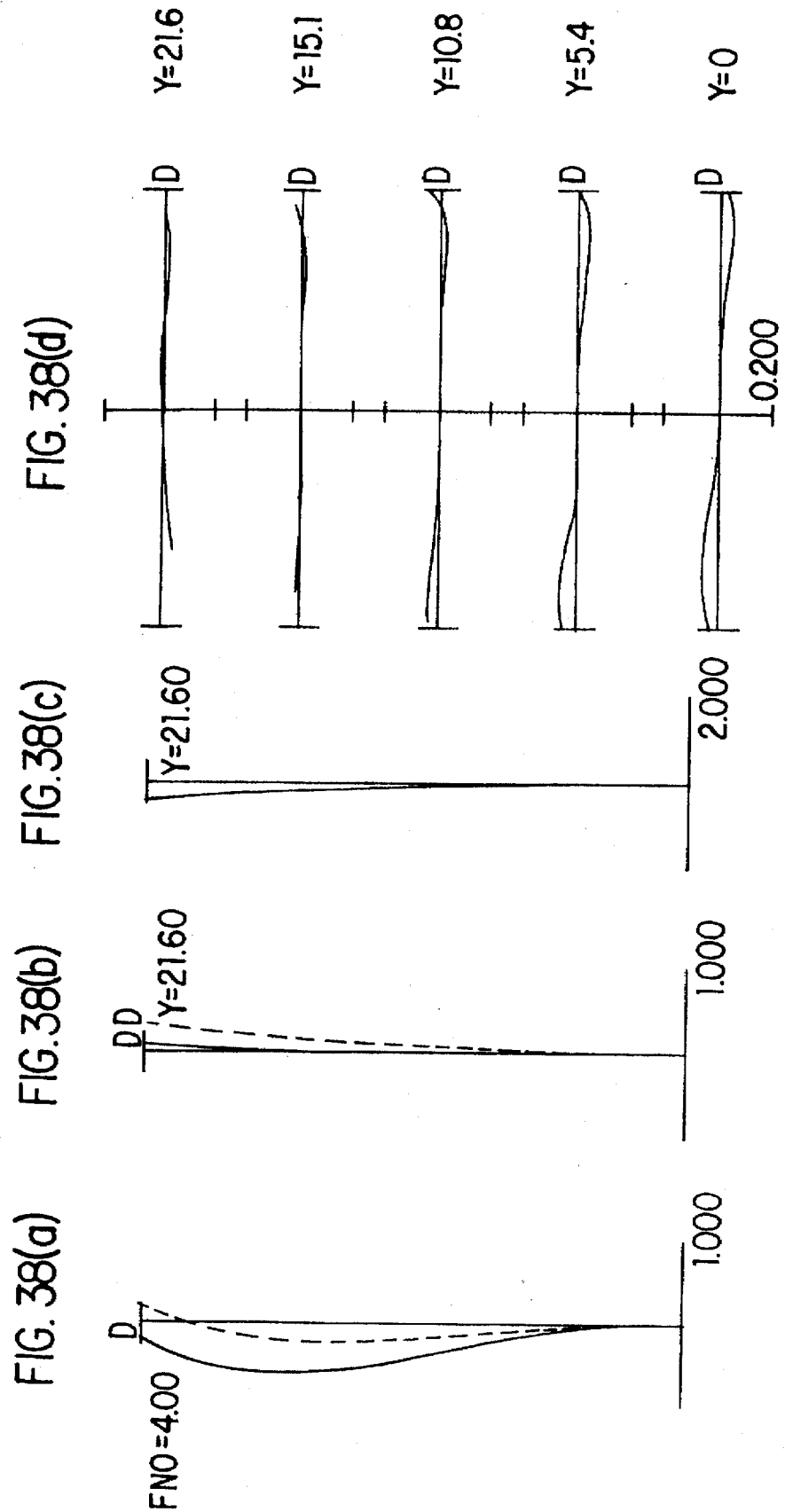

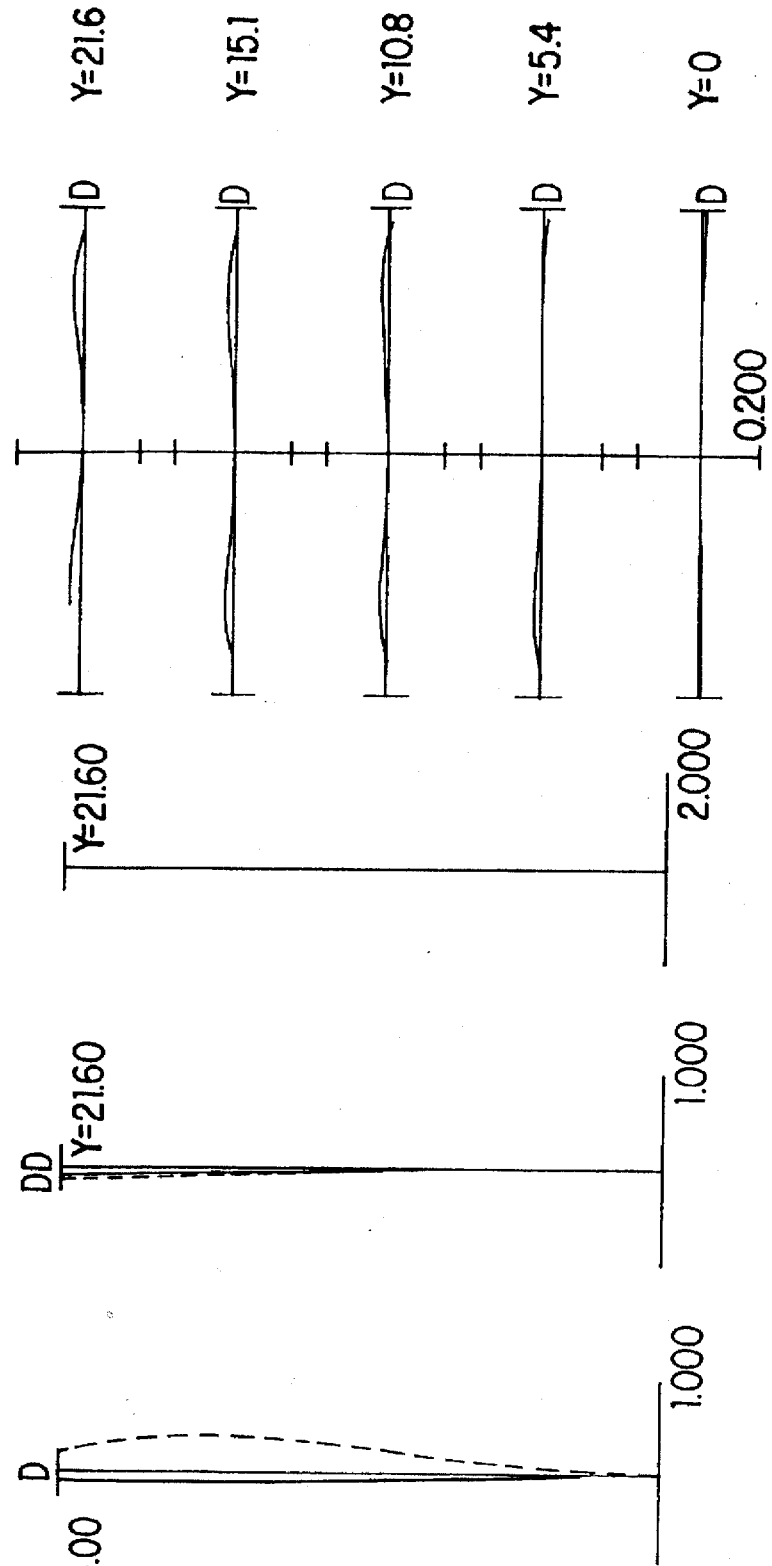

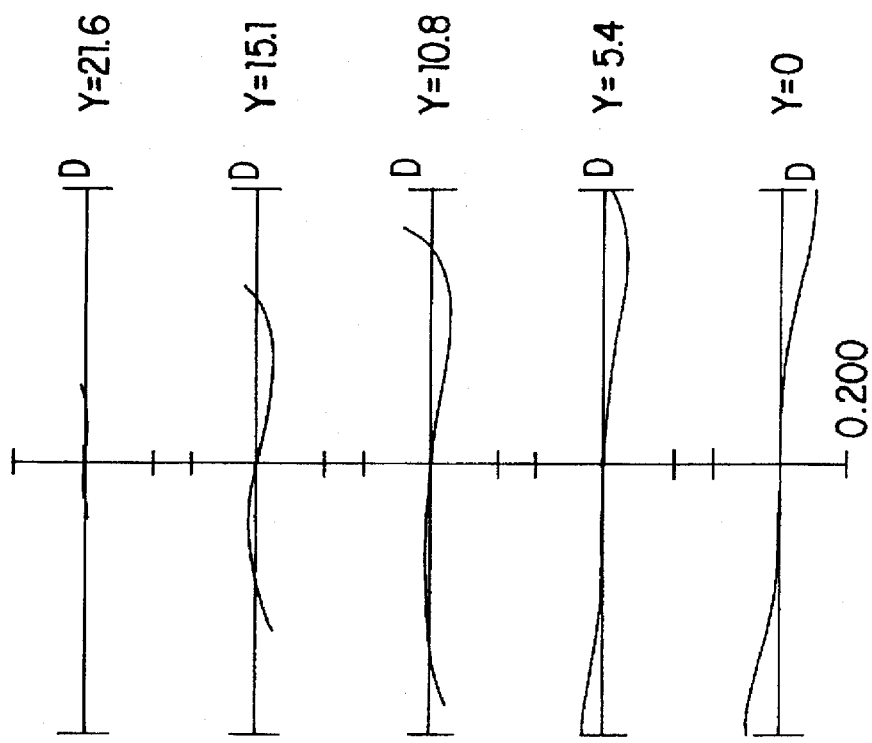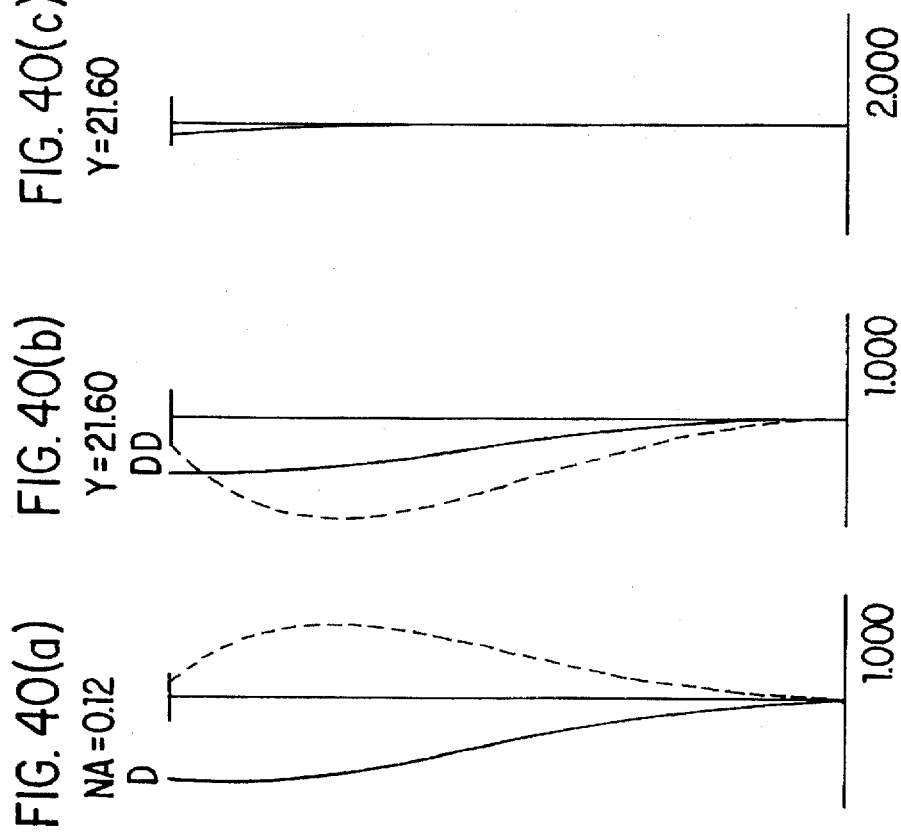

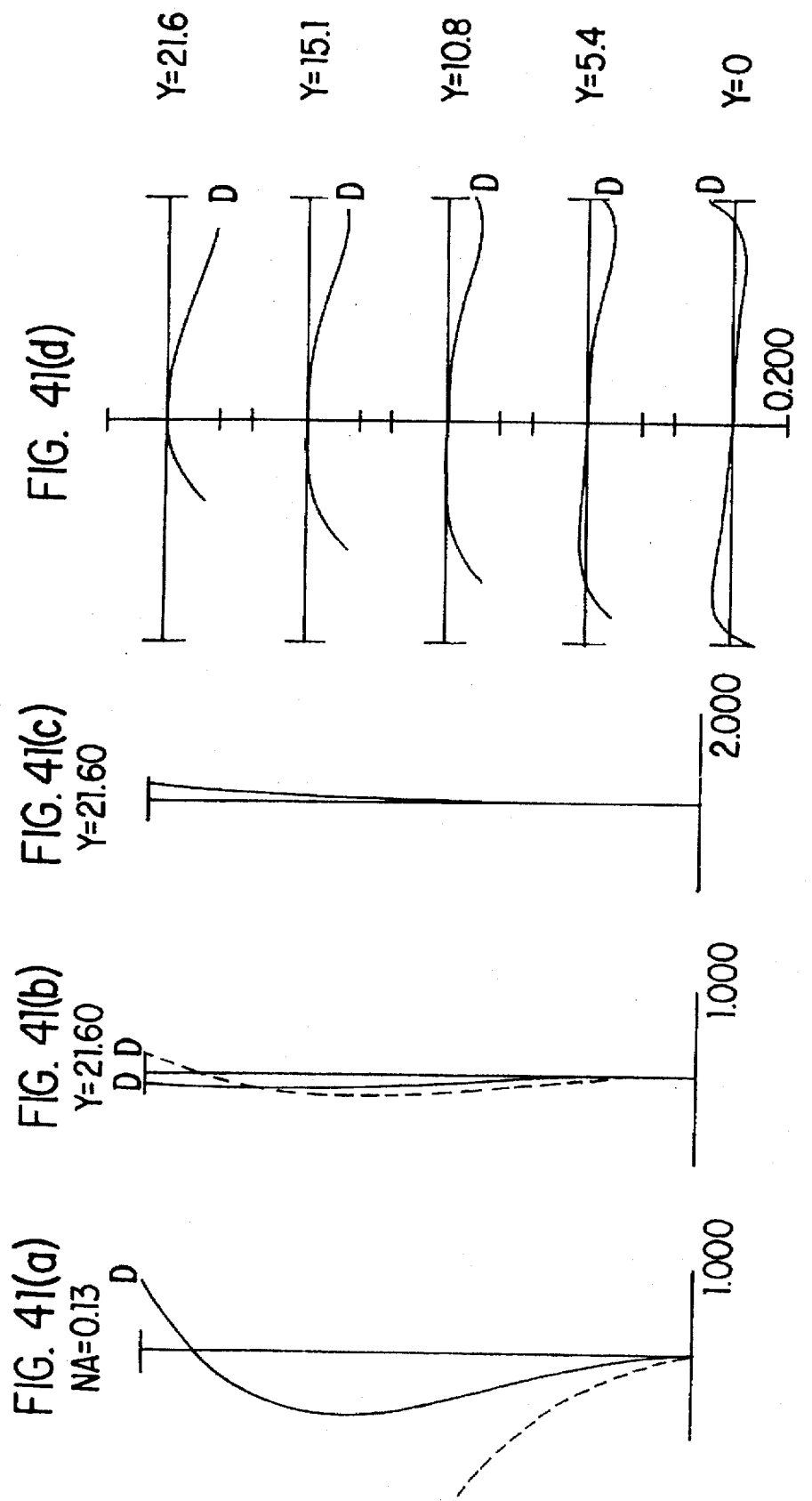

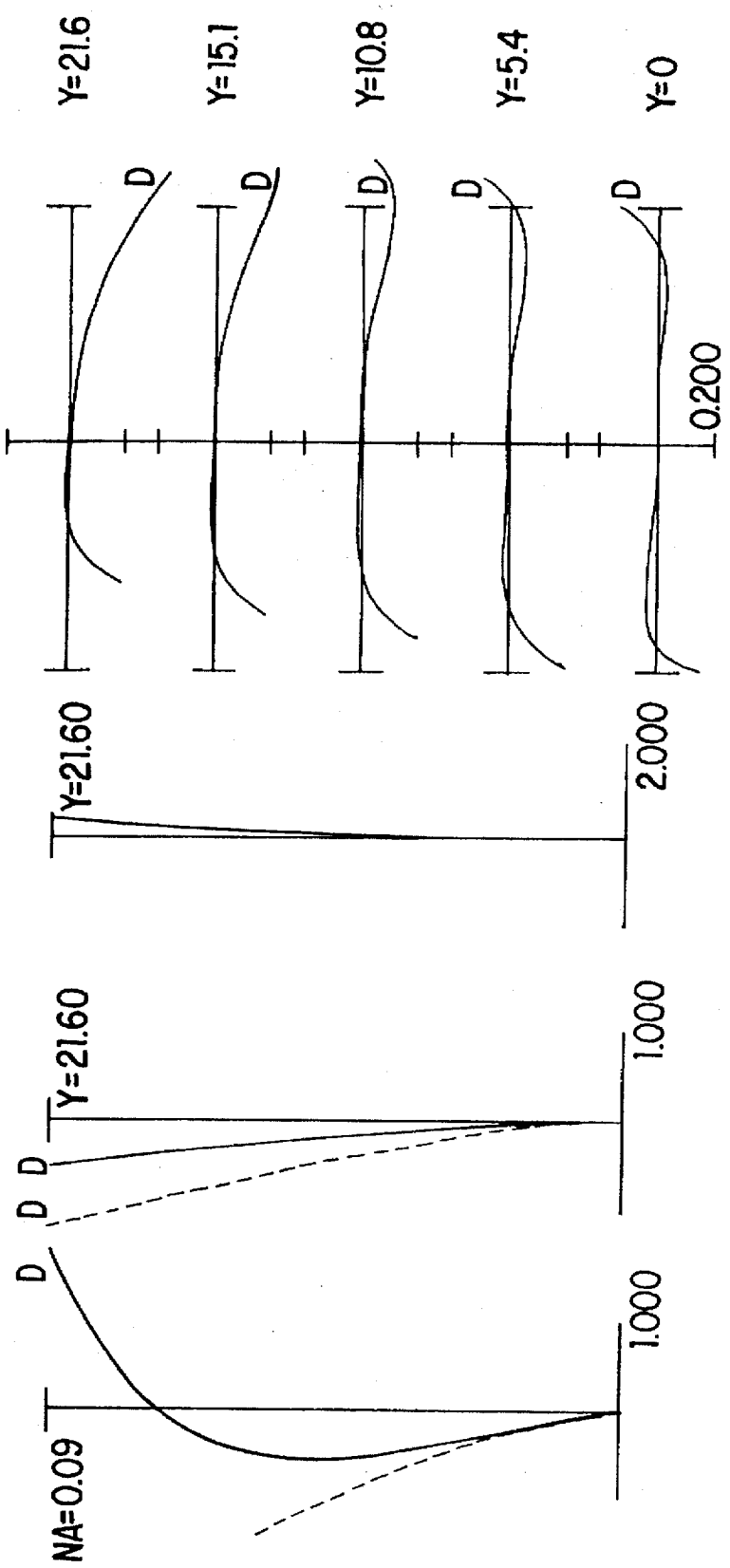

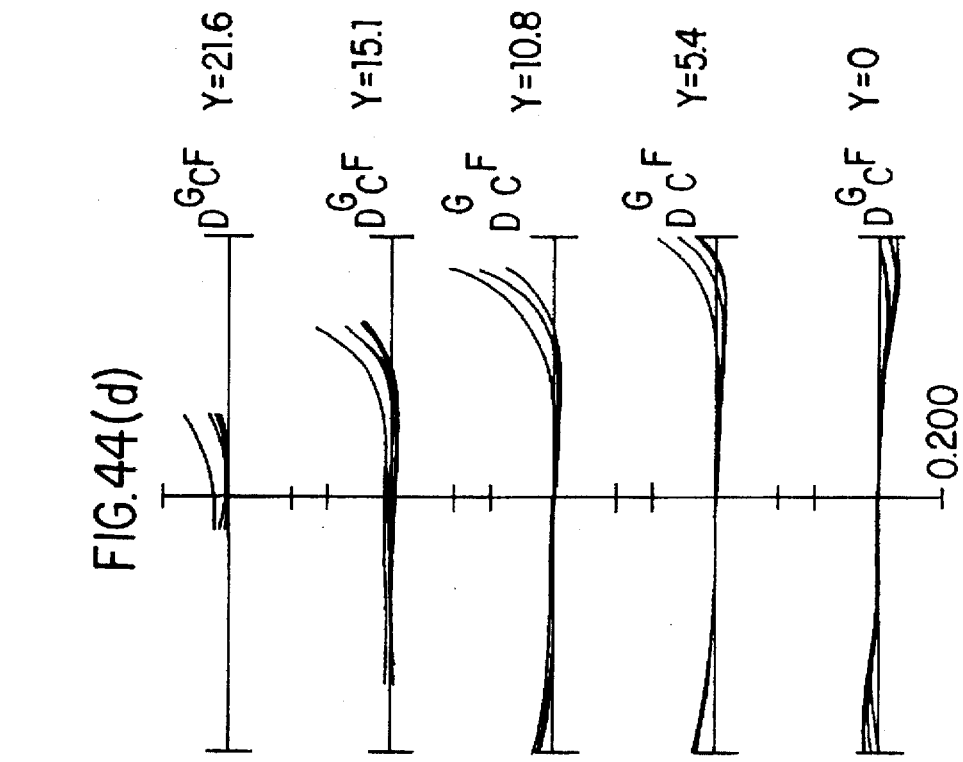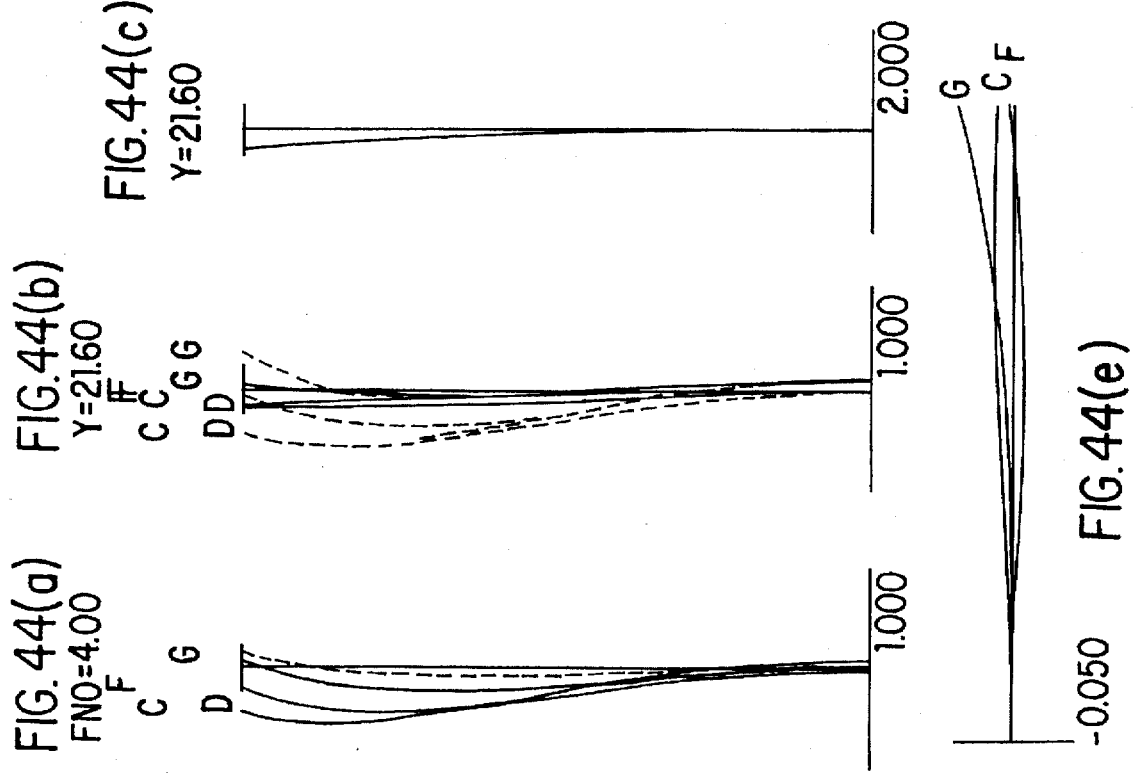

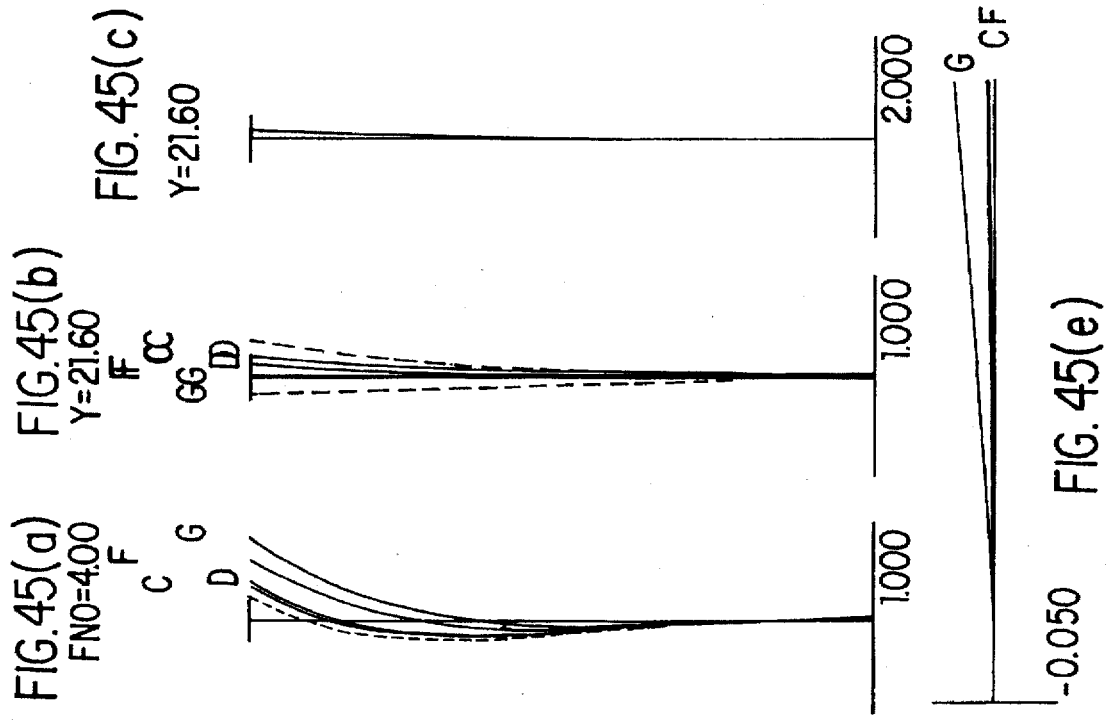

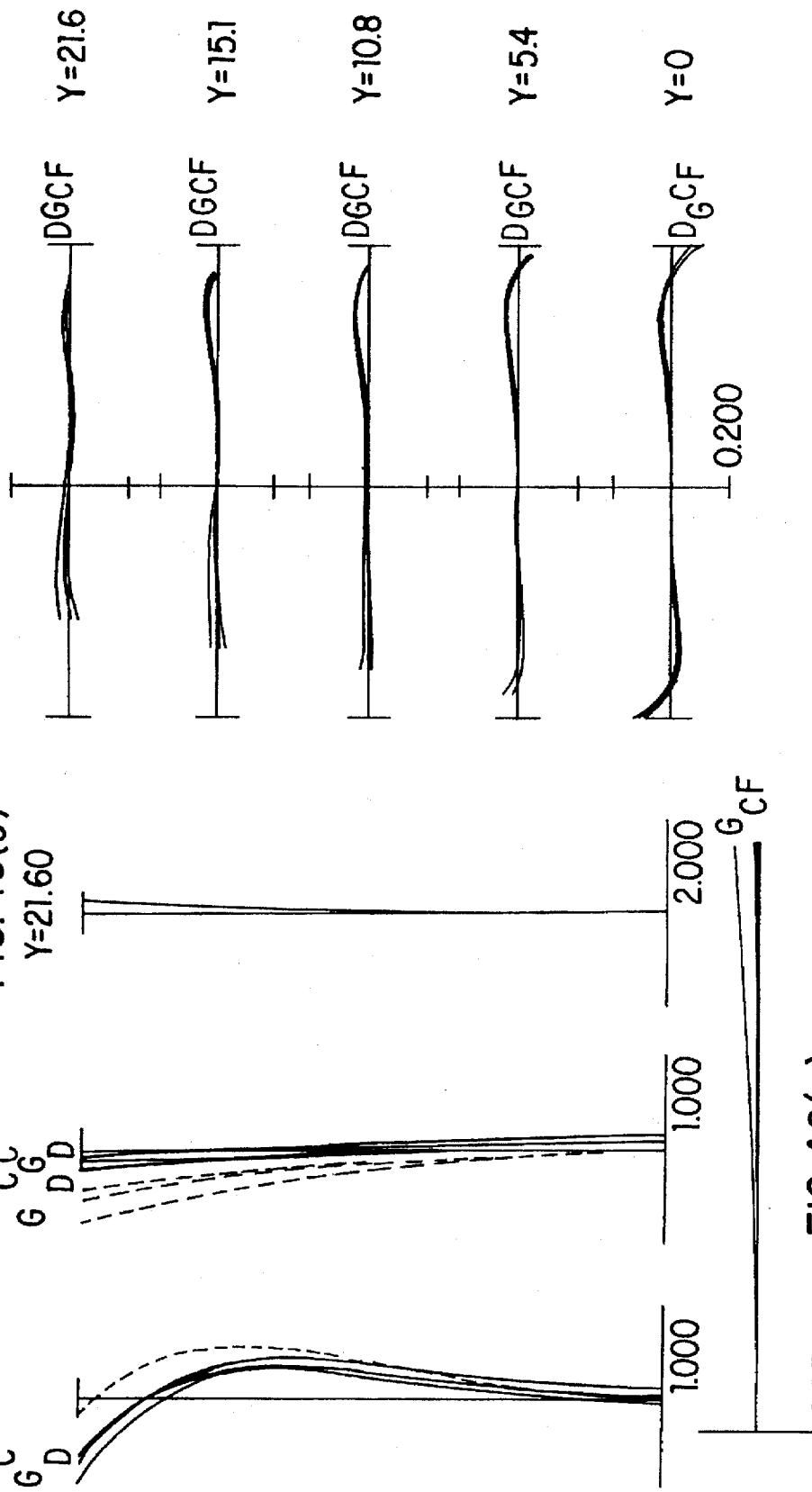

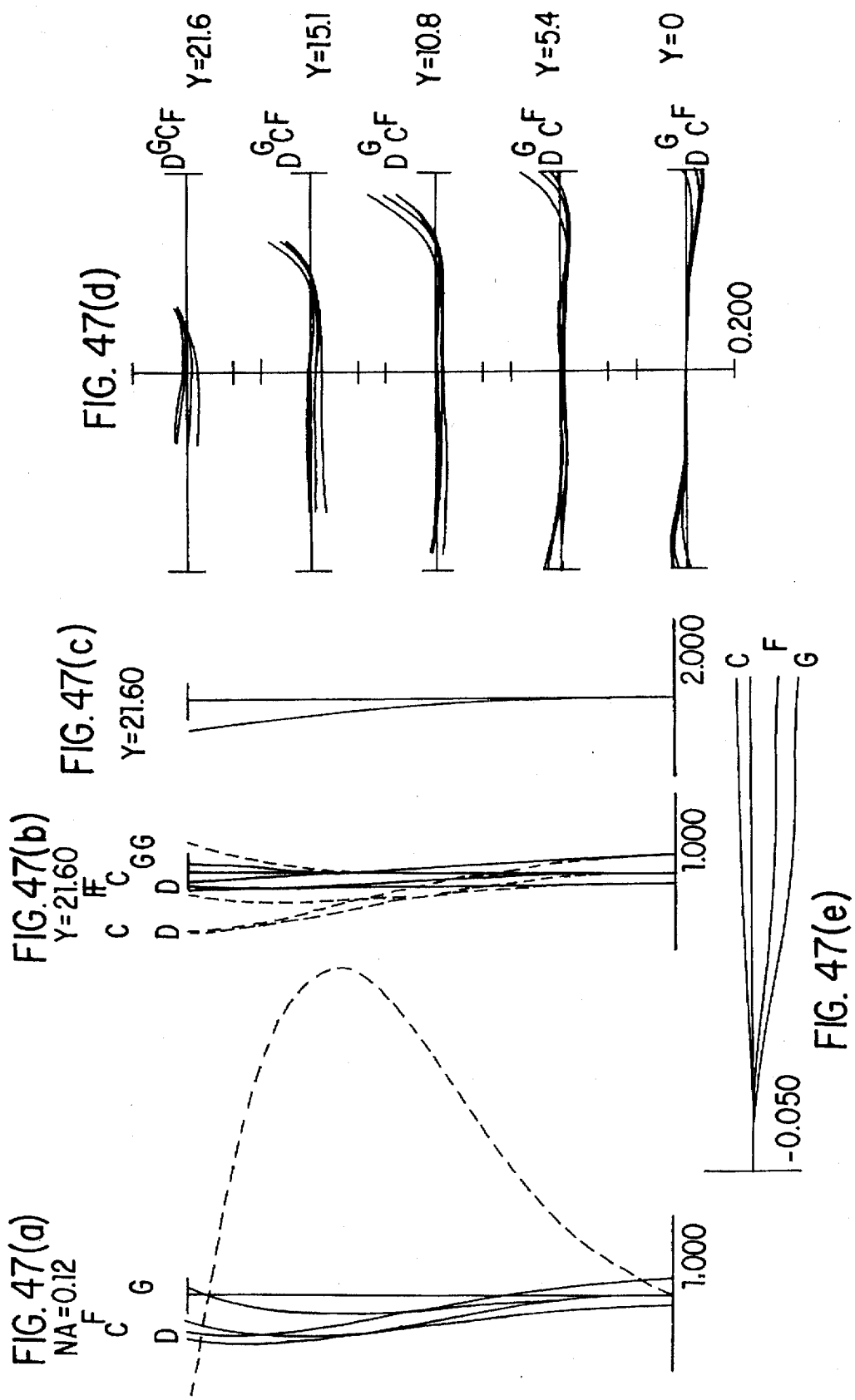

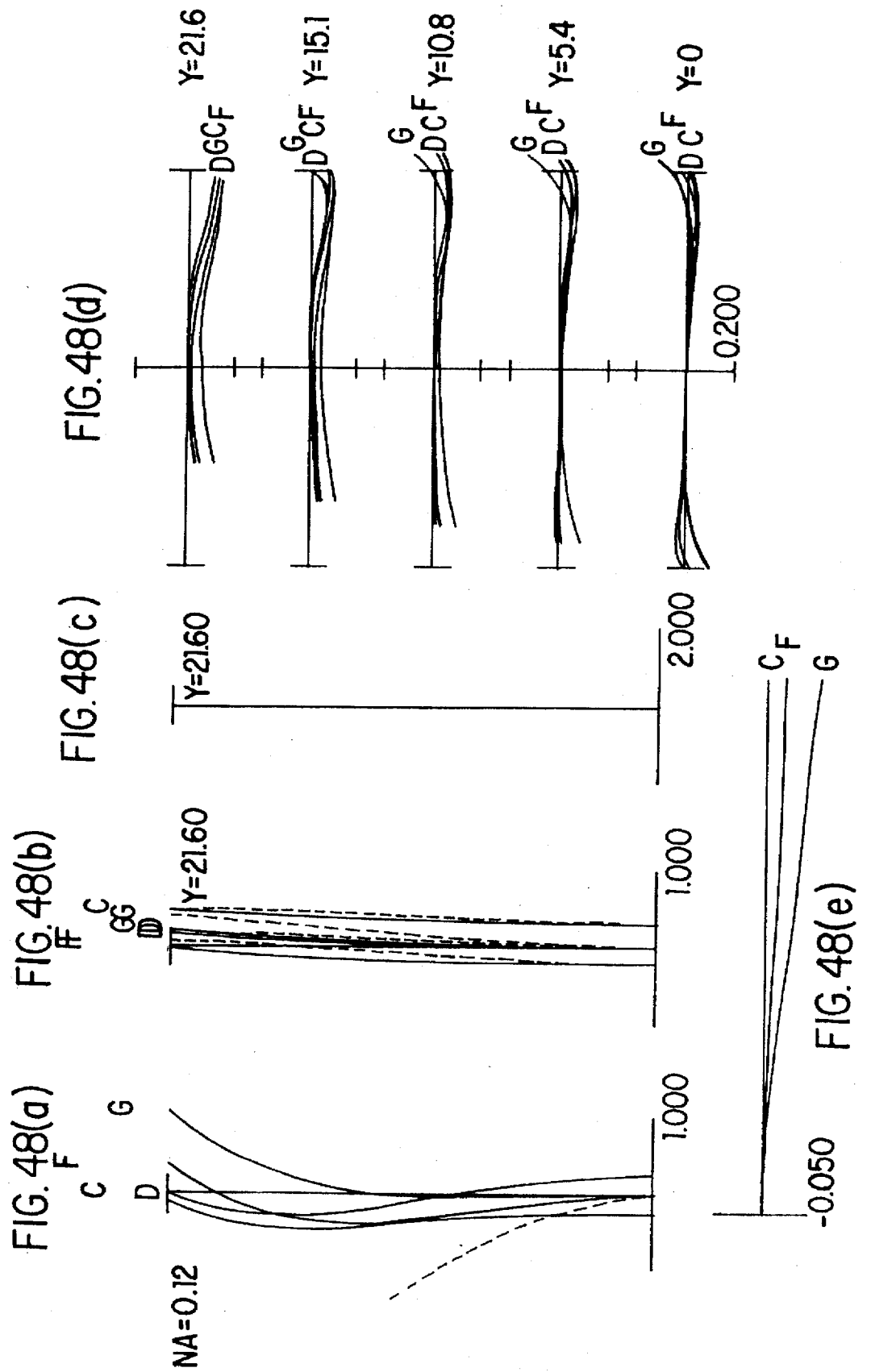

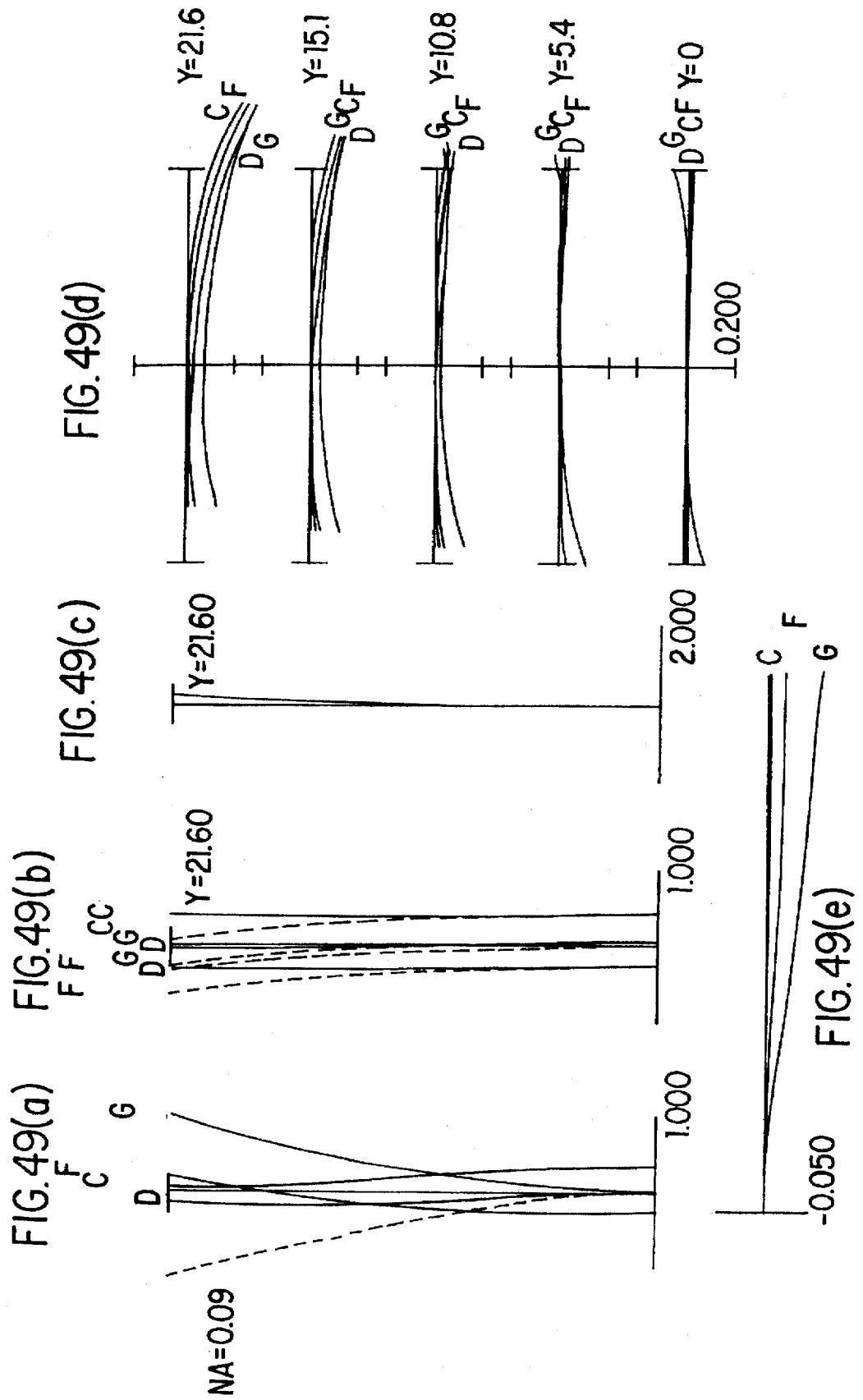

ZOOM LENS CAPABLE OF CLOSE RANGE PHOTOGRAPHY

BACKGROUND OF THE INVENTION

1. Field of the Invention

The present invention relates to a zoom lens capable of close range photography. More particularly, the zoom lens is a microlens, such as in a single lens reflex camera, an electronic still camera or the like.

2. Description of Related Art

Conventionally, lenses such as a microlenses for single lens reflex camera, electronic still cameras or the like have been simple focus lenses. The simple focus lenses are used to photograph objects, such as flowers or insects with the camera and lens are fixed to a tripod or the similar support. Consequently, to change the photographic magnification of the object, it is necessary to move the camera and lens with the tripod forward or backward with respect to the object.

With conventional devices as described above, it was practically impossible to change the photographic magnification of the object without causing the camera and lens to move with the tripod. Accordingly, when a photograph was taken of an elevated object, such as cherry blossoms, it was impossible to take an acceptable photograph after getting sufficiently close to the elevated object. As a result, it was necessary to trim and reframe the photograph during enlargement. Additionally, when a photograph was taken of a moving object, such as an insect, the object often moved outside the frame.

SUMMARY OF THE INVENTION

In consideration of the foregoing, it is an object of the invention to provide a zoom lens capable of close-range photography, where the photographic magnification of an object to be photographed can be instantly changed. In particular, the invention is useful with a camera and lens fixed to a tripod or similar support.

The description of the invention herein uses characters G1, G2 and G3. Further, L11, L12 and L13 are used to represent components of the first lens group G1 to generally represent the three lens groups, also known as lens units, meaning an optical unit that functions as a group. The term lens group is intended to include a plurality of lens elements or a single lens element. Further, the term lens element can also include known optical components, such as a prism. This is for ease and simplification of explanation purposes. The use of G1, G2 and G3 is in no way meant to limit the invention.

In order to resolve the above and other problems, the invention provides a zoom lens capable of close range photography. The zoom lens comprises in order from the object side: a first lens group G1 of weak refractive power; a second lens group G2 having negative refractive power; and a third lens group G3 having positive refractive power. The first lens group G1 comprises, in order from the object side, a positive lens group L11, a positive lens group L12 and a negative lens group L13. The first lens group G1 is fixed, while the second lens group G2 moves along a convex locus of the zooming loci with respect to the image plane and the third lens group G3 moves from the image side toward the object side during zooming from the maximum wide-angle state to the maximum telephoto state. At least one out of the three lens groups L11–L13 in the first lens group G1 moves along the optical axis during focussing from objects at infinity to close-range objects. The zoom lens satisfies the conditions:

$$0.7 < |f1112 \cdot F23/(f13 \cdot F)| < 1.5 \tag{1}$$

$$0.3 < |f13/f1112| < 1.1 \tag{2}$$

where f1112 is the combined focal length of the positive lens group L11 and the positive lens group L12, f13 is the focal length of the negative lens group L13, F23 is the combined focal length of the second lens group G2 and the third lens group G3, and F is the focal length of the entire lens system.

Further, the lateral magnification β13 of the negative lens group L13 in the first lens group G1 satisfies the condition:

$$|1/\beta13| < 0.3.$$

With the invention, a zoom lens is utilized as an object lens to instantly change the photographic magnification of the object. This particularly useful with the camera and lens fixed to a tripod or like support.

When a scrolling amount or focussing displacement of the focussing lens group changes during focussing in accordance with the focal length, it is necessary to refocus. As a result, it becomes impossible to instantaneously change the photographic magnification of the object.

Therefore, the first lens group G1 is fixed with respect to the image plane during zooming. However, the first lens group G1 moves during close range focussing, so that the focussing displacement is constant, without dependence on the focal length change. Therefore, due to the first lens group G1 being fixed during zooming, it is necessary to have at least two other lens groups G2 and G3 comprise the minimum number of lens groups.

Other objects, advantages and salient features of the invention will become apparent from the following detailed description, which, taken in conjunction with the annexed drawing, discloses preferred embodiments of the invention.

BRIEF DESCRIPTION OF THE DRAWINGS

The invention will be described in detail with reference to the following drawings in which like reference numerals refer to like elements, wherein:

FIGS. 2(a)–2(e) show various aberrations in an infinity focussing state at the maximum wide-angle state for the zoom lens of FIG. 1;

FIG. 3(a)–3(e) show various aberrations in an infinity focusing state at a medium focal length state for the zoom lens of FIG. 1;

FIGS. 4(a)–4(e) includes graphs showing various aberrations in an infinity focussing state at a maximum telephoto state for the zoom lens of FIG. 1;

FIGS. 5(a)–5(e) includes graphs showing various aberrations in a state where the photographic magnification β=−0.5 at a maximum wide-angle state for the zoom lens of FIG. 1;

FIGS. 6(a)–6(e) show various aberrations in a state where the photographic magnification β=−0.75 at a medium focal length state for the zoom lens of FIG. 1;

FIGS. 7(a)–7(e) show various aberrations in a state where the photographic magnification β=−1 at a maximum telephoto state for the zoom lens of FIG. 1;

FIGS. 9(a)–9(e) show various aberrations in an infinity focussing state at a maximum wide-angle state for the zoom lens of FIG. 8;

FIGS. 10(a)–10(e) show various aberrations in an infinity focusing state at a medium focal length state for the zoom lens of FIG. 8;

FIGS. 11(a)–11(e) show various aberrations in an infinity focussing state at a maximum telephoto state for the zoom lens of FIG. 8;

FIGS. 12(a)–12(e) show various aberrations in a state with a photographic magnification of β=−0.5 at a maximum wide-angle state for the zoom lens of FIG. 8;

FIGS. 13(a)–13(e) show various aberrations in a state with a photographic magnification of β=−0.75 at a medium focal length state for the zoom lens of FIG. 8;

FIGS. 14(a)–14(e) show various aberrations in a state with a photographic magnification of β=−1 at a maximum telephoto state for the zoom lens of FIG. 8;

FIGS. 16(a)–16(e) show various aberrations in an infinity focussing state at a maximum wide-angle state for the zoom lens of FIG. 15;

FIGS. 17(a)–17(e) show various aberrations in an infinity focusing state at a medium focal length state for the zoom lens of FIG. 15;

FIGS. 18(a)–18(e) show various aberrations in an infinity focussing state at a maximum telephoto state for the zoom lens of FIG. 15;

FIGS. 19(a)–19(e) show various aberrations in a state with a photographic magnification of β=−0.5 at a maximum wide-angle state for the zoom lens of FIG. 15;

FIGS. 20(a)–20(e) show various aberrations in a state with a photographic magnification of β=−0.75 at a medium focal length state for the zoom lens of FIG. 15;

FIGS. 21(a)–21(e) show various aberrations in a state with a photographic magnification of β=−1 at the maximum telephoto state for the zoom lens of FIG. 15;

FIGS. 23(a)–23(e) show various aberrations in an infinity focussing state at a maximum wide-angle state for the zoom lens of FIG. 22;

FIGS. 24(a)–24(e) show various aberrations in an infinity focusing state at a medium focal length state for the zoom lens of FIG. 22;

FIGS. 25(a)–25(e) show various aberrations in an infinity focussing state at a maximum telephoto state for the zoom lens of FIG. 22;

FIGS. 26(a)–26(e) show various aberrations in a state with a photographic magnification of β=−0.5 at the maximum wide-angle state for the zoom lens of FIG. 22;

FIGS. 27(a)–27(e) show various aberrations in a state with a photographic magnification of β=−0.75 at a medium focal length state for the zoom lens of FIG. 22;

FIGS. 28(a)–28(e) show various aberrations in a state with a photographic magnification of β=−1 at the maximum telephoto state for the zoom lens of FIG. 22;

FIGS. 30(a)–30(e) show various aberrations in an infinity focussing state at a maximum wide-angle state for the zoom lens of FIG. 29;

FIGS. 31(a)–31(e) show various aberrations in an infinity focusing state at a medium focal length state for the zoom lens of FIG. 29;

FIGS. 32(a)–32(e) show various aberrations in an infinity focussing state at the maximum telephoto state for the zoom lens of FIG. 29;

FIGS. 33(a)–33(e) show various aberrations in a state with a photographic magnification of β=−0.5 at a maximum wide-angle state for the zoom lens of FIG. 29;

FIGS. 34(a)–34(e) show various aberrations in a state with a photographic magnification of β=−0.75 at a medium focal length state for the zoom lens of FIG. 29;

FIGS. 35(a)–35(e) show various aberrations in a state with a photographic magnification of β=−1 at the maximum telephoto state for the zoom lens of FIG. 29;

FIGS. 38(a)–38(d) show various aberrations in an infinity focusing state at a medium focal length state for the zoom lens of FIG. 36;

FIGS. 39(a)–39(d) show various aberrations in an infinity focussing state at a maximum telephoto state for the zoom lens of FIG. 36;

FIGS. 40(a)–40(d) show various aberrations in a state with a photographic magnification of β=−0.5 at a maximum wide-angle state for the zoom lens of FIG. 36;

FIGS. 41(a)–41(d) show various aberrations in a state with a photographic magnification of β=−0.75 at a medium focal length state for the zoom lens of FIG. 36;

FIGS. 42(a)–42(d) show various aberrations in a state with a photographic magnification of β=−1 at a maximum telephoto state for the zoom lens of FIG. 36;

FIGS. 44(a)–44(e) show various aberrations in an infinity focussing state at the maximum wide-angle state for the zoom lens of FIG. 43;

FIGS. 45(a)–45(e) show various aberrations in an infinity focusing state at a medium focal length state for the zoom lens of FIG. 43;

FIGS. 46(a)–46(e) show various aberrations in an infinity focussing state at a maximum telephoto state for the zoom lens of FIG. 43;

FIGS. 47(a)–47(e) show various aberrations in a state with photographic magnification of β=−0.5 at a maximum wide-angle state for the zoom lens of FIG. 43;

FIGS. 48(a)–48(e) show various aberrations in a state with a photographic magnification of β=−0.75 at a medium focal length state for the zoom lens of FIG. 47;

FIGS. 49(a)–49(e) show various aberrations in a state with photographic magnification of β=−1 at a maximum telephoto state for the zoom lens of FIG. 47.

DESCRIPTION OF THE PREFERRED EMBODIMENTS

Figure 1A:
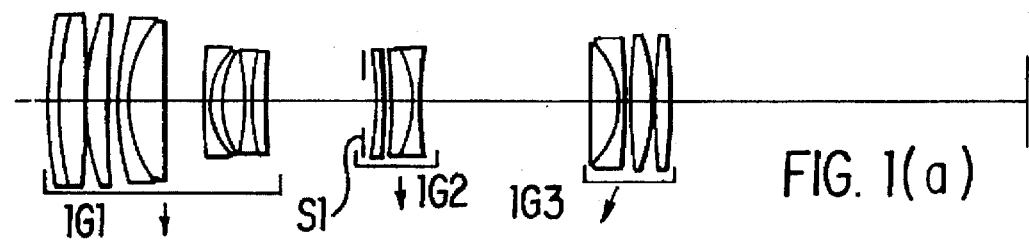
FIG. 1(a)–1(f) is a drawing illustrating a lens composition, movement during zooming and movement during focussing for a zoom lens according to a first preferred embodiment of the invention.
Figure 1B:
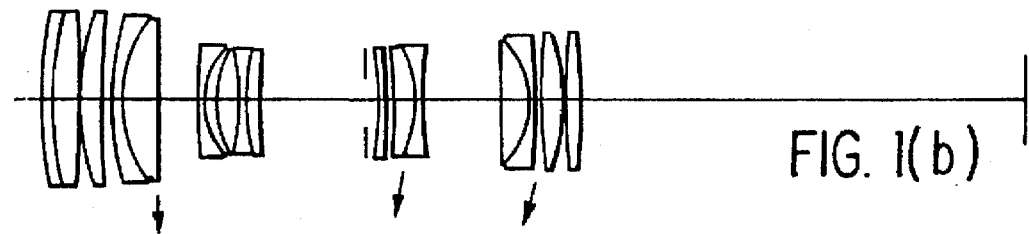
Figure 1C:
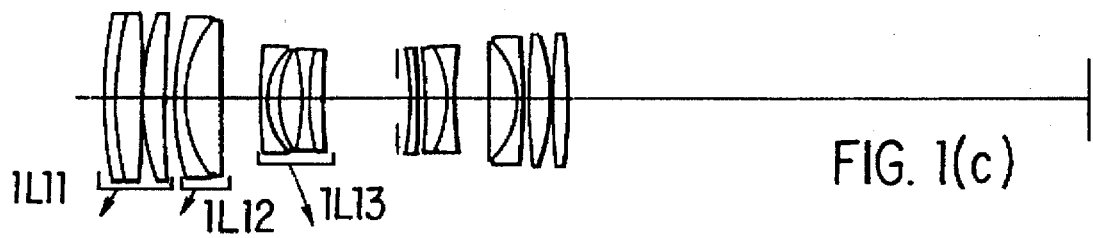
Figure 1D:
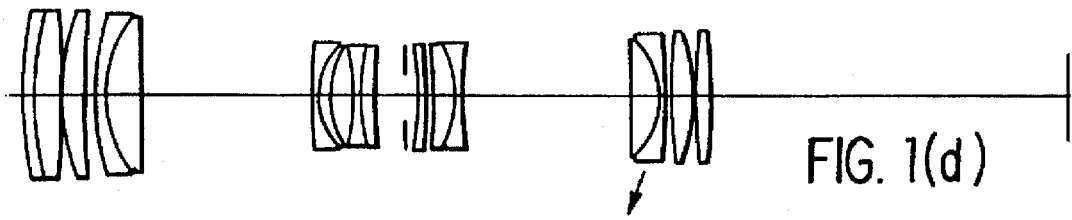
Figure 1E:
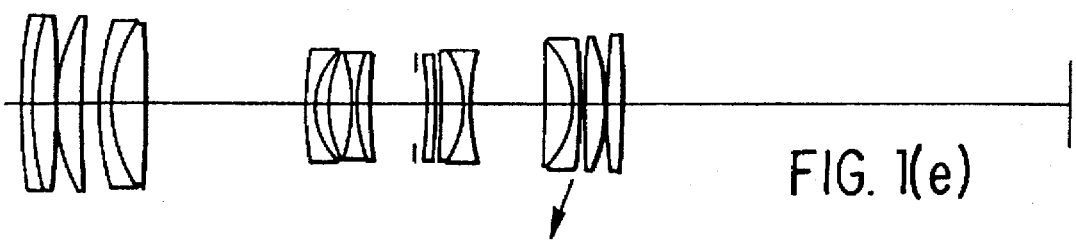
Figure 1F:
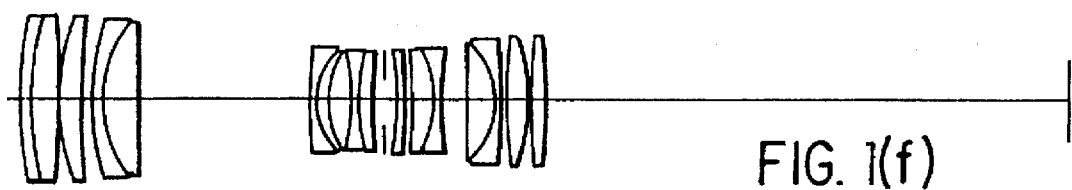
Figure 8A:
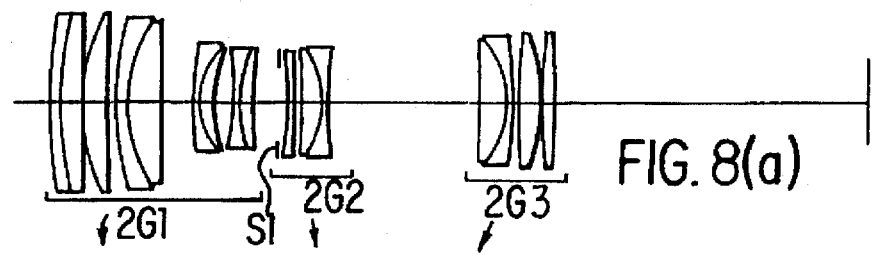
FIG. 8(a)–8(f) is a drawing illustrating the lens composition, movement during zooming and movement during focussing for a zoom lens according to a second preferred embodiment of the invention.
Figure 8B:
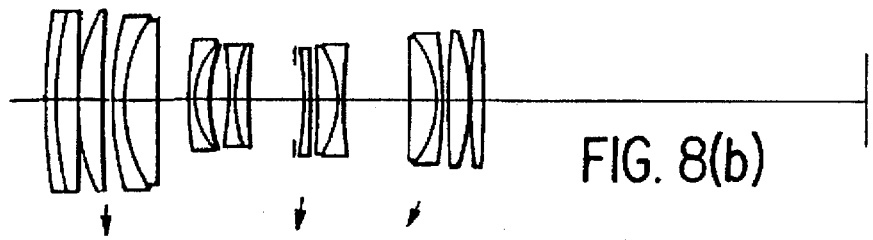
Figure 8C:
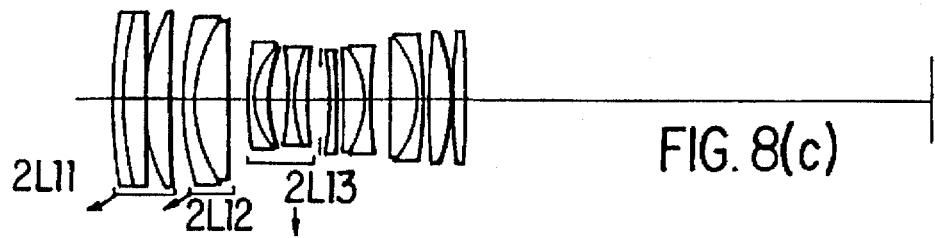
Figure 8D:
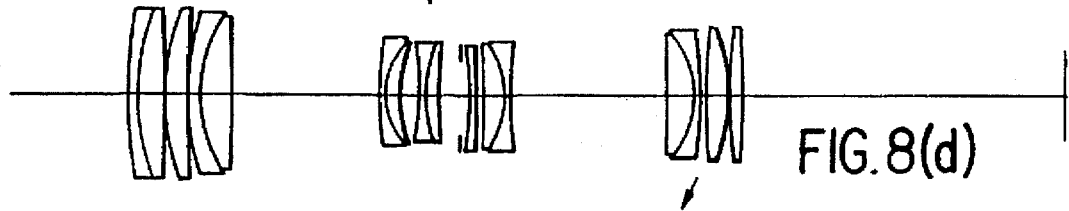
Figure 8E:
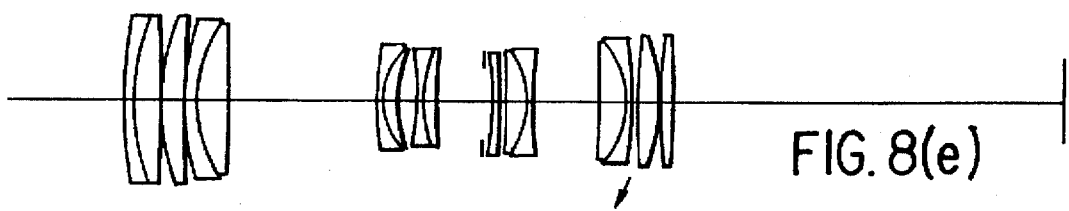
Figure 8F:
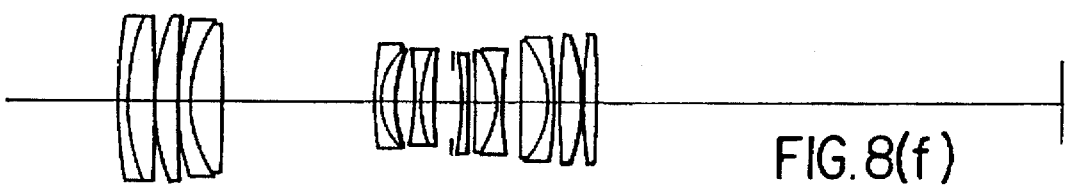
Figure 15A:
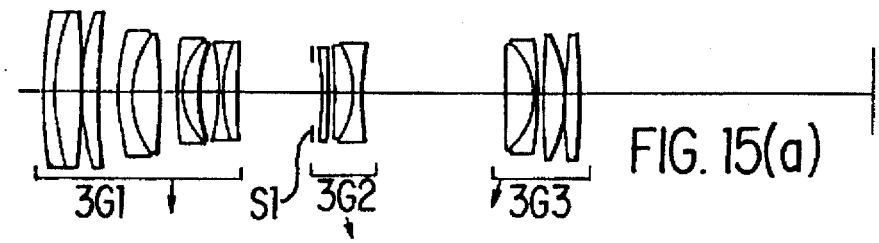
FIG. 15(a)–15(f) is a drawing illustrating the lens composition, movement during zooming and movement during focussing for a zoom lens according to a third preferred embodiment of the invention.
Figure 15B:
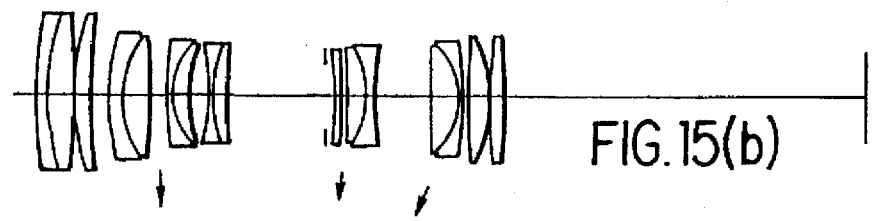
Figure 15C:
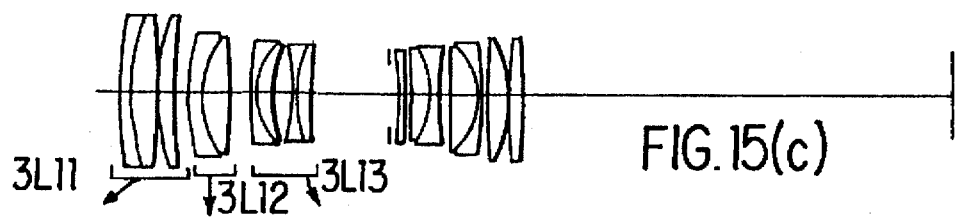
Figure 15D:
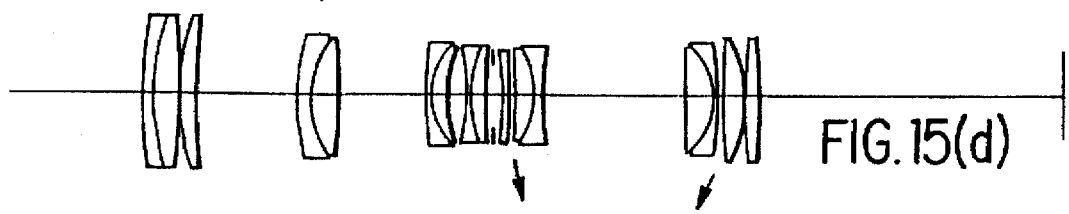
Figure 15E:
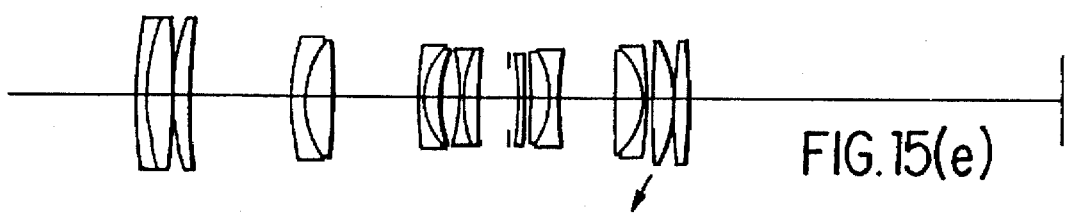
Figure 15F:
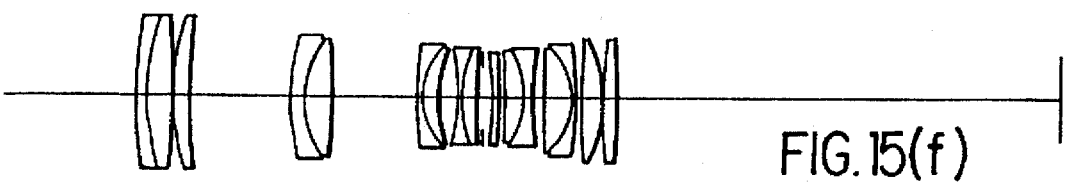
Figure 22A:
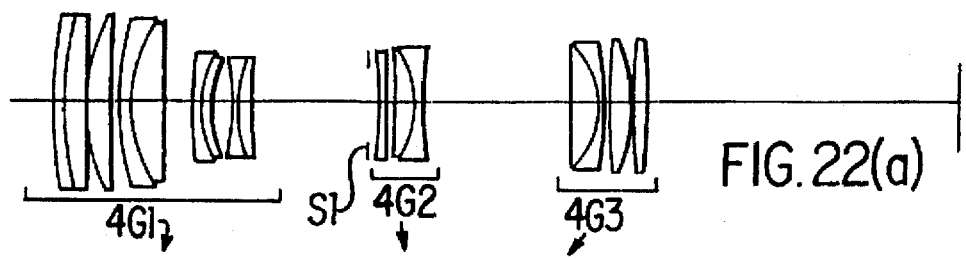
FIG. 22(a)–22(f) is a drawing illustrating the lens composition, movement during zooming and movement during focussing for a zoom lens according to a fourth preferred embodiment of the invention.
Figure 22B:
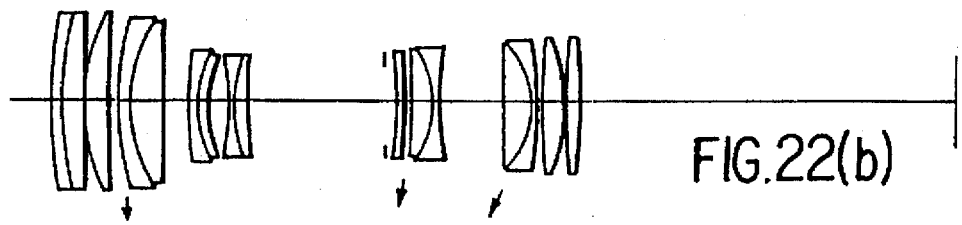
Figure 22C:
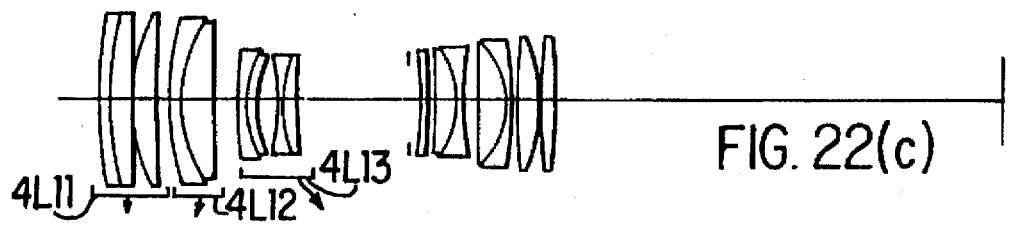
Figure 22D:
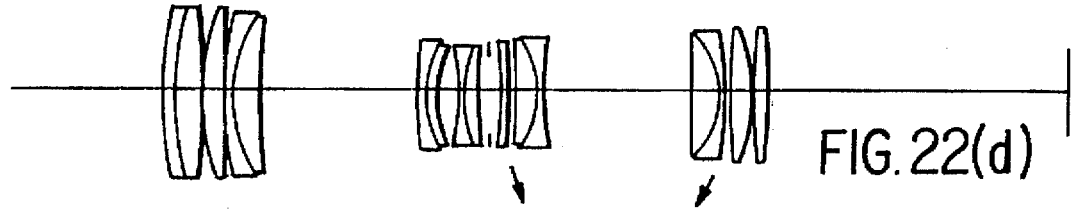
Figure 22E:
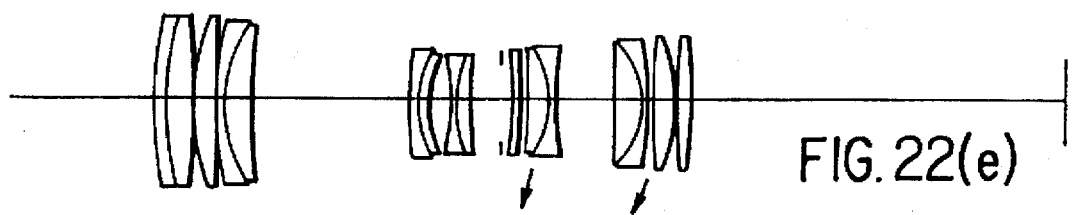
Figure 22F:
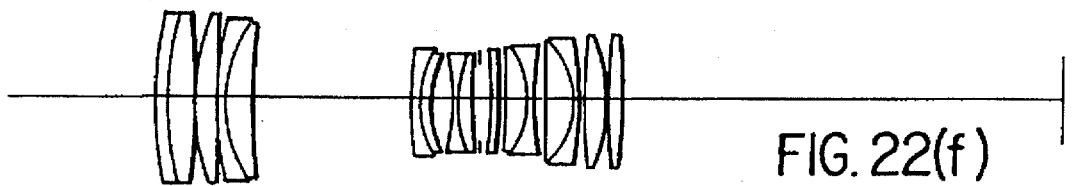
Figure 29A:
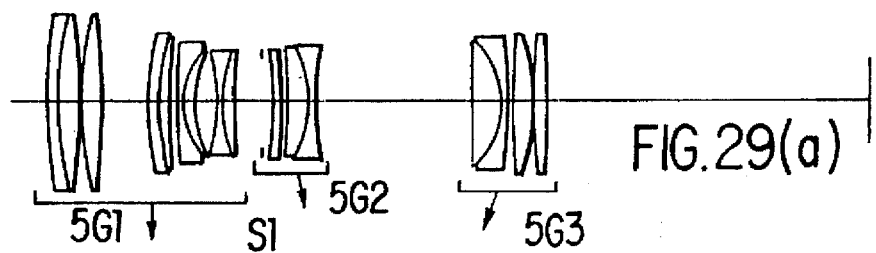
FIG. 29(a)–29(f) is a drawing illustrating the lens composition, movement during zooming and movement during focussing for a zoom lens according to a fifth preferred embodiment of the invention.
Figure 29B:
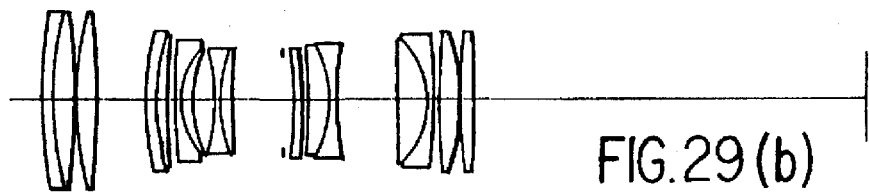
Figure 29C:
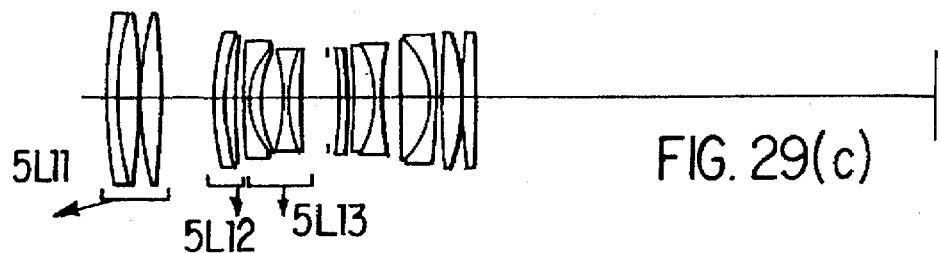
Figure 29D:
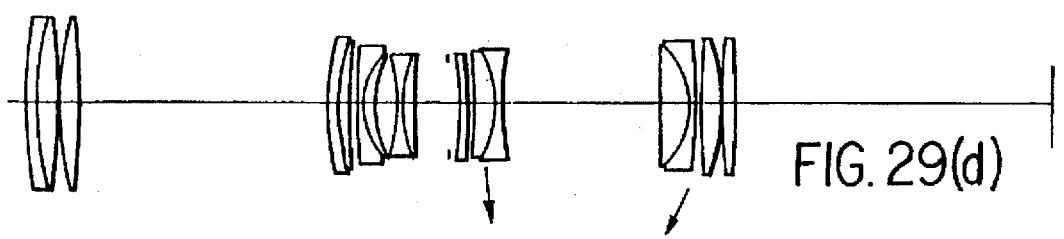
Figure 29E:
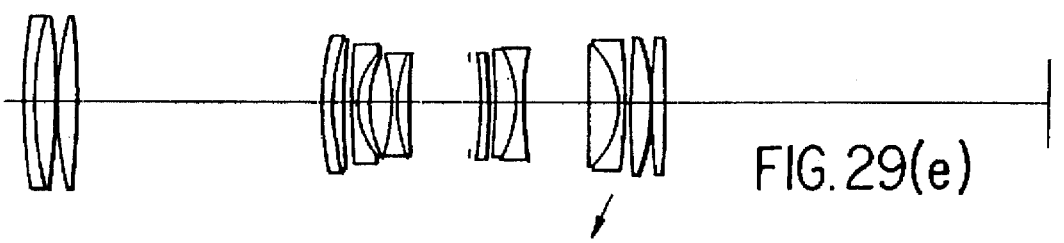
Figure 29F:
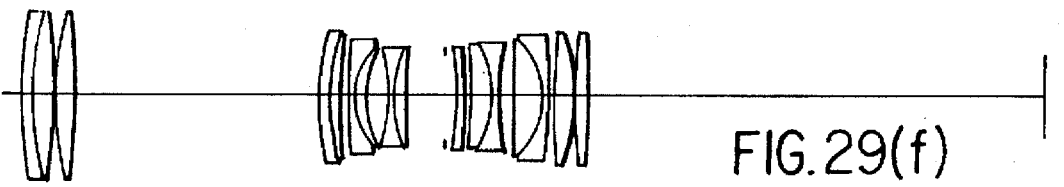
Figure 36A:
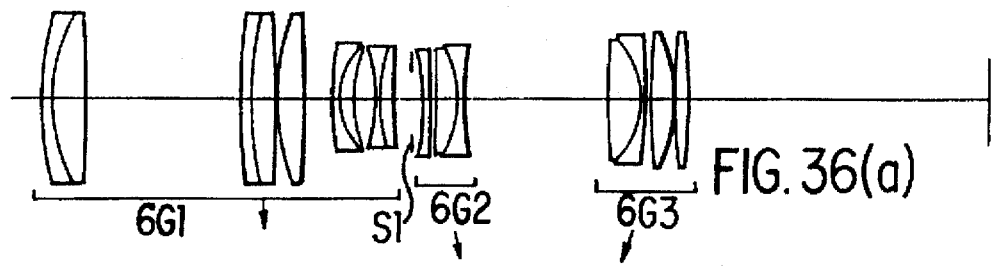
FIG. 36(a)–(f) is a drawing illustrating the lens composition, movement during zooming and movement during focussing for a zoom lens according to a sixth preferred embodiment of the invention.
Figure 36B:
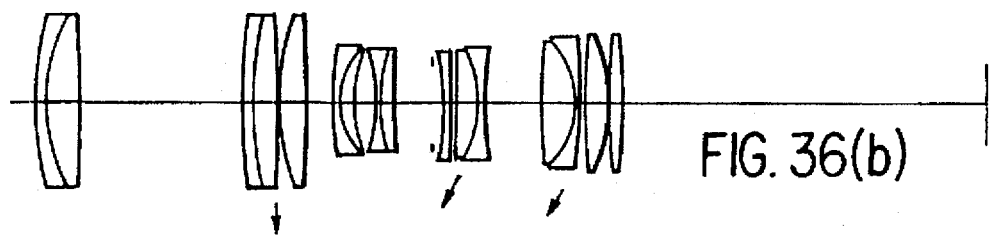
Figure 36C:
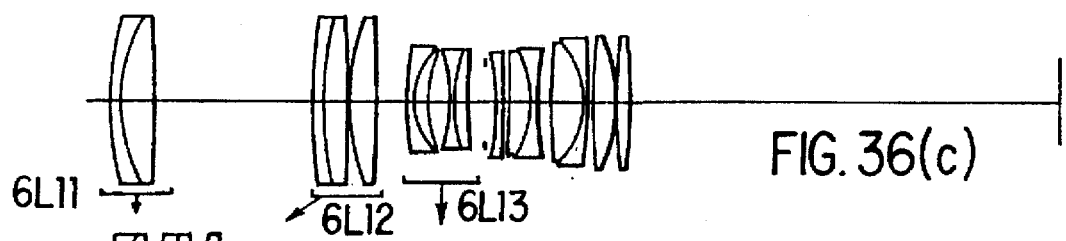
Figure 36D:
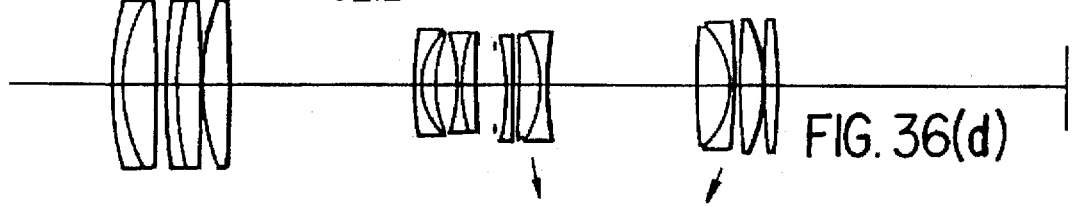
Figure 36E:
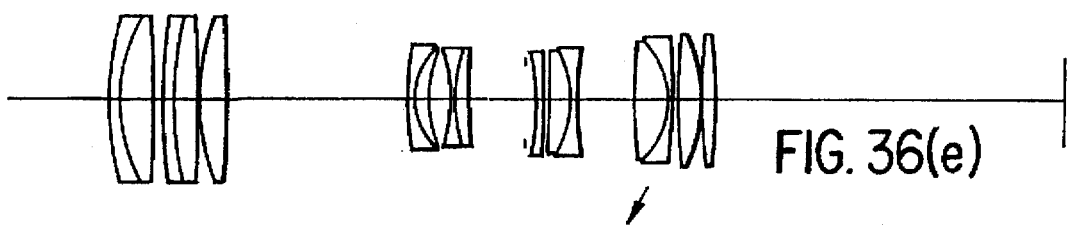
Figure 36F:
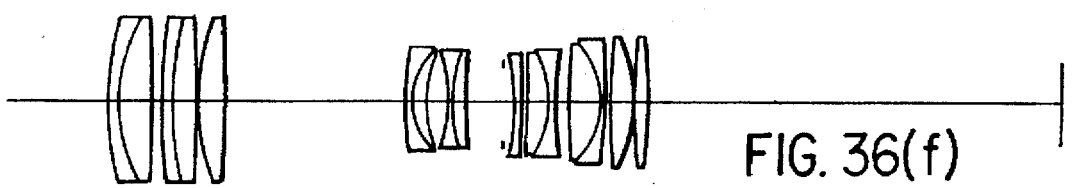
Figures 37A, 37B, 37C, 37D:
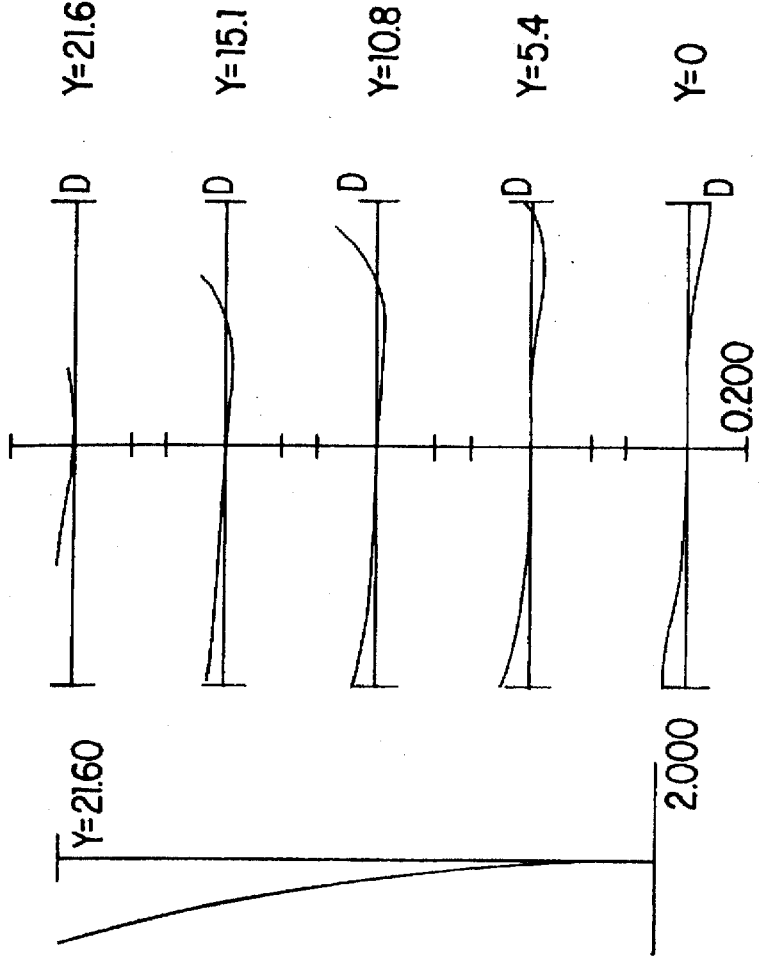
FIGS. 37(a)–37(d) show various aberrations in an infinity focussing state at a maximum wide-angle state for the zoom lens of FIG. 36.
Figure 43A:
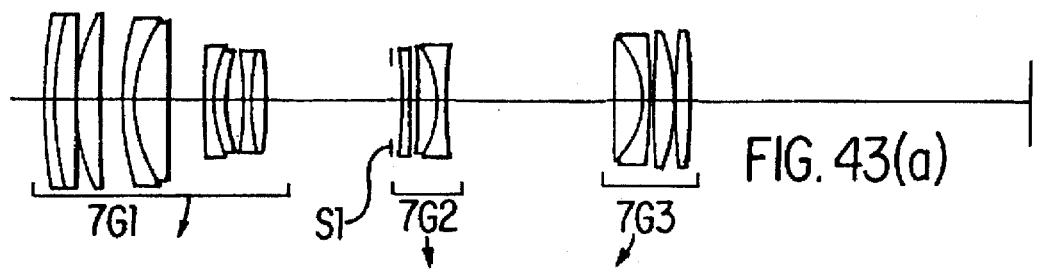
FIG. 43(a)–43(f) is a drawing illustrating the lens composition, movement during zooming and movement during focussing for a zoom lens according to a seventh preferred embodiment of the invention.
Figure 43B:
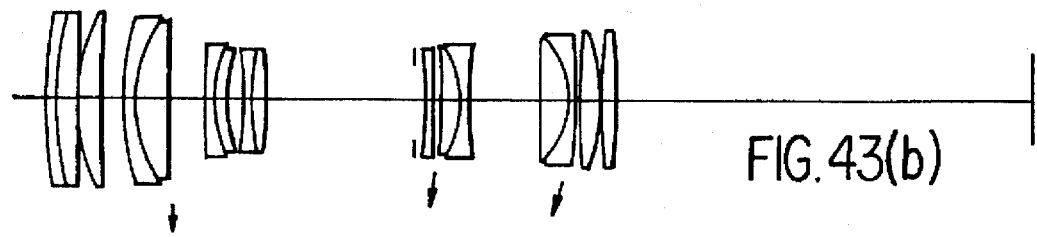
Figure 43C:
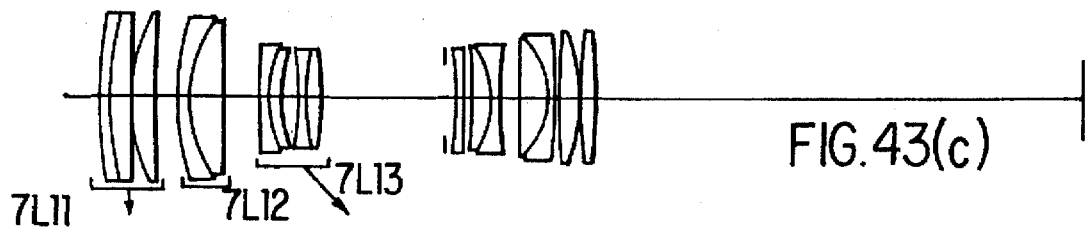
Figure 43D:
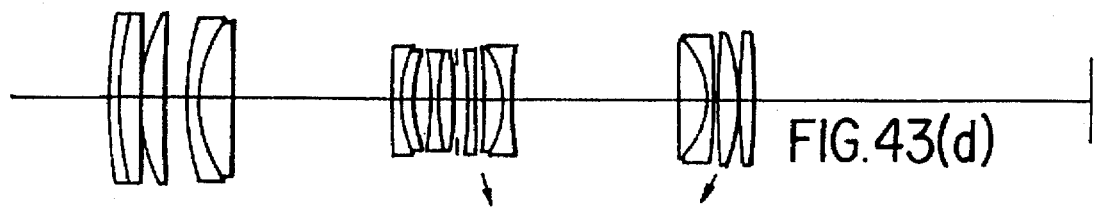
Figure 43E:
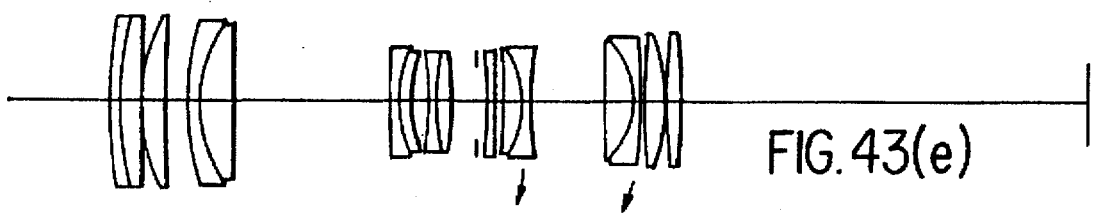
Figure 43F:
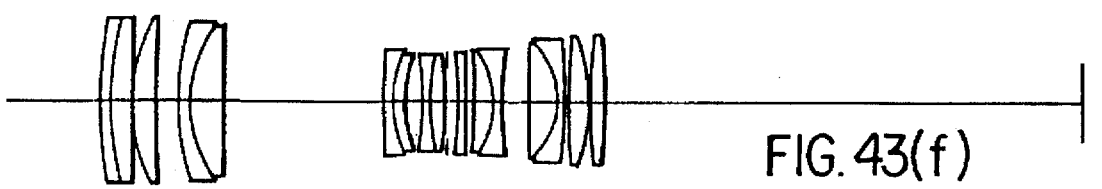

The invention relates to a zoom lens suitable for a lens, such as microlens. In a microlens, the focussing displacement is large. Thus, there is a tendency for a "dead space" caused by focussing in the direction of the optical axis to become extremely large. Consequently, it is necessary to shorten the total length of the lens system by reducing the dead space in the entire optical system.

Therefore, the invention provides for the first lens group G1 to have a weak refractive power, second lens group G2 to have a negative refractive power and the third lens group G3 to have a positive refractive power. During zooming from a maximum wide-angle state to a maximum telephoto state, the second lens group G2 moves along a convex locus a zooming loci of the zoom lens with respect to the image plane, and the third lens group G3 moves from the image side to the object side. Thus, it is possible to reduce the movement of the second lens group G2 necessary during zooming, and thus reduce the dead space caused by zooming.

Additionally, satisfactory aberration correction can be achieved with the first lens group G1 comprising, in order from the object side: a positive lens group L11; a positive lens group L12; and a negative lens group L13.

In a microlens, it is necessary to reduce distortion. By making the power arrangement or refractive power arrangement of the entire optical system symmetric, distortion is reduced. Moreover, a symmetric power arrangement is also beneficial to correct aberrations relating to field angles, such as astigmatism.

Hereafter, the various conditional formulas of the present invention will be described. As discussed above, the zoom lens satisfies conditions.

With the zoom lens of the present invention, the following conditional formulas (1) and (2) are satisfied.

$$0.7 < |f1112 \cdot F23/(f13 \cdot F)| < 1.5 \quad (1)$$

$$0.3 < |f13/f1112| < 1.1 \quad (2)$$

If an angle of light that is emitted from the first lens group G1 is a constant, without dependence on photographic distance, it is possible to reduce fluctuations in aberrations caused by close range focussing. Therefore, it is preferable for the first lens group G1 form an afocal system. However, depending on the design and specifications of the photographic optical system it may be impossible to make the first lens group G1 perfectly afocal, Condition (1) stipulates the permissible dislocation amount from an afocal system, of the first lens group G1.

Accordingly, when the range set by the upper and lower limits in condition (1) is breached, fluctuations in aberrations that are caused by close range focussing become large. This is not desirable.

In order to further reduce fluctuations in aberrations caused by close range focussing, set the upper limit in condition (1) can be set to 1.3, and the lower limit can be set to 0.8.

Condition (2) is used to reduce the total length of the first lens group G1. Condition (2) sets the appropriate range for the ratio of the focal length of the negative lens group L13 to the combined focal length of the positive lens group L11 and the positive lens group L12, i.e., f13/f1112.

When |f13/f1112| is larger than the upper limit of condition (2), the combined refractive power of the positive lens groups L11 and L12 of the first lens group G1 becomes too large. Consequently, fluctuations in spherical aberrations caused by close range focussing become large, which is not desirable.

When |f13/f1112| is smaller than the lower limit of condition (2), the distance between the positive lens group L11 and the positive lens group L12 widens when the first lens group G1 is an afocal system. This is not desirable because the total length of the first lens group G1 will become large.

In order to create an even more desirable balance between the total length of the first lens group G1 and fluctuations in the spherical aberrations caused by close range focussing, the upper limit in condition (2) can be set to 0.9, and the lower limit can be set to 0.5.

With the invention, at least one lens group of the lens groups L11 through L13 moves along the optical axis during focussing from objects at infinity to a close range. The following methods are close range methods focussing for the first lens group G1. Each focussing method has various characteristics.

Method 1

The positive lens group L11, the positive lens group L12 and the negative lens group L13 in the first lens group G1 each move in the direction of the optical axis during focussing from objects at infinity to at a close range in Method 1. Thus, it is possible to reduce the focussing displacement by moving, for example, the positive lens group L11 toward the object side and the negative lens group L13 toward the image side. This reduces the dead space caused by focussing. It is also possible to reduce fluctuations in spherical aberrations caused by close range focussing with an appropriate movement of the positive lens group L12.

Method 2

In Method 2, the positive lens group L11 and the positive lens group L12 each move in the direction of the optical axis during focussing from objects at infinity to at a close range. It is possible to reduce the dead space between the positive lens group L12 and the negative lens group L13 with the negative lens group L13 fixed with respect to the image plane. Accordingly, suitable portability can be achieved as the total length of the lens system is shortened when the lens is mounted. Additionally, it is possible to reduce fluctuations in spherical aberrations caused by close range focussing with a close range focussing mechanism where the mechanism is simpler than that in Method 1.

Method 3

In Method 3, the positive lens group L11 and the negative lens group L13 each move in the direction of the optical axis during focussing from objects at infinity to at a close range. Therefore, it is possible to reduce fluctuations in spherical aberrations caused by close range focussing with a close range focussing mechanism that is simpler than that in Method 1. For example, the negative lens group L13 and the positive lens group L11 can move toward the image side.

Method 4

In Method 4, the positive lens group L12 and the negative lens group L13 each move in the direction of the optical axis during focussing from objects at infinity to at a close range. With this method, it is possible to make the distance from the object to the surface of the photographic lens closest to the object side or the object distance D0 constant, because the positive lens group L11 is fixed with respect to the image plane. Operability of the zoom lens in Method 4 is good because the working distance is constant. Additionally, it is possible to reduce fluctuations in spherical aberrations caused by close range focussing with a close range focussing mechanism that is simpler than that in Method 1.

Method 5

In Method 5, only the positive lens group L11 moves in the direction of the optical axis during focussing from objects at infinity to at a close range. This method has a simple close range focussing mechanism. Hence, it is desirable for use in inexpensive lenses systems.

Method 6

In Method 6, only the positive lens group L12 moves in the direction of the optical axis during focussing from objects at infinity to at a close range. It is possible to make the object distance D0 constant, because the positive lens group L11 is fixed with respect to the image plane. Operability of the zoom lens of Method 6 is good because the working distance is a constant. Additionally, this zoom lens is desirable in inexpensive lenses because the close range focussing mechanism is simple.

Method 7

In Method 7, only the negative lens group L13 moves in the direction of the optical axis during focussing from objects at infinity to at a close range. With Method 7, the object distance D0 is constant because the positive lens group L11 is fixed with respect to the image plane. Thus, the operability of the zoom lens in Method 7 is good because the working distance is constant, which is desirable. In addition, it is possible to make the close range focussing mechanism smaller in the diameter direction because the effective diameter of the negative lens group L13 tends to become smaller due to the power arrangement. This leads to a good portability.

Because the characteristics of each of the focussing Methods 1–7 differ, it is preferable to select the optimum method based on the desired use of the object lens.

Moreover, it is preferable for condition (3) to be satisfied to reduce focussing displacement. In condition (3), when |1/β13| is larger than the upper limit, the size of the lateral magnification of the negative lens group L13 becomes small. The focussing displacement thus becomes large, which is not desirable. Thus, order to conduct focussing with an even smaller focussing displacement, it is desirable for the upper limit in conditional formula (3) to be 0.13.

Additionally, it is desirable to position an aperture stop S1 between the first lens group G1 and the second lens group G2 to obtain even better imaging performance. When the aperture stop S1 is positioned is at a center of the power arrangement, between the first lens group G1 and the second lens group G2, it is possible to correct aberrations in the optical axis symmetry. This is because the basic configuration of the zoom lens of the invention is symmetric with respect to power arrangement. In particular, it is possible to correct distortions, which is important in a microlens, through the above-described positioning of the aperture stop S1. Additionally, the symmetry of light rays above and below the optical axis is also good, which is also desirable.

It is also preferable that the zoom lens also satisfy condition (4) to obtain an even better imaging performance:

$$-2<(r2+r1)/(r2-r1)<1 \quad (4)$$

where, r1 is the radius of curvature of a lens surface closest to the image side in the negative lens group L13 in the first lens group G1, and r2 is the radius of curvature of a lens surface closest to the object side in the second lens group G2. With the zoom lens as described above, the basic configuration of the power arrangement is symmetric. Consequently, in terms of aberration correction, it is beneficial if each lens has a shape including a concave surface facing the surface between the first lens group G1 and the second lens group G2, which is the center of the power arrangement.

When (r2+r1)/(r2-r1) is outside the range stipulated by the upper and lower limit condition (4), the shape of each lens does not sufficiently correct aberrations. This is not desirable.

In particular, it is preferable for the surface closest to the image side in the negative lens group L13 in the first lens group G1 and the surface closest to the object side in the second lens group G2 to include a concave surface and a convex surface shape facing the image surface respectively. Accordingly, it is preferable for the following conditional formula (5) to be satisfied.

$$-1<(r2+r1)/(r2-r1)<1 \quad (5)$$

Additionally, if the first lens group G1 has positive refractive power, it is possible to reduce the effective diameter of the aperture stop, which is desirable.

It is possible to cause at least one of the lens groups in the first lens group G1 in the zoom lens to become decentered with respect to the optical axis, and thus cause the imaging position to be displaced. In particular, it is possible to conduct a shake correction or correction of fluctuations in the image position caused by shaking of the optical system or the like. The shake correction is achieved by providing a shake detection device, which detects shaking of the optical system caused by camera shaking or the like; a driving device that is used to decenter the lens group from the optical axis; and a computation device, which processes a signal from the shake detection device and converts this into a signal for decentering the lens group by a predetermined amount with respect to the optical axis.

The preferred embodiments of the present invention will be described hereinafter with reference to the accompanying drawings. In each of the preferred embodiments, the zoom lens comprises, in order from the object side, a first lens group G1 of weak refractive power, a second lens group G2 of negative refractive power and a third lens group G3 of positive refractive power. Further, the first lens group G1 comprises, in order from the object side of the zoom lens, a positive lens group L11, a positive lens group L12 and a negative lens group L13.

During zooming from a maximum wide-angle state to a maximum telephoto state, the first lens group G1 is fixed, while the second lens group G2 moves along a convex locus of the zooming loci with respect to the image plane and the third lens group G3 moves from the image side toward the object side. Further, at least one lens group of the lens groups L11–L13 in the first lens group G1 moves along the optical axis during focussing from objects at infinity to at a close range.

In each of the preferred embodiments, an aperture stop S1 is positioned between the first lens group G1 and the second lens group G2, and moves integrally with the second lens group G2 during zooming. Additionally, the aperture stop S1 aperture is changeable in accordance with zooming, so that the F number FNO=4 over the entire zooming range from a maximum wide-angle state to a maximum telephoto state.

FIG. 1 is a drawing showing the lens composition, movement during zooming and movement during focussing for a zoom lens according to a first preferred embodiment of the present invention. In FIG. 1, position (a) represents the lens arrangement in an infinity focussing state at the maximum wide-angle state, position (b) represents the lens arrangement in an infinity focussing state at a medium focal length state, position (c) represents the lens arrangement in the infinity focussing state at the maximum telephoto state, position (d) represents the lens arrangement with a photographic magnification of β=−0.5 at a maximum wide-angle state, position (e) represents the lens arrangement with a photographic magnification of β=−0.75 at a medium focal length state and position (f) represents the lens arrangement with a photographic magnification of β=−1 at a maximum telephoto state.

In the zoom lens of FIG. 1, the first lens group 1G1 comprises in order from the object side: a positive lens group 1L11, including a positive cemented lens of a negative meniscus lens having a convex surface facing the object side and a biconvex lens, and a positive meniscus lens having a convex surface facing the object side; a positive lens group 1L12, including a positive cemented lens of a negative meniscus lens having a convex surface facing the object side and a positive meniscus lens having a convex surface facing the object side; and a negative lens group 1L13, including a negative cemented lens of a negative meniscus lens having a convex surface facing the object side and a positive meniscus lens having a convex surface facing the object side, and a negative cemented lens of a biconcave lens and a positive meniscus lens having a convex surface facing the object side.

Additionally, the second lens group 1G2 comprises, in the following order from the object side, a negative meniscus lens having a concave surface facing the object side, and a negative cemented lens of a positive meniscus lens having a concave surface facing the object side and a biconcave lens.

Furthermore, the third lens group G3 comprises, in the following order from the object side, a positive cemented lens of a biconvex lens and a negative meniscus lens having a concave surface facing the object side, a biconvex lens, and a biconvex lens.

With the zoom lens of FIG. 1, focussing from objects at infinity to at a close range is conducted in accordance with Method 1 by moving the positive lens group 1L11 and the positive lens group 1L12 toward the object side and the negative lens group 1L13 toward the image side.

Table 1 below summarizes the data values of the first preferred embodiment of the present invention. In Table 1, F is the focal length of the entire lens system, FNO is the F number, β is the photographic magnification, Bf is the back focus and D0 is the distance or object distance from the object to the first lens surface. Furthermore, numerals in the leftmost column represent the order of lens surfaces from the object side of the zoom lens, r is the radius of curvature of each lens surface, d is the lens surface interval, and n and ν are respectively the refractive index and Abbe's number for a d-line (λ=587.6 nm).

TABLE 1

F = 200–400
FNO = 4

| | r | d | ν | n |
|---|---|---|---|---|
| 1 | 355.5694 | 5.6000 | 35.72 | 1.902650 |
| 2 | 238.0502 | 15.6000 | 82.52 | 1.497820 |
| 3 | −763.8196 | 0.7000 | | |
| 4 | 163.3278 | 13.3000 | 82.52 | 1.497820 |
| 5 | 1527.0288 | (d5 = variable) | | |
| 6 | 177.4067 | 5.6000 | 39.82 | 1.869940 |
| 7 | 84.9916 | 19.6000 | 67.87 | 1.593189 |
| 8 | 2693.8617 | (d8 = variable) | | |
| 9 | 340.8736 | 4.4000 | 57.03 | 1.622801 |
| 10 | 53.1687 | 7.0000 | 33.89 | 1.803840 |
| 11 | 84.8496 | 12.0000 | | |
| 12 | −110.2158 | 4.4000 | 60.14 | 1.620409 |
| 13 | 140.7443 | 8.900 | 25.41 | 1.805182 |
| 14 | 549.2731 | (d14 = variable) | | |
| 15 | ∞ | 7.1000 | | |

TABLE 1-continued

| 16 | −147.3471 | 4.4000 | 54.01 | 1.617200 |
|---|---|---|---|---|
| 17 | −797.0255 | 4.4000 | | |
| 18 | −341.6118 | 13.3000 | 46.54 | 1.804109 |
| 19 | −55.3579 | 3.6000 | 57.03 | 1.622801 |
| 20 | 180.6234 | (d20 = variable) | | |
| 21 | 797.7537 | 18.0000 | 65.42 | 1.603001 |
| 22 | −53.7669 | 4.0000 | 39.82 | 1.869940 |
| 23 | −223.9863 | 2.0000 | | |
| 24 | 750.9742 | 13.0000 | 82.52 | 1.497820 |
| 25 | −96.7622 | 0.5000 | | |
| 26 | 607.7194 | 8.0000 | 40.76 | 1.581440 |
| 27 | −435.4150 | Bf | | |

Variable Intervals Upon Focussing and Zooming

| | Maximum Wide-Angle State | Medium Length State | Focal Maximum Telephoto State |
|---|---|---|---|
| Infinity Focussing State | | | |
| F | 200.0000 | 300.0000 | 400.0000 |
| D0 | ∞ | ∞ | ∞ |
| d5 | 6.49951 | 6.49951 | 6.49951 |
| d8 | 25.22285 | 25.22285 | 25.22285 |
| d14 | 59.72301 | 66.51693 | 45.82729 |
| d20 | 103.86943 | 47.38112 | 20.01627 |
| Bf | 222.8185 | 222.8185 | 222.8185 |
| Closest-Distance Focussing State | | | |
| β | −0.5 | −0.75 | −1.0 |
| D0 | 572.0 | 572.0 | 572.0 |
| d5 | 10.54383 | 10.54384 | 10.54383 |
| d8 | 102.06497 | 102.06505 | 102.06497 |
| d14 | 19.27979 | 26.07367 | 5.38407 |
| d20 | 103.86943 | 47.38112 | 20.01627 |
| Bf | 222.8185 | 222.8185 | 222.8185 |

Condition Corresponding Values

| f1112 = | 179.62654 |
|---|---|
| F23 = | 120.22470 (maximum wide-angle state)–227.17219 (maxixnum telephoto state) |
| f13 = | −100.0000 |
| β13 = | −25.52687 (infinity)– −23.24891 (closest-distance) |
| (1) |f1112 · F23/(f13 · F)| = | 1.02–1.08 |
| (2) |f13/f1112| < 1.1 = | 0.56 |
| (3) |1/β13| = | 0.039–0.043 |
| (4) (r2 + r1)/(r2 − r1) = | −0.58 |

As can be seen from FIG. 1 and the variable intervals upon focussing and zooming in Table 1, the focussing displacement is constant, without dependence on changes in the focal length.

FIGS. 2(a)–7(e) represent the various aberration diagrams for the first preferred embodiment. FIGS. 2(a)–2(e) show various aberrations in an infinity focussing state at a maximum wide-angle state, FIGS. 3(a)–3(e) show various aberrations in an infinity focusing state at a medium focal length state, and FIGS. 4(a)–4(e) show various aberrations in an infinity focussing state at a maximum telephoto state. In addition, FIGS. 5(a)–5(e) show various aberrations in a state with a photographic magnification of β=−0.5 at a maximum wide-angle state, FIGS. 6(a)–6(e) show various aberrations in a state with a photographic magnification of β=−0.75 at a medium focal length state, and FIGS. 7(a)–7(e) show various aberrations in a state with a photographic magnification of β=−1 at a maximum telephoto state.

In each of these graphs, NO is the F number, Y is the image height, NA is the numerical aperture, D is the d-line (λ=587.6 nm), C is the C-line (λ=656.3 nm), F is the F-line (λ=486.1 nm) and G is the g-line (λ=435.6 nm).

In each graph that represents an astigmatism, a solid curve represents the sagittal image plane and a broken curve represents the meridional image plane. Also, in each graph that represents a spherical aberration, a broken curve represents the sine condition, and each graph that represents a chromatic aberration is presented with reference to the d-line.

As can be seen from these graphs, various aberrations are satisfactorily corrected from an infinity focussing state to a close-range focussing state in various focal length states.

FIG. 8 is a drawing illustrating the lens composition, movement during zooming and movement during focussing for a zoom lens according to a second preferred embodiment of the invention. In FIG. 8, position (a) represents the lens arrangement in an infinity focussing state at a maximum wide-angle state, position (b) represents the lens arrangement in an infinity focussing state at a medium focal length state, position (c) represents the lens arrangement in an infinity focussing state at a maximum telephoto state, position (d) represents the lens arrangement with a photographic magnification of β=−0.5 at a maximum wide-angle state, position (e) represents the lens arrangement with a photographic magnification of β=−0.75 at a medium focal length state and position (f) represents the lens arrangement with a photographic magnification of β=−1 at a maximum telephoto state.

In the zoom lens of FIG. 8, the first lens group 2G1 comprises, in order from the object side: a positive lens group 2L11 including a positive cemented lens of a negative meniscus lens having a convex surface facing the object side and a biconvex lens, and a positive meniscus lens having a convex surface facing the object side; a positive lens group 2L12, including a positive cemented lens of a negative meniscus lens having a convex surface facing the object side and a positive meniscus lens having a convex surface facing the object side; and a negative lens group 2L13, including a negative cemented lens of a negative meniscus lens having a convex surface facing the object side and a positive meniscus lens having a convex surface facing the object side, and a negative cemented lens of a biconcave lens and a positive meniscus lens having a convex surface facing the object side.

Additionally, the second lens group 2G2 comprises, in order from the object side, a negative meniscus lens having a concave surface facing the object side, and a negative cemented lens of a positive meniscus lens having a concave surface facing the object side and a biconcave lens.

Further, the third lens group 2G3 comprises, in order from the object side, a positive cemented lens of a biconvex lens and a negative meniscus lens having a concave surface facing the object side, a biconvex lens, and a biconvex lens.

With the zoom lens of FIG. 8, focussing from objects to at a close range is conducted in accordance with Method 2 by having the positive lens group 2L11 and the positive lens group 2L12 toward the object side. The negative lens group 2L13 is fixed during focussing and zooming.

Table 2 below summarizes the data values for the second preferred embodiment of the invention. In Table 2, F is the focal length of the entire lens system, FNO is the F number, β is the photographic magnification, Bf is the back focus and D0 is the distance or object distance from the object to the first lens surface. Furthermore, numerals in the leftmost column represent the order of lens surfaces from the object side of the zoom lens, r is the radius of curvature of each lens surface, d is the lens surface interval, and n and ν are respectively the refractive index and Abbe's number for a d-line (λ=587.6 nm).

TABLE 2

F = 200–400
FNO = 4

| | r | d | ν | n |
|---|---|---|---|---|
| 1 | 418.3777 | 5.6000 | 35. | 1.902650 |
| 2 | 253.8804 | 15.6000 | 82.52 | 1.497820 |
| 3 | −619.7166 | 0.7000 | | |
| 4 | 170.2781 | 13.3000 | 82.52 | 1.497820 |
| 5 | 6584.4841 | (d5 = variable) | | |
| 6 | 183.2964 | 5.6000 | 39.82 | 1.869940 |
| 7 | 90.7870 | 19.6000 | 67.87 | 1.593189 |
| 8 | 2475.4565 | (d8 = variable) | | |
| 9 | 308.0347 | 4.4000 | 57.03 | 1.622801 |
| 10 | 57.7925 | 7.0000 | 33.89 | 1.803840 |
| 11 | 89.8879 | 12.0000 | | |
| 12 | −98.3120 | 4.4000 | 60.14 | 1.620409 |
| 13 | 201.5000 | 8.9000 | 25.41 | 1.805182 |
| 14 | 2880.8843 | (d14 = variable) | | |
| 15 | ∞ | 7.1000 | | |
| 16 | −140.4946 | 4.4000 | 54.01 | 1.617200 |
| 17 | −781.1864 | 4.4000 | | |
| 18 | −338.9649 | 13.3000 | 46.54 | 1.804109 |
| 19 | −51.1934 | 3.6000 | 57.03 | 1.622801 |
| 20 | 177.0161 | (d20 = variable) | | |
| 21 | 2608.8746 | 18.0000 | 65.42 | 1.603001 |
| 22 | −53.56000 | 4.0000 | 39.82 | 1.869940 |
| 23 | −186.0331 | 2.0000 | | |
| 24 | 747.4230 | 13.0000 | 82.52 | 1.497820 |
| 25 | −97.5172 | 0.5000 | | |
| 26 | 378.4583 | 8.0000 | 40.76 | 1.581440 |
| 27 | −1219.3173 | Bf | | |

Variable Intervals Upon Focussing and Zooming

| | Maximum Wide-Angle State | Medium Length State | Focal Maximum Telephoto State |
|---|---|---|---|
| | Infinity Focussing State | | |
| F | 200.0000 | 300.0000 | 400.0000 |
| D0 | ∞ | ∞ | ∞ |
| d5 | 7.60718 | 7.60718 | 7.60718 |
| d8 | 22.02611 | 22.02611 | 22.02611 |
| d14 | 14.71561 | 27.37398 | 10.34627 |
| d20 | 103.65025 | 44.27808 | 14.59199 |
| Bf | 217.5577 | 217.5577 | 217.5577 |
| | Closest-Distance Focussing State | | |
| β | −0.5 | −0.75 | −1.0 |
| D0 | 561.2 | 561.2 | 561.2 |
| d5 | 0.09158 | 0.09158 | 0.09158 |
| d8 | 104.69770 | 104.69770 | 104.69770 |
| d14 | 14.71561 | 27.37398 | 10.34627 |
| d20 | 103.65025 | 44.27808 | 14.59199 |
| Bf | 217.5577 | 217.5577 | 217.5577 |

Condition Corresponding Values

| | |
|---|---|
| f1112 = | 176.50980 |
| F23 = | 120.22470 (maximum wide-angle state)–240.44945 (maximum telephoto state) |
| f13 = | −107.0000 |
| β13 = | ∞ (infinity)–∞ (closest-distance) |
| (1) \|f1112 · F23/(f13 · F)\| = | 0.992 |
| (2) \|f13/f1112\| < 1.1 = | 0.61 |
| (3) \|1/β13\| = | 0 |
| (4) (r2 + r1)/(r2 − r1) = | −0.91 |

As can be seen from FIG. 8 and the variable intervals upon focussing and zooming in Table 2, the focussing displacement is constant, without dependence on changes in the focal length.

FIGS. 9(a)–14(e) are the various aberration diagrams for the second preferred embodiment. FIGS. 9(a)–9(e) various aberrations in an infinity focussing state at a maximum wide-angle state, FIG. 10(a)–10(e) show various aberrations in an infinity focusing state at a medium focal length state, and FIGS. 11(a)–11(e) show various aberrations in an infinity focussing state at a maximum telephoto state. In addition, FIGS. 12(a)–12(e) show various aberrations in a state within photographic magnification of β=−0.5 at the maximum wide-angle state, FIGS. 13(a)–13(e) show various aberrations in a state with a photographic magnification of β=−0.75 at a medium focal length state, and FIGS. 14(a)–14(e) show various aberrations in a state with a photographic magnification of β=−1 at the maximum telephoto state.

In each of these graphs, NO is the F number, Y is the image height, NA is the numerical aperture, D is the d-line (λ=587.6 nm), C is the C-line (λ=656.3 nm), F is the F-line (λ=486.1 nm) and G is a g-line (λ=435.6 nm).

In each graph that shows astigmatism, a solid curve represents the sagittal image plane and a broken curve represents the meridional image plane. Also, in each graph that shows spherical aberration, a broken curve represents the sine condition, and each graph that shows chromatic aberration is presented with reference to the d-line.

As can be seen from these graphs, various aberrations are satisfactorily corrected from an infinity focussing state to a close-range focussing state in various focal length states.

FIG. 15 is a drawing illustrating lens composition, movement during zooming and movement during focussing for a zoom lens according to a third preferred embodiment of the invention. In FIG. 15, position (a) represents the lens arrangement in a infinity focussing state at a maximum wide-angle state, position (b) represents the lens arrangement in a infinity focussing state at a medium focal length state, position (c) represents the lens arrangement in a infinity focussing state at maximum telephoto state, position (d) represents the lens arrangement in a state with a photographic magnification of β=−0.5 at a maximum wide-angle state, position (e) represents the lens arrangement in a state with a photographic magnification of β=−0.75 at a medium focal length state and position (f) represents the lens arrangement in a state with a photographic magnification of β=−1 at a maximum telephoto state.

In the zoom lens of FIG. 15, the first lens group 3G1 comprises, in the following order from the object side: a positive lens group 3L11 including a positive cemented lens of a negative meniscus lens having a convex surface facing the object side and a biconvex lens, and a biconvex lens; a positive lens group 3L12 including a positive cemented lens of a negative meniscus lens with a convex surface facing the object side and a positive meniscus lens having a convex surface facing the object side; and a negative lens group 3L13 including a negative cemented lens of a negative meniscus lens having a convex surface facing the object side and a positive meniscus lens having a convex surface facing the object side, and a negative cemented lens of a biconcave lens and a biconvex lens.

Additionally, the second lens group 3G2 comprises, in order from the object side, a negative meniscus lens having a concave surface facing the object side, and a negative cemented lens of a positive meniscus lens having a concave surface facing the object side and a biconcave lens.

Further, the third lens group 3G3 comprises, in order from the object side, a positive cemented lens of a biconvex lens and a negative meniscus lens having a concave surface facing the object side, a biconvex lens, and a biconvex lens.

With the zoom lens of FIG. 15, focussing from objects at infinity to at a close range is conducted in accordance with Method 3 moving the positive lens group 3L11 toward the object side and the negative lens group 3L13 toward the image side. The positive lens group 3L12 is fixed during focussing and zooming.

Table 3 below summarizes the data values for the third preferred embodiment of the invention. In Table 3, F is the focal length of the entire lens system, FNO is the F number, β is the photographic magnification, Bf is the back focus and D0 is the distance or object distance from the object to the first lens surface. Furthermore, numerals in the leftmost column represent the order of lens surfaces from the object side of the zoom lens, r is the radius of curvature of each lens surface, d is the lens surface interval, and n and ν are respectively the refractive index and Abbe's number for a d-line (λ=587.6 nm).

TABLE 3

F = 200–400
FNO = 4

|  | r | d | ν | n |
|---|---|---|---|---|
| 1 | 380.0709 | 5.6000 | 35.72 | 1.902650 |
| 2 | 193.1121 | 15.6000 | 82.52 | 1.497820 |
| 3 | −449.8209 | 0.7000 |  |  |
| 4 | 178.7961 | 13.3000 | 82.52 | 1.497820 |
| 5 | −6306.5778 | (d5 = variable) |  |  |
| 6 | 158.2089 | 5.6000 | 39.82 | 1.869940 |
| 7 | 84.8455 | 19.6000 | 67.87 | 1.593189 |
| 8 | 725.9812 | (d8 = variable) |  |  |
| 9 | 1019.0275 | 4.4000 | 57.03 | 1.622801 |
| 10 | 64.8412 | 7.0000 | 33.89 | 1.803840 |
| 11 | 93.7253 | 12.0000 |  |  |
| 12 | −120.8830 | 4.4000 | 60.14 | 1.620409 |
| 13 | 162.9164 | 8.9000 | 25.41 | 1.805182 |
| 14 | −1040.3725 | (d14 = variable) |  |  |
| 15 | ∞ | 7.1000 |  |  |
| 16 | −151.2685 | 4.4000 | 54.01 | 1.617200 |
| 17 | −25594.9850 | 4.4000 |  |  |
| 18 | −310.2962 | 13.3000 | 46.54 | 1.804109 |
| 19 | −55.9137 | 3.6000 | 57.03 | 1.622801 |
| 20 | 209.5549 | (d20 = variable) |  |  |
| 21 | 4012.2432 | 18.0000 | 65.42 | 1.603001 |
| 22 | −53.6192 | 4.0000 | 39.82 | 1.869940 |
| 23 | −179.7790 | 2.0000 |  |  |
| 24 | 768.2466 | 13.0000 | 82.52 | 1.497820 |
| 25 | −96.9107 | 0.5000 |  |  |
| 26 | 316.4992 | 8.0000 | 40.76 | 1.581440 |
| 27 | −10563.8229 | Bf |  |  |

Variable Intervals Upon Focussing and Zooming

| | Maximum Wide-Angle State | Medium Length State | Focal Maximum Telephoto State |
|---|---|---|---|
| | Infinity Focussing State | | |
| F | 200.0000 | 300.0000 | 400.0000 |
| D0 | ∞ | ∞ | ∞ |
| d5 | 14.80274 | 14.80274 | 14.80274 |
| d8 | 14.39242 | 14.39242 | 14.39242 |
| d14 | 60.34261 | 75.56044 | 59.81087 |
| d20 | 102.59773 | 43.01099 | 11.60168 |
| Bf | 215.3586 | 215.3586 | 215.3586 |
| | Closest-Distance Focussing State | | |
| β | −0.5 | −0.75 | −1.0 |
| D0 | 571.7 | 571.7 | 571.7 |
| d5 | 68.74597 | 68.74598 | 68.74598 |
| d8 | 68.33565 | 68.33566 | 68.33566 |
| d14 | 6.39938 | 21.61720 | 5.86763 |
| d20 | 102.59773 | 43.01099 | 11.60168 |
| Bf | 215.3586 | 215.3586 | 215.3586 |

TABLE 3-continued

| Condition Corresponding Values | |
|---|---|
| f1112 = | 188.25514 |
| F23 = | 120.26845 (maximum wide-angle state)–265.68946 (maximum telephoto state) |
| f13 = | –120.0000 |
| β13 = | –15.76288 (infinity)–-15.27601 (closest-distance) |
| (1) |f1112| F23/(f13 · F)| = | 0.943–1.042 |
| (2) |f13/f1112| < 1.1 = | 0.64 |
| (3) |1/β13| = | 0.063–0.065 |
| (4) (r2 + r1)/(r2 – r1) = | –1.34 |

As can be seen from FIG. 15 and the variable intervals in Table 3, the focussing displacement is constant, without dependence on changes in the focal length.

FIGS. 16(a)–21(e) are the various aberration diagrams for the third preferred embodiment. FIG. 16(a)–16(e) show various aberrations in an infinity focussing state at a maximum wide-angle state, FIGS. 17(a)–17(e) show various aberrations in an infinity focusing state at a medium focal length state, and FIGS. 18(a)–18(e) show various aberrations in an infinity focussing state at a maximum telephoto state. In addition, FIGS. 19(a)–19(e) show various aberrations in a state with a photographic magnification of β=–0.5 at a maximum wide-angle state, FIGS. 20(a)–20(e) show various aberrations in a state with a photographic magnification of β=–0.75 at a medium focal length state, and FIGS. 21(a)–21(e) show various aberrations in a state with a photographic magnification of β=–1 at maximum telephoto state.

In each of these graphs, NO is the F number, Y is the image height, NA is the numerical aperture, D is the d-line (λ=587.6 nm), C is the C-line (λ=656.3 nm), F is the F-line (λ=486.1 nm) and G is a g-line (λ=435.6 nm).

In each graph that shows astigmatism, a solid curve represents the sagittal image plane and a broken curve represents the meridional image plane. Also, in each graph that shows spherical aberration, a broken curve represents the sine condition, and each graph that shows chromatic aberration is presented with reference to the d-line.

As can be seen from these graphs, various aberrations are satisfactorily corrected from an infinity focussing state to a close-range focussing state in various focal length states.

FIG. 22 is a drawing illustrating a lens composition, movement during zooming and movement during focussing for a zoom lens according to a fourth preferred embodiment of the invention. In FIG. 22, position (a) represents the lens arrangement in the infinity focussing state at a maximum wide-angle state, position (b) represents the lens arrangement in an infinity focussing state at a medium focal length state, position (c) represents the lens arrangement in an infinity focussing state at a maximum telephoto state, position (d) represents the lens arrangement in a state with a photographic magnification of β=–0.5 at a maximum wide-angle state, position (e) represents the lens arrangement in a state with a Photographic magnification of β=–0.75 at a medium focal length state and position (f) represents the lens arrangement in a state with a photographic magnification of β=–1 at a maximum telephoto state.

In the zoom lens of FIG. 22, the first lens group 4G1 comprises, in the following order from the object side: a positive lens group 4L11 including a positive cemented lens of a negative meniscus lens having a convex surface facing the object side and a biconvex lens, and a positive meniscus lens having a convex surface facing the object side; a positive lens group 4L12 including a positive cemented lens of a negative meniscus lens having a convex surface facing the object side and a positive meniscus lens having a convex surface facing the object side; and a negative lens group 4L13 including a negative cemented lens of a negative meniscus lens having a convex surface facing the object side and a positive meniscus lens having a convex surface facing the object side, and a negative cemented lens of a biconcave lens and a biconvex lens.

In addition, the second lens group 4G2 comprises, in the following order from the object side, a negative meniscus lens having a concave surface facing the object side, and a negative cemented lens of a positive meniscus lens having a concave surface facing the object side and a biconcave lens.

Furthermore, the third lens group 4G3 comprises, in the following order from the object side, a positive cemented lens of a biconvex lens and a negative meniscus lens having a concave surface facing the object side, a biconvex lens, and a biconvex lens.

With the zoom lens of FIG. 22, focussing from objects at infinity to close range objects is conducted in accordance with Method 4 moving the positive lens group 4L12 toward the object side and the negative lens group 4L13 to move toward the image side. That is to say, the positive lens group 4L11 is fixed during focussing and zooming.

Table 4 below summarizes the data values for the fourth preferred of the invention. In Table 4, F is the focal length of the entire lens system, FNO is the F number, β is the photographic magnification, Bf is the back focus and D0 is the distance or object distance from the object to the first lens surface. Furthermore, numerals in the leftmost column represent the order of lens surfaces from the object side of the zoom lens, r is the radius of curvature of each lens surface, d is the lens surface interval, and n and ν are respectively the refractive index and Abbe's number for a d-line (λ=587.6 nm).

TABLE 4

| | F = 200–400 FNO = 4 | | | |
|---|---|---|---|---|
| | r | d | ν | n |
| 1 | 408.1949 | 5.6000 | 35.72 | 1.902650 |
| 2 | 236.8330 | 15.6000 | 82.52 | 1.497820 |
| 3 | –563.6803 | 0.7000 | | |
| 4 | 168.7070 | 13.3000 | 82.52 | 1.497820 |
| 5 | 3960.9202 | (d5 = variable) | | |
| 6 | 169.6147 | 5.6000 | 39.82 | 1.869940 |
| 7 | 90.3303 | 19.6000 | 67.87 | 1.593189 |
| 8 | 944.2422 | (d8 = variable) | | |
| 9 | 503.9006 | 4.4000 | 57.03 | 1.622801 |
| 10 | 67.8574 | 7.0000 | 33.89 | 1.803840 |
| 11 | 83.0626 | 12.0000 | | |
| 12 | –98.1129 | 4.4000 | 60.14 | 1.620409 |
| 13 | 191.7389 | 8.9000 | 25.41 | 1.805182 |
| 14 | –495.6790 | (d14 = variable) | | |
| 15 | ∞ | 7.1000 | | |
| 16 | –151.0614 | 4.4000 | 54.01 | 1.617200 |
| 17 | –1131.6318 | 4.4000 | | |
| 18 | –332.5643 | 13.3000 | 46.54 | 1.804109 |
| 19 | –55.7196 | 3.6000 | 57.03 | 1.622801 |
| 20 | 191.9939 | (d20 = variable) | | |
| 21 | 2393.0752 | 18.0000 | 65.42 | 1.603001 |
| 22 | –53.7517 | 4.0000 | 39.82 | 1.869940 |
| 23 | –196.5058 | 2.0000 | | |
| 24 | 732.9417 | 13.0000 | 82.52 | 1.497820 |
| 25 | –97.2486 | 0.5000 | | |
| 26 | 404.2985 | 8.0000 | 40.76 | 1.581440 |
| 27 | –768.9360 | Bf | | |

TABLE 4-continued

| | Variable Intervals Upon Focussing and Zooming | | |
|---|---|---|---|
| | Maximum Wide-Angle State | Medium Length State | Focal Maximum Telephoto State |
| | Infinity Focussing State | | |
| F | 200.0000 | 300.0000 | 400.0000 |
| D0 | ∞ | ∞ | ∞ |
| d5 | 11.61089 | 11.61089 | 11.61089 |
| d8 | 23.35819 | 23.35819 | 23.35819 |
| d14 | 81.47946 | 94.13782 | 77.11010 |
| d20 | 103.32555 | 43.95339 | 14.26730 |
| Bf | 217.9831 | 217.9831 | 217.9831 |
| | Closest-Distance Focussing State | | |
| β | −0.5 | −0.75 | −1.0 |
| D0 | 559.4 | 559.4 | 559.4 |
| d5 | 1.30205 | 1.30205 | 1.30205 |
| d8 | 107.30160 | 107.30160 | 107.30160 |
| d14 | 7.84489 | 20.50325 | 3.47553 |
| d20 | 103.32555 | 43.95339 | 14.26730 |
| Bf | 217.9831 | 217.9831 | 217.9831 |

| Condition Corresponding Values | |
|---|---|
| f1112 = | 175.96231 |
| F23 = | 120.22470 (maximum wide-angle state)– |
| | 240.444942 (maximum telephoto state) |
| F13 = | −107.0000 |
| β13 = | ∞ (infinity)–678.23326 (closest-distance) |
| (1) lf1112 · F23/(f13 · F)l = | 0.989 |
| (2) lf13/f1112l < 1.1 = | 0.61 |
| (3) l1/β13l = | 0–0.001 |
| (4) (r2 + r1)/(r2 − r1) = | −1.88 |

As can be seen from in FIG. 22 and the variable intervals upon focussing and zooming in Table 4, the focussing displacement is constant, without dependence on changes in the focal length.

FIGS. 23(a)–28(e) are the various aberration diagrams for the fourth preferred embodiment. FIGS. 23(a)–23(e) show various aberrations in an infinity focussing state at the maximum wide-angle state, FIGS. 24(a)–24(e) show various aberrations in an infinity focusing state at a medium focal length state, and FIGS. 25(a)–25(e) show various aberrations in an infinity focussing state at a maximum telephoto state. In addition, FIGS. 26(a)–26(e) show various aberrations in a state with a photographic magnification of β=−0.5 at a maximum wide-angle state, FIG. 27(a)–27(e) show various aberrations in a state with a photographic magnification of β=−0.75 at a medium focal length state, and FIGS. 28(a)–28(e) show various aberrations in a state with a photographic magnification of β=−1 at a maximum telephoto state.

In each of these graphs, NO is the F number, Y is the image height, NA is the numerical aperture, D is the d-line (λ=587.6 nm), C is the C-line (λ=656.3 nm), F is the F-line (λ=486.1 nm) and G is a g-line (λ=435.6 nm).

In each graph that shows astigmatism, a solid curve represents the sagittal image plane and a broken curve represents the meridional image plane. Also, in each graph that shows spherical aberration, a broken curve represents the sine condition, and each graph that shows chromatic aberration is presented with reference to the d-line.

As can be seen from these graphs, various aberrations are satisfactorily corrected from an infinity focussing state to a close-range focussing state in various focal length states.

FIG. 29 is a drawing illustration showing a lens composition, movement during zooming and movement during focussing for a zoom lens according to a fifth preferred embodiment of the invention. In FIG. 29, position (a) represents the lens arrangement in the infinity focussing state at a maximum wide-angle state, position (b) represents the lens arrangement in an infinity focussing state at a medium focal length state, position (c) represents the lens arrangement in an infinity focussing state at a maximum telephoto state, position (e) represents the lens arrangement in a state with a photographic magnification of β=−0.5 at a maximum wide-angle state, position (e) represents the lens arrangement in a state with a photographic magnification of β=−0.75 at a medium focal length state and position (f) represents the lens arrangement in a state with a photographic magnification of β=−1 at a maximum telephoto state.

In the zoom lens of FIG. 29, the first lens group 5G1 comprises, in order from the object side: a positive lens group 5L11, including a positive cemented lens of a negative meniscus lens having a convex surface facing the object side and a biconvex lens, and a biconvex lens; a positive lens groups 5L12, including a positive cemented lens of a negative meniscus lens having a convex surface facing the object side and a positive meniscus lens having a convex surface facing the object side; and a negative lens group 5L13, including a negative cemented lens of a negative meniscus lens having a convex surface facing the object side and a positive meniscus lens with a convex surface facing the object side, and a negative cemented lens of a biconcave lens and positive meniscus lens having a convex surface facing the object side.

In addition, the second lens group 5G2 comprises, in order from the object side, a biconcave lens and a negative cemented lens of a positive meniscus lens having a concave surface facing the object side and a biconcave lens.

Furthermore, the third lens group 5G3 comprises, in order from the object side, a positive cemented lens of a biconvex lens and a negative meniscus lens with a concave surface facing the object side, a biconvex lens, and a biconvex lens.

With the zoom lens of FIG. 29, focussing from objects at infinity to at a close range is conducted in accordance with Method 5 moving only the positive lens group 5L11 toward the object side. The positive lens group 5L12 and the negative lens group 5L13 are fixed during focussing and zooming.

Table 5 below summarizes the data values of embodiment 5 of the present invention. In Table 5, F is the focal length of the entire lens system, FNO is the F number, β is the photographic magnification, Bf is the back focus and D0 is the distance or object distance from the object to the first lens surface. Furthermore, numerals in the leftmost column represent the order of lens surfaces from the object side of the zoom lens, r is the radius of curvature of each lens surface, d is the lens surface interval, and n and ν are respectively the refractive index and Abbe's number for a d-line (λ=587.6 nm).

TABLE 5

| F = 200–400 FNO = 4 | | | |
|---|---|---|---|
| r | d | ν | n |
| 1 | 556.6699 | 5.6000 | 35.72 | 1.902650 |
| 2 | 182.4891 | 15.6000 | 82.52 | 1.497820 |

TABLE 5-continued

| | | | | |
|---|---|---|---|---|
| 3 | −348.0021 | 0.7000 | | |
| 4 | 196.9633 | 13.3000 | 82.52 | 1.497820 |
| 5 | −497.0185 | (d5 = variable) | | |
| 6 | 133.7195 | 5.6000 | 39.82 | 1.869940 |
| 7 | 106.4819 | 10.0000 | 67.87 | 1.593189 |
| 8 | 363.0432 | (d8 = variable) | | |
| 9 | 955.5803 | 4.4000 | 57.03 | 1.622801 |
| 10 | 48.1582 | 10.0000 | 33.89 | 1.803840 |
| 11 | 98.8898 | 12.0000 | | |
| 12 | −128.8526 | 4.4000 | 60.14 | 1.620409 |
| 13 | 230.4363 | 8.9000 | 25.41 | 1.805182 |
| 14 | 297.9689 | (d14 = variable) | | |
| 15 | ∞ | 7.1000 | | |
| 16 | −345.2112 | 4.4000 | 54.01 | 1.617200 |
| 17 | 257.6341 | 4.4000 | | |
| 18 | −334.7550 | 13.3000 | 46.54 | 1.804109 |
| 19 | −51.0355 | 3.6000 | 57.03 | 1.622801 |
| 20 | 211.2261 | (d20 = variable) | | |
| 21 | 734.9501 | 18.0000 | 65.42 | 1.603001 |
| 22 | −54.0709 | 4.0000 | 39.82 | 1.869940 |
| 23 | −221.1085 | 2.0000 | | |
| 24 | 1112.1401 | 13.0000 | 82.52 | 1.497820 |
| 25 | −93.2704 | 0.5000 | | |
| 26 | 327.8607 | 8.0000 | 40.76 | 1.581440 |
| 27 | −1555.3522 | Bf | | |

Variable Intervals Upon Focussing and Zooming

| | Maximum Wide-Angle State | Medium Length State | Focal Maximum Telephoto State |
|---|---|---|---|
| Infinity Focussing State | | | |
| F | 200.0000 | 300.0000 | 400.0000 |
| D0 | ∞ | ∞ | ∞ |
| d5 | 28.90961 | 28.90961 | 28.90961 |
| d8 | 4.00000 | 4.00000 | 4.00000 |
| d14 | 19.09747 | 35.02232 | 20.25555 |
| d20 | 103.84734 | 43.02611 | 12.08045 |
| Bf | 214.0865 | 214.0865 | 214.0865 |
| Closest-Distance Focussing State | | | |
| β | −0.5 | −0.75 | −1.0 |
| D0 | 618.3 | 618.3 | 618.3 |
| d5 | 161.15691 | 161.15691 | 161.15691 |
| d8 | 4.00000 | 4.00000 | 4.00000 |
| d14 | 19.09747 | 35.02232 | 20.25555 |
| d20 | 103.84734 | 43.02611 | 12.08045 |
| Bf | 214.0865 | 214.0865 | 214.0865 |

Condition Corresponding Values

| | |
|---|---|
| f1112 = | 196.27288 |
| F23 | 120.22470 (maximum wide-angle state)–247.99191 (inaxixaum telephoto state) |
| f13 = | −95.4375 |
| β13 = | 56.03845 (infinity)–40.03126 (closest-distance) |
| (1) lf1112 · F23/(f13 · F)l = | 1.236–1.275 |
| (2) lf13/f1112l < 1.1 = | 0.862 |
| (3) l1/β13l = | 0.018–0.025 |
| (4) (r2 + r1)/(r2 − r1) = | 0.07 |

As can be seen from FIG. 29 and the variable intervals upon focussing and zooming in Table 5, the focussing displacement is constant, without having no dependence on changes in the focal length.

FIGS. 30(a)–35(e) are the various aberration diagrams for the fifth preferred embodiment. FIGS. 30(a)–30(e) show various aberrations in an infinity focussing state at a maximum wide-angle state, FIGS. 31(a)–31(e) show various aberrations in an infinity focusing state at a medium focal length state, and FIGS. 32(a)–32(e) show various aberrations in an infinity focussing state at the maximum telephoto state. In addition, FIGS. 33(a)–33(e) show various aberrations in a state where the photographic magnification β=−0.5 at the maximum wide-angle state, FIGS. 34(a)–34(e) show various aberrations in a state with a photographic magnification of β=−0.75 at a medium focal length state, and FIGS. 35(a)–35(e) show various aberrations in a state with a photographic magnification of β=−1 at a maximum telephoto state.

In each of these graphs, NO is the F number, Y is the image height, NA is the numerical aperture, D is the d-line (λ=587.6 nm), C is the C-line (λ=656.3 nm), F is the F-line (λ=486.1 nm) and G is a g-line (λ=435.6 nm).

In each graph that shows astigmatism, a solid curve represents the sagittal image plane and a broken curve represents the meridional image plane. Also, in each graph that shows spherical aberration, a broken curve represents the sine condition, and each graph that shows chromatic aberration is presented with reference to the d-line.

As can be seen from these graphs, aberrations are satisfactorily corrected from an infinity focussing state to a close-range focussing state in various focal length states.

FIG. 36 is a drawing illustrating a lens composition, movement during zooming and movement during focussing for a zoom lens according to a sixth preferred embodiment of the invention. In FIG. 36, position (a) represents the lens arrangement in an infinity focussing state at a maximum wide-angle state, position (b) represents the lens arrangement in an infinity focussing state at a medium focal length state, position (c) represents the lens arrangement in an infinity focussing state at a maximum telephoto state, position (e) represents the lens arrangement in a state with a photographic magnification of β=−0.5 at a maximum wide-angle state, position (e) represents the lens arrangement in a state with a photographic magnification of β=−0.75 at a medium focal length state and position (f) represents the lens arrangement in a state with a photographic magnification of β=−1 at a maximum telephoto state.

In the zoom lens of FIG. 36, the first lens group 6G1 comprises, in order from the object side: a positive lens group 6L11, including a positive cemented lens of a negative meniscus lens having a convex surface facing the object side and a positive meniscus lens having a convex surface facing the object side; a positive lens group 6L12, including a positive cemented lens of a negative meniscus lens having a convex surface facing the object side and a biconvex lens, and a biconvex lens; and a negative lens group 6L13, including a negative cemented lens of a negative meniscus lens having a convex surface facing the object side and a positive meniscus lens with a convex surface facing the object side, and a negative cemented lens of a biconcave lens and a biconvex lens.

In addition, the second lens group 6G2 comprises, in order from the object side, a negative meniscus lens having a concave surface facing the object side, and a negative cemented lens of a positive meniscus lens having a concave surface facing the object side and a biconcave lens.

Furthermore, the third lens group 6G3 comprises, in order from the object side, a positive cemented lens of a biconvex lens and a negative meniscus lens having a concave surface facing the object side, a biconvex lens, and a biconvex lens.

With the sixth preferred embodiment, focussing from objects at infinity to at a close range is conducted in accordance with method 6 moving only the positive lens group 6L12 toward the object side. The positive lens group 6L11 and the negative lens group 6L13 are fixed during focussing and zooming.

Table 6 below summarizes the data values of the sixth preferred embodiment of the invention. In Table 6, F is the focal length of the entire lens system, FNO is the F number, β is the photographic magnification, Bf is the back focus and D0 is the distance or object distance from the object to the first lens surface. Furthermore, numerals in the leftmost column represent the order of lens surfaces from the object side, r is the radius of curvature of each lens surface, d is the lens surface interval, and n and ν are respectively the refractive index and Abbe's number for a d-line (λ=587.6 nm).

TABLE 6

F = 200–400
FNO = 4

| | r | d | ν | n |
|---|---|---|---|---|
| 1 | 255.6537 | 5.6000 | 39.82 | 1.869940 |
| 2 | 126.3852 | 19.6000 | 67.87 | 1.593189 |
| 3 | 2784.8019 | (d3 = variable) | | |
| 4 | 386.5664 | 5.6000 | 35.72 | 1.902650 |
| 5 | 193.1585 | 15.6000 | 82.52 | 1.497820 |
| 6 | −615.7456 | 0.7000 | | |
| 7 | 194.4847 | 13.3000 | 82.52 | 1.497820 |
| 8 | −533.1285 | (d8 = variable) | | |
| 9 | 816.4898 | 4.4000 | 57.03 | 1.622801 |
| 10 | 59.7610 | 7.0000 | 33.89 | 1.803840 |
| 11 | 92.4724 | 12.0000 | | |
| 12 | −99.5035 | 4.4000 | 60.14 | 1.620409 |
| 13 | 160.9973 | 8.9000 | 25.41 | 1.805182 |
| 14 | −1340.1601 | (d14 = variable) | | |
| 15 | ∞ | 7.1000 | | |
| 16 | −173.8530 | 4.4000 | 54.01 | 1.617200 |
| 17 | −733.3478 | 4.4000 | | |
| 18 | −420.9292 | 13.3000 | 46.54 | 1.804109 |
| 19 | −56.6412 | 3.6000 | 57.03 | 1.622801 |
| 20 | 176.8655 | (d20 = variable) | | |
| 21 | 715.3496 | 18.0000 | 65.42 | 1.603001 |
| 22 | −53.8376 | 4.0000 | 39.82 | 1.869940 |
| 23 | −236.9390 | 2.0000 | | |
| 24 | 815.8506 | 13.0000 | 82.52 | 1.497820 |
| 25 | −95.1784 | 0.5000 | | |
| 26 | 543.7465 | 8.0000 | 40.76 | 1.581440 |
| 27 | −445.7085 | Bf | | |

| | Maximum Wide-Angle State | Medium Length State | Focal Maximum Telephoto State |
|---|---|---|---|
| Variable Intervals Upon Focussing and Zooming Infinity Focussing State | | | |
| F | 200.0000 | 300.0000 | 400.0000 |
| D0 | ∞ | ∞ | ∞ |
| d3 | 111.47385 | 111.47385 | 111.47385 |
| d8 | 33.28333 | 33.28333 | 33.28333 |
| d14 | 10.32750 | 25.82401 | 10.51197 |
| d20 | 106.50741 | 43.77857 | 15.17606 |
| Bf | 215.2996 | 215.2996 | 215.2996 |
| Closest-Distance Focussing State | | | |
| β | −0.5 | −0.75 | −1.0 |
| D0 | 528.5 | 528.5 | 528.5 |
| d3 | 9.17418 | 9.17418 | 9.17418 |
| d8 | 135.58300 | 135.58300 | 135.58296 |
| d14 | 10.32750 | 25.82401 | 10.51197 |
| d20 | 106.50741 | 43.77857 | 15.17606 |
| Bf | 215.2996 | 215.2996 | 215.2996 |

| Condition Corresponding Values | |
|---|---|
| f1112 = | 189.02435 |
| F23 = | 120.44463 (maximum wide-angle state)–209.96953 (maximum telephoto state) |
| f13 = | −107.00000 |
| β13 = | −8.64153 (infinity)– −9.90380 (closest-distance) |
| (1) \|f1112 · F23/(f13 · F)\| = | 0.927–1.064 |

TABLE 6-continued

| (2) \|f13/f1112\| < 1.1 = | 0.57 |
| (3) \|1/β13\| = | 0.100–0.116 |
| (4) (r2 + r1)/(r2 − r1) = | −1.30 |

As can be seen from FIG. 36 and the variable intervals upon focussing and zooming in Table 6, the focussing displacement is constant, without dependence on changes in the focal length.

FIGS. 37(a)–42(d) are the various aberration diagrams for the sixth preferred embodiment. FIGS. 37(a)–37(d) show various aberrations in an infinity focussing state at a maximum wide-angle state, FIGS. 38(a)–38(d) show various aberrations in an infinity focusing state at a medium focal length state, and FIGS. 39(a)–39(d) show various aberrations in an infinity focussing state at a maximum telephoto state. In addition, FIGS. 40(a)–40(d) show various aberrations in a state where the photographic magnification of β=−0.5 at a maximum wide-angle state, FIGS. 41(a)–41(d) show various aberrations in a state with a photographic magnification of β=−0.75 at a medium focal length state, and FIGS. 42(a)–42(d) show various aberrations in a state with a photographic magnification of β=−1 at a maximum telephoto state.

In each of these graphs, NO is the F number, Y is the image height, NA is the numerical aperture and D is a d-line (λ=587.6 nm).

In each graph that shows astigmatism, a solid curve represents the sagittal image plane and a broken curve represents the meridional image plane. Also, in each graph that shows spherical aberration, a broken curve represents the sine condition.

As can be seen from these graphs, various aberrations are satisfactorily corrected from an infinity focussing state to a close-range focussing state in various focal length states.

FIG. 43 is a drawing illustrating a lens composition, movement during zooming and movement during focussing for a zoom lens according to a seventh preferred embodiment of the invention. In FIG. 43, position (a) represents the lens arrangement in an infinity focussing state at the maximum wide-angle state, position (b) represents the lens arrangement in an infinity focussing state at a medium focal length state, position (c) represents the lens arrangement in an infinity focussing state at a maximum telephoto state, position (d) represents the lens arrangement in a state with a photographic magnification of β=−0.5 at a maximum wide-angle state, position (e) represents the lens arrangement in a state with a photographic magnification of β=−0.75 at a medium focal length state and position (f) represents the lens arrangement in a state with a photographic magnification of β=−1 at the maximum telephoto state.

In the zoom lens of FIG. 43, the first lens group 7G1 comprises, in order from the object side: a positive lens group 7L11, including a positive cemented lens of a negative meniscus lens having a convex surface facing the object side and a biconvex lens, and a biconvex lens; a positive lens group 7L12, including a positive cemented lens of a negative meniscus lens having a convex surface facing the object side and a positive meniscus lens with a convex surface facing the object side; and a negative lens group 7L13, including a negative cemented lens of a negative meniscus lens having a convex surface facing the object side and a positive meniscus lens having a convex surface facing the object side, and a negative cemented lens of a biconcave lens and a biconvex lens.

The second lens group 7G2 comprises, in order from the object side, a negative meniscus lens having a concave surface facing the object side, and a negative cemented lens of a positive meniscus lens having a concave surface facing the object side and a biconcave lens.

The third lens group 7G3 comprises, in order from the object side, a positive cemented lens of a biconvex lens and a negative meniscus lens with a concave surface facing the object side, a biconvex lens, and a biconvex lens.

With the seventh preferred embodiment, focussing from objects at infinity to at a close range is conducted in accordance with Method 7 moving only the negative lens group 7L13 to move toward the image side. The positive lens group 7L12 and the positive lens group L12 are fixed during focussing and zooming.

Table 7 below summarizes the data values of the seventh preferred embodiment of the invention. In Table 7, F is the focal length of the entire lens system, FNO is the F number, $\beta$ is the photographic magnification, Bf is the back focus and D0 is the distance or object distance from the object to the first lens surface. Furthermore, numerals in the leftmost column represent the order of lens surfaces from the object side of the zoom lens, r is the radius of curvature of each lens surface, d is the lens surface interval, and n and $\nu$ are respectively the refractive index and Abbe's number for a d-line ($\lambda$=587.6 nm).

TABLE 7

F = 200–400
FNO = 4

| | r | d | ν | n |
|---|---|---|---|---|
| 1 | 410.9497 | 5.6000 | 35.72 | 1.902650 |
| 2 | 220.1384 | 15.6000 | 82.52 | 1.497820 |
| 3 | −538.5614 | 0.7000 | | |
| 4 | 173.9864 | 13.3000 | 82.52 | 1.497820 |
| 5 | −7174.9744 | (d5 = variable) | | |
| 6 | 162.1521 | 5.6000 | 39.82 | 1.869940 |
| 7 | 89.7858 | 19.6000 | 67.87 | 1.593189 |
| 8 | 689.1971 | (d8 = variable) | | |
| 9 | 714.1296 | 4.4000 | 57.03 | 1.622801 |
| 10 | 66.8957 | 7.0000 | 33.89 | 1.803840 |
| 11 | 83.5594 | 12.0000 | | |
| 12 | −99.7323 | 4.4000 | 60.14 | 1.620409 |
| 13 | 176.7269 | 8.9000 | 25.41 | 1.805182 |
| 14 | −468.1068 | (d14 = variable) | | |
| 15 | ∞ | 7.1000 | | |
| 16 | −147.3471 | 4.4000 | 54.01 | 1.617200 |
| 17 | −797.0255 | 4.4000 | | |
| 18 | −341.6118 | 13.3000 | 46.54 | 1.804109 |
| 19 | −55.3579 | 3.6000 | 57.03 | 1.622801 |
| 20 | 180.6234 | (d20 = variable) | | |
| 21 | 797.7537 | 18.0000 | 65.42 | 1.603001 |
| 22 | −53.7669 | 4.0000 | 39.82 | 1.869940 |
| 23 | −223.9863 | 2.0000 | | |
| 24 | 750.9742 | 13.0000 | 82.52 | 1.497820 |
| 25 | −96.7622 | 0.5000 | | |
| 26 | 607.7194 | 8.0000 | 40.76 | 1.581440 |
| 27 | −435.4150 | Bf | | |

| | Maximum Wide-Angle State | Medium Length State | Focal Maximum Telephoto State |
|---|---|---|---|
| Variable Intervals Upon Focussing and Zooming Infinity Focussing State | | | |
| F | 200.0000 | 300.0000 | 400.0000 |
| D0 | ∞ | ∞ | ∞ |
| d5 | 14.80000 | 14.80000 | 14.80000 |
| d8 | 21.84248 | 21.84248 | 21.84248 |
| d14 | 85.40954 | 98.06790 | 81.04018 |
| d20 | 103.86945 | 44.49729 | 14.81120 |
| Bf | 217.5510 | 217.5510 | 217.5510 |

TABLE 7-continued

| Closest-Distance Focussing State | | | |
|---|---|---|---|
| β | −0.5 | −0.75 | −1.0 |
| D0 | 563.3 | 563.3 | 563.3 |
| d5 | 14.80000 | 14.80000 | 14.80000 |
| d8 | 101.05248 | 101.05248 | 101.05248 |
| d14 | 6.19954 | 18.85790 | 1.83018 |
| d20 | 103.86945 | 44.49729 | 14.81120 |
| Bf | 217.5510 | 217.5510 | 217.5510 |

| Condition Corresponding Values | |
|---|---|
| f1112 = | 178.00000 |
| F23 = | 120.22470 (maximum wide-angle state)–240.44942 (maximum telephoto state) |
| f13 = | −107.00000 |
| β13 = | ∞ (infinity)–∞ (closest-distance) |
| (1) \|f1112 · F23/(f13 · F)\| = | 1.00 |
| (2) \|f13/f1112\| < 1.1 = | 0.60 |
| (3) \|1/β13\| = | 0 |
| (4) (r2 + r1)/(r2 − r1) = | −1.92 |

As can be seen from FIG. 43 and the variable intervals upon focussing and zooming in Table 7, the focussing displacement is constant, without dependence on changes in the focal length.

FIGS. 44(a)–49(e) are the various aberration diagrams for the seventh preferred embodiment. FIGS. 44(a)–44(e) show various aberrations in an infinity focussing state at a maximum wide-angle state, FIGS. 45(a)–45(e) show various aberrations in an infinity focusing state at a medium focal length state, and FIGS. 46(a)–46(e) show various aberrations in an infinity focussing state at a maximum telephoto state. FIGS. 47(a)–47(e) show various aberrations in a state with a photographic magnification of $\beta$=−0.5 at a maximum wide-angle state, FIGS. 48(a)–48(e) show various aberrations in a state with a photographic magnification of $\beta$=−0.75 at a medium focal length state, and FIGS. 49(a)–49(e) show various aberrations in a state with a photographic magnification of $\beta$=−1 at a maximum telephoto state.

In each of these graphs, NO is the F number, Y is the image height, NA is the numerical aperture, D is the d-line ($\lambda$=587.6 nm), C is the C-line ($\lambda$=656.3 nm), F is the F-line ($\lambda$=486.1 nm) and G is a g-line ($\lambda$=435.6 nm).

In each graph that shows astigmatism, a solid curve represents the sagittal image plane and a broken curve represents the meridional image plane. Also, in each graph that shows spherical aberration, a broken curve represents the sine condition, and in each graph that shows chromatic aberration is presented with reference to the d-line.

As can be seen from these graphs, various aberrations are satisfactorily corrected from an infinity focussing state to a close-range focussing state in various focal length states.

As described above, in the present invention the focussing displacement is constant, not dependent on changes in the focal length. Accordingly, it is possible to realize a zoom lens that is capable of close-range photography ($\beta$=−0.5 to −1.0) in which it is possible to instantly change the photographic magnification of the object. Additionally, there is relatively little dead space, and distortion is kept to extremely low levels.

In the zoom lens according to the invention, it is possible to conduct shake correction, i.e., correction of fluctuations in the image position caused by camera shakes or the like, by having the fixed lens group in the first lens group G1 in a direction orthogonal to the optical axis.

Figure 50:
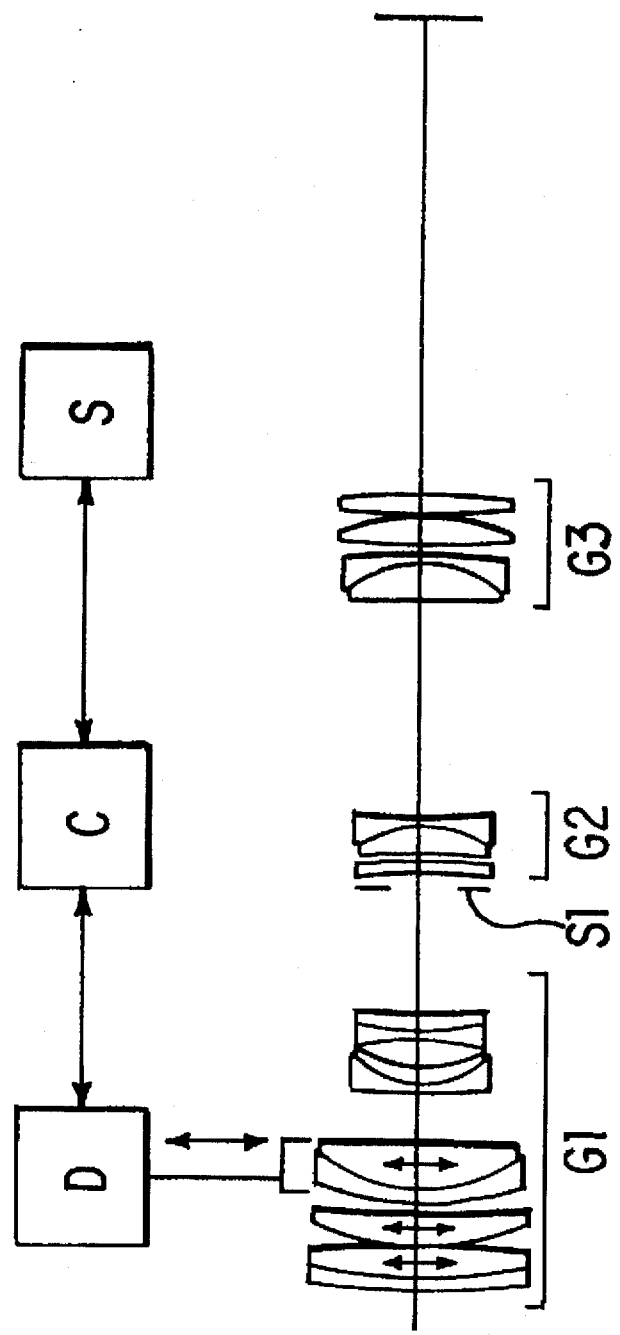
FIG. 50 is a drawing illustrating shake correction.

The zoom lens system may also include a system to conduct shake correction. As seen in FIG. 50, a driving device D for decentering at least one with respect to the optical axis is connected to the zoom lens system.

A shake detection device S is connected to the zoom lens system 1 for detecting shaking of the optical system and generating a signal. A computation device C processes a signal from the shake detection devices and converts the signal into a decentering signal. This decentering signal is transmitted to the decentering device D for decentering at least one of the first lens group first positive lens group, the first lens group second positive lens group, and the first lens group negative lens group by a predetermined amount with respect to the optical axis. Thus, the zoom lens system can conduct shake correction.

The shake correction is conducted by causing the one of the first lens group first positive lens group, the lens group second positive lens and the first lens group negative lens group that is fixed during focussing, to move in a direction generally orthogonal to the optical axis. Thus, reimaging position can be corrected if it is misaligned due to the shake correction is conducted by causing the one of the first lens group first positive lens group, the lens group second positive lens and the first lens group negative lens group being off centered from the optical axis.

What is claimed is:

1. An optical zoom lens system capable of close range photography, the zoom lens system defining an object side, an optical axis, a zooming loci and an image plane in the zoom lens, in order from the object side, comprising:

a first lens group having a weak refractive power;

a second lens group having a negative refractive power; and a third lens group having a positive refractive power;

wherein the first lens group comprises, in order from the object side: a first lens group first positive lens group, a first lens group second positive lens group and a first lens group negative lens group; the first lens group is fixed while the second lens group moves along a convex locus of the zooming loci with respect to the image plane and the third lens group moves from the image side toward the object side during zooming from the maximum wide-angle state to the maximum telephoto state; at least one of the first lens group first positive lens group, first lens group second positive lens group and first lens group negative lens group moves along the optical axis during focussing from objects at infinity to at a close-range; and, the zoom lens system satisfies conditions:

$$0.7 < |f1112 \cdot F23/(f13 \cdot F)| < 1.5 \quad 0.3 < |f13/f1112| < 1.1$$

where f1112 is a combined focal length of the first lens group first positive lens group and the first lens group second positive lens group, f13 is a focal length of the first lens group negative lens group, F23 is a combined focal length of the second lens group and the third lens group and F is a focal length of the zoom lens system.

2. A zoom lens system according to claim 1, wherein the first lens group first positive lens group, the first lens group second positive lens group and the first lens group negative lens group move along the optical axis during focussing from objects at infinity to at a close-range.

3. The zoom lens system according to claim 2, wherein the zoom lens system further satisfies the condition $$-2 < (r2+r1)/(r2-r1) < 1$$

where r1 is a radius of curvature of a lens surface closest to the image side in the first lens group negative lens group, and r2 is a radius of curvature of a lens surface closest to the object side in the second lens group.

4. The zoom lens system according to claim 3, wherein an imaging position of the zoom lens system is misaligned from the optical axis at least one of the first lens group first positive lens group, the first lens group second positive lens group, and the first lens group negative lens group.

5. A zoom lens system according to claim 1, wherein the first lens group first positive lens group and the first lens group second positive lens group move along the optical axis during focussing from objects at infinity at a to close-range.

6. The zoom lens system according to claim 5, wherein the zoom lens system further satisfies the condition $$-2 < (r2+r1)/(r2-r1) < 1$$

where r1 is a radius of curvature of a lens surface closest to the image side in the first lens group negative lens group, and r2 is a radius of curvature of a lens surface closest to the object side in the second lens group.

7. The zoom lens system according to claim 5, wherein an imaging position of the zoom lens system is misaligned from the optical axis at least one of the first lens group first positive lens group, the first lens group second positive lens group, and the first lens group negative lens group.

8. A zoom lens system according to claim 1, wherein the first lens group first positive lens group and the first lens group negative lens group move along the optical axis during focussing from objects at infinity to at a close-range.

9. The zoom lens system according to claim 8, wherein the zoom lens system further satisfies the condition $$-2 < (r2+r1)/(r2-r1) < 1$$

where r1 is a radius of curvature of a lens surface closest to the image side in the first lens group negative lens group, and r2 is a radius of curvature of a lens surface closest to the object side in the second lens group.

10. The zoom lens system according to claim 8, wherein an imaging position of the zoom lens system is misaligned from the optical axis at least one of the first lens group first positive lens group, the first lens group second positive lens group, and the first lens group negative lens group.

11. A zoom lens system according to claim 1, wherein the first lens group second positive lens group and the first lens group negative lens group move along the optical axis during focussing from objects at infinity to at a close-range.

12. The zoom lens system according to claim 11, wherein the zoom lens system further satisfies the condition $$-2 < (r2+r1)/(r2-r1) < 1$$

where r1 is a radius of curvature of a lens surface closest to the image side in the first lens group negative lens group, and r2 is a radius of curvature of a lens surface closest to the object side in the second lens group.

13. The zoom lens system according to claim 11, wherein an imaging position of the zoom lens system is misaligned from the optical axis at least one of the first lens group first positive lens group, the first lens group second positive lens group, and the first lens group negative lens group.

14. A zoom lens according to claim 1, wherein only the first lens group first positive lens group moves along the optical axis during focussing from objects at infinity to at a close-range.

15. The zoom lens system according to claim 14, wherein the zoom lens system further satisfies the condition $$-2 < (r2+r1)/(r2-r1) < 1$$

where r1 is a radius of curvature of a lens surface closest to the image side in the first lens group negative lens group, and r2 is a radius of curvature of a lens surface closest to the object side in the second lens group.

16. The zoom lens system according to claim 14, wherein an imaging position of the zoom lens system is misaligned from the optical axis at least one of the first lens group first positive lens group, the first lens group second positive lens group, and the first lens group negative lens group.

17. A zoom lens system according to claim 1, wherein only the first lens group second positive lens group moves along the optical axis during focussing from objects at infinity to at a close-range.

18. The zoom lens system according to claim 17, wherein the zoom lens system further satisfies the condition $$-2<(r2+r1)/(r2-r1)<1$$

where r1 is a radius of curvature of a lens surface closest to the image side in the first lens group negative lens group, and r2 is a radius of curvature of a lens surface closest to the object side in the second lens group.

19. The zoom lens system according to claim 17, wherein an imaging position of the zoom lens system is misaligned from the optical axis at least one of the first lens group first positive lens group, the first lens group second positive lens group, and the first lens group negative lens group.

20. A zoom lens system according to claim 1, wherein only the first lens group negative lens group G1 moves along the optical axis during focussing from objects at infinity to at a close-range.

21. The zoom lens system according to claim 20, wherein the zoom lens system further satisfies the condition $$-2<(r2+r1)/(r2-r1)<1$$

where r1 is a radius of curvature of a lens surface closest to the image side in the first lens group negative lens group, and r2 is a radius of curvature of a lens surface closest to the object side in the second lens group.

22. The zoom lens system according to claim 20, wherein an imaging position of the zoom lens system is misaligned from the optical axis at least one of the first lens group first positive lens group, the first lens group second positive lens group, and the first lens group negative lens group.

23. A zoom lens system according to claim 1, the zoom lens system further comprising an aperture stop provided between the first lens group and the second lens group.

24. The zoom lens system according to claim 23, wherein the zoom lens system further satisfies the condition $$-2<(r2+r1)/(r2-r1)<1$$

where r1 is a radius of curvature of a lens surface closest to the image side in the first lens group negative lens group, and r2 is a radius of curvature of a lens surface closest to the object side in the second lens group.

25. The zoom lens system according to claim 23, wherein an imaging position of the zoom lens system is misaligned from the optical axis at least one of the first lens group first positive lens group, the first lens group second positive lens group, and the first lens group negative lens group.

26. A zoom lens system according to claim 1, wherein a lateral magnification $\beta13$ of the first lens group negative lens group satisfies the condition:

$$|1/\beta13|<0.3.$$

27. The zoom lens system according to claim 26, wherein the first lens group negative lens group satisfies the condition:

$$|1/\beta13|<0.13.$$

28. The zoom lens system according to claim 26, wherein the zoom lens system further satisfies the condition $$-2<(r2+r1)/(r2-r1)<1$$

where r1 is a radius of curvature of a lens surface closest to the image side in the first lens group negative lens group, and r2 is a radius of curvature of a lens surface closest to the object side in the second lens group.

29. The zoom lens system according to claim 26, wherein an imaging position of the zoom lens system is misaligned from the optical axis at least one of the first lens group first positive lens group, the first lens group second positive lens group, and the first lens group negative lens group.

30. The zoom lens system according to claim 1, wherein the zoom lens system further satisfies the condition $$-2<(r2+r1)/(r2-r1)<1$$

where r1 is a radius of curvature of a lens surface closest to the image side in the first lens group negative lens group, and r2 is a radius of curvature of a lens surface closest to the object side in the second lens group.

31. The zoom lens system according to claim 30, wherein an imaging position of the zoom lens system is misaligned from the optical axis at least one of the first lens group first positive lens group, the first lens group second positive lens group, and the first lens group negative lens group.

32. The zoom lens system according to claim 1, wherein the zoom lens system further satisfies the condition:

$$-1<(r2+r1)/(r2-r1)<1$$

where r1 is a radius of curvature of a lens surface closest to the image side in the first lens group negative lens group, and r2 is a radius of curvature of a lens surface closest to the object side in the second lens group.

33. The zoom lens system according to claim 1, wherein an imaging position of the zoom lens system is misaligned from the optical axis at least one of the first lens group first positive lens group, the first lens group second positive lens group, and the first lens group negative lens group.

34. The zoom lens system according to claim 33, further comprising:

a driving device for decentering at least one of the first lens group first positive lens group, the first lens group second positive lens group, and the first lens group negative lens group with respect to the optical axis;

a shake detection device for detecting shaking of the optical zoom lens system and generating a signal; and a computation device that processes the signal from the shake detection device and converts the signal into a decentering signal for decentering at least one of the first lens group first positive lens group, the first lens group second positive lens group, and the first lens group negative lens group by a predetermined amount with respect to the optical axis; whereby the zoom lens system conducts shake correction.

35. The zoom lens system according to claim 34, wherein the shake correction is conducted by causing the one of the first lens group first positive lens group, the lens group second positive lens and the first lens group negative lens group that is fixed during focussing, to move in a direction generally orthogonal to the optical axis.

36. The zoom lens system according to claim 1, wherein the zoom lens system satisfies the condition:

$$0.8<|f1112 \cdot F23/(f13 \cdot f)|<1.33 \quad 0.5<|f13/f1112|<0.9.$$

* * * * *